US009039407B2

(12) United States Patent
McKnight et al.

(10) Patent No.: US 9,039,407 B2
(45) Date of Patent: May 26, 2015

(54) POWDERED FUEL CONVERSION SYSTEMS AND METHODS

(76) Inventors: James K. McKnight, Ithaca, NY (US); Edward Bacorn, Lansing, NY (US); Ken W. White, Ithaca, NY (US)

(*) Notice: Subject to any disclaimer, the term of this patent is extended or adjusted under 35 U.S.C. 154(b) by 814 days.

(21) Appl. No.: 12/419,946

(22) Filed: Apr. 7, 2009

(65) Prior Publication Data
US 2009/0274985 A1    Nov. 5, 2009

Related U.S. Application Data

(63) Continuation-in-part of application No. PCT/US2007/024044, filed on Nov. 16, 2007.

(60) Provisional application No. 61/042,996, filed on Apr. 7, 2008, provisional application No. 61/074,244, filed
(Continued)

(51) Int. Cl.
*F23N 1/00*    (2006.01)
*A01G 13/06*    (2006.01)
(Continued)

(52) U.S. Cl.
CPC . *F23G 7/10* (2013.01); *F23C 6/045* (2013.01); *F23C 2900/06041* (2013.01);
(Continued)

(58) Field of Classification Search
CPC .......... F23C 6/045; F23G 5/033; F23G 5/46; F23G 5/50; F23G 7/10
USPC ............... 431/18, 36, 181, 185, 187, 354; 110/261
See application file for complete search history.

(56) References Cited

U.S. PATENT DOCUMENTS 1,204,631 A * 11/1916 Wood ............................ 110/189
1,552,438 A *  9/1925 Leach ........................... 110/263
(Continued)

FOREIGN PATENT DOCUMENTS

DE           3212986 A1    10/1983
DE     102004019840 A1    11/2005
(Continued)

OTHER PUBLICATIONS

R.D. Perlack et al., "Biomass as Feedstock for a Bioenergy and Bioproducts Industry: The Technical Feasibility of a Billion-Ton Annual Supply", technical report sponsored by the U.S. Departments of Energy and Agriculture, 2005.
(Continued)

*Primary Examiner* — Kenneth Rinehart
*Assistant Examiner* — William Corboy
(74) *Attorney, Agent, or Firm* — Brown & Michaels, PC

(57) ABSTRACT

The burner preferably exclusively burns substantially explosible solid fuels and preferably has instant ON-OFF thermostat control, wastes no energy preheating the enclosure or external air supply, achieves stable combustion the moment the powder-air mix is ignited in our burner, is used in the upward vertical mode except for oil burner retrofits, burns a solid fuel in a single-phase regime as if it were a vaporized liquid or gas, is designed to complete combustion within the burner housing itself rather than in a large, high temperature furnace enclosure which it feeds, has an ultra-short residence time requirement, is a recycle consuming burner with self-contained management of initially unburned particles, is much smaller, simpler and lower cost, has a wider dynamic range/turndown ratio, is more efficient in combustion completeness and thermal efficiency, and operates with air-fuel mix approximately at the flame speed.

30 Claims, 31 Drawing Sheets

Related U.S. Application Data on Jun. 20, 2008, provisional application No. 60/859,779, filed on Nov. 17, 2006, provisional application No. 60/868,408, filed on Dec. 4, 2006, provisional application No. 60/993,221, filed on Sep. 10, 2007.

(51) Int. Cl.

| | | |
|---|---|---|
| *F23C 5/08* | (2006.01) | |
| *F23C 7/00* | (2006.01) | |
| *F23D 14/62* | (2006.01) | |
| *F23C 1/12* | (2006.01) | |
| *F23G 7/10* | (2006.01) | |
| *F23C 6/04* | (2006.01) | |
| *F23G 5/033* | (2006.01) | |
| *F23G 5/44* | (2006.01) | |
| *F23G 5/46* | (2006.01) | |
| *F23G 5/50* | (2006.01) | |

(52) U.S. Cl.
CPC ............... *F23G 5/033* (2013.01); *F23G 5/444* (2013.01); *F23G 5/46* (2013.01); *F23G 5/50* (2013.01); *F23G 2202/106* (2013.01); *F23G 2205/20* (2013.01); *F23G 2206/203* (2013.01); *F23G 2207/101* (2013.01); *F23G 2207/102* (2013.01); *F23G 2207/104* (2013.01); *F23G 2207/112* (2013.01); *F23G 2207/113* (2013.01); *F23G 2207/20* (2013.01); *F23G 2207/30* (2013.01); *Y02E 20/12* (2013.01); *Y02E 50/10* (2013.01); *Y02E 50/30* (2013.01)

(56) References Cited

U.S. PATENT DOCUMENTS

| | | | | |
|---|---|---|---|---|
| 1,656,678 | A | | 1/1928 | Pawlikowski |
| 1,684,320 | A | * | 9/1928 | Hermsdorf .................... 406/101 |
| 1,910,735 | A | * | 5/1933 | Zikesch ........................ 110/264 |
| 2,395,524 | A | | 3/1946 | Nettel |
| 2,616,252 | A | * | 11/1952 | Landry et al. .................... 60/781 |
| 2,918,117 | A | * | 12/1959 | Griffin .......................... 431/116 |
| 3,894,834 | A | * | 7/1975 | Estes ............................ 431/174 |
| 4,092,094 | A | * | 5/1978 | Lingl, Jr. ........................... 432/1 |
| 4,157,889 | A | * | 6/1979 | Bonnel .......................... 431/182 |
| 4,244,701 | A | | 1/1981 | Yamashita |
| 4,361,100 | A | * | 11/1982 | Hinger .......................... 110/238 |
| 4,368,678 | A | | 1/1983 | Ulveling |
| 4,428,727 | A | | 1/1984 | Deussner et al. |
| 4,522,154 | A | | 6/1985 | Taylor et al. |
| 4,532,873 | A | | 8/1985 | Rivers et al. |
| 4,565,137 | A | | 1/1986 | Wright |
| 4,693,189 | A | | 9/1987 | Powers |
| 4,845,942 | A | * | 7/1989 | Schemenau et al. ......... 60/39.12 |
| 4,927,351 | A | * | 5/1990 | Hagar et al. .................... 431/12 |
| 5,003,891 | A | | 4/1991 | Kaneko et al. |
| 5,090,339 | A | | 2/1992 | Okiura et al. |
| 5,315,939 | A | | 5/1994 | Rini et al. |
| 5,485,812 | A | | 1/1996 | Firey |
| 6,712,496 | B2 | | 3/2004 | Kressin et al. |
| 2004/0255831 | A1 | | 12/2004 | Rabovitser et al. |

FOREIGN PATENT DOCUMENTS

| | | | | |
|---|---|---|---|---|
| GB | 1439440 | A | 6/1976 | |
| JP | 58002450 | A | 1/1983 | |
| JP | 60200007 | A * | 10/1985 | .................. 431/202 |
| WO | 8304085 | A1 | 11/1983 | |
| WO | 9427087 | A1 | 11/1994 | |
| WO | 2007106773 | A1 | 9/2007 | |

OTHER PUBLICATIONS

M. Bryden et al., "Designing Improved Wood Burning Heating Stoves", Aprovecho Research Center, 2005.

M.L. Beekes et al., "Co-Combustion of Biomass in Pulverised Coal-Fired Boilers in the Netherlands", 1998.

L.P. Yarin and G. Hetsroni, Combustion of Two-Phase Reactive Media, pp. 84-85, 133-139, 197-198, 223-227, 234-241, 307-315, 432-438, and 510-529, Springer, 2004.

R.I. Nigmatulin, Dynamics of Multiphase Media: vol. 1, Hemisphere Publishing Corporation, New York, pp. 445-447, 476, and 480-483, 1991.

K. Hamilton, "Feasibility Study: Grain-dust Burner", MSc Thesis, University of Strathclyde, 2006.

Natural Resources Canada, "Buyer's Guide to Small Commercial Biomass Combustion Systems", 2000.

A. Elfasakhany, "Modeling of Pulverised Wood Flames", Doctoral Thesis, Lund University, Lund, Sweden, 2005.

S. Sadaka, "Pyrolysis", available at http://bioweb.sungrant.org/NR/rdonlyres/57BCB4D0-1F59-4BC3-A4DD-4B72E9A3DA30/0/Pyrolysis.pdf, 2006.

H. Lu, "Experimental and Modeling Investigations of Biomass Particle Combustion", PhD dissertation, Brigham Young University, Department Chemical Engineering, 2006.

J.M. Heikkinen, "Characterisation of Supplementary Fuels for Co-combustion with Pulverised Coal", Master of Science in Environmental and Energy Engineering, Tampere University of Technology, Finland, 2005.

International search report and written opinion for PCT/US2009/039820, 10 pages, mailed Nov. 20, 2009.

\* cited by examiner

| Flue Gas | VOC Data | |
|---|---|---|
| lbs. | per MM BTU | Application |
| 4.8000 | TOC | Residential Wood Stove |
| 0.0200 | VOC | Industrial Wood Boiler |
| 0.0170 | TOC | Heating Oil Hosehold Furnace |
| 0.0110 | VOC | Industrial Burner on Natural Gas |
| 0.0027 | VOC | **Current Burner* into Furnace Simulator** |
| 0.0015 | VOC | **Current Burner* into Free Space** |
| * 1MM | BTU/hr | Horizontal Burner - 100% explosible fuel |

Traditional

2 Stage Burner

Basic Combustion Phenomena

Fluid Mechanic Processes

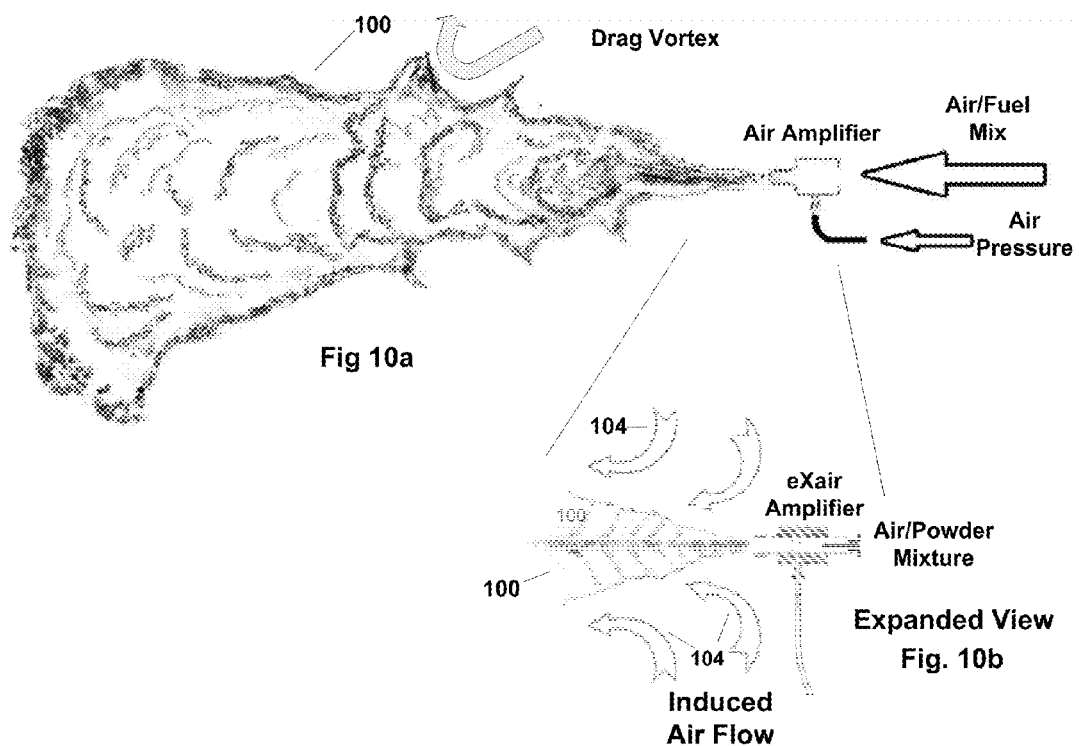
Fig 10a
Expanded View
Fig. 10b
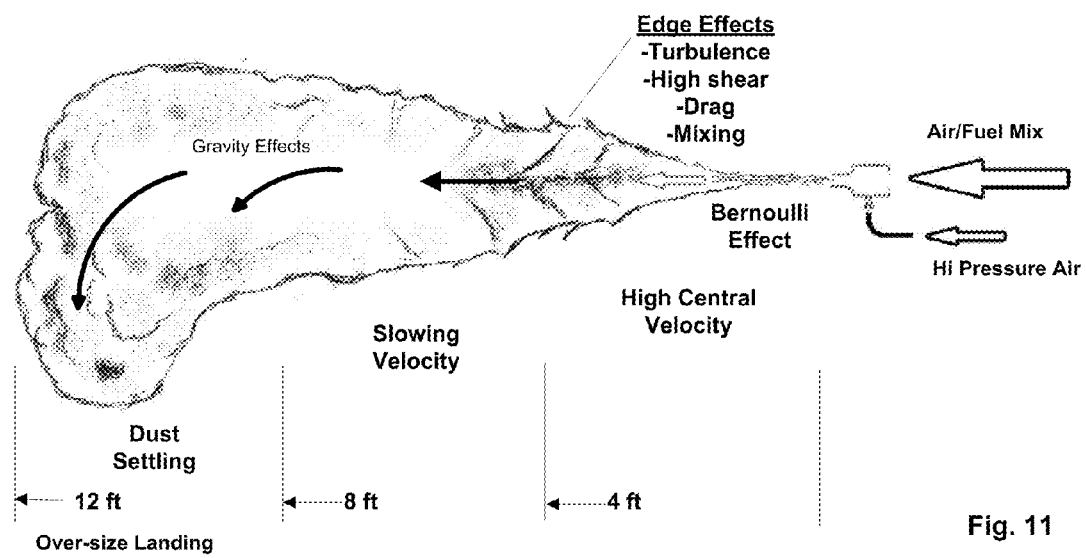
Fig. 11

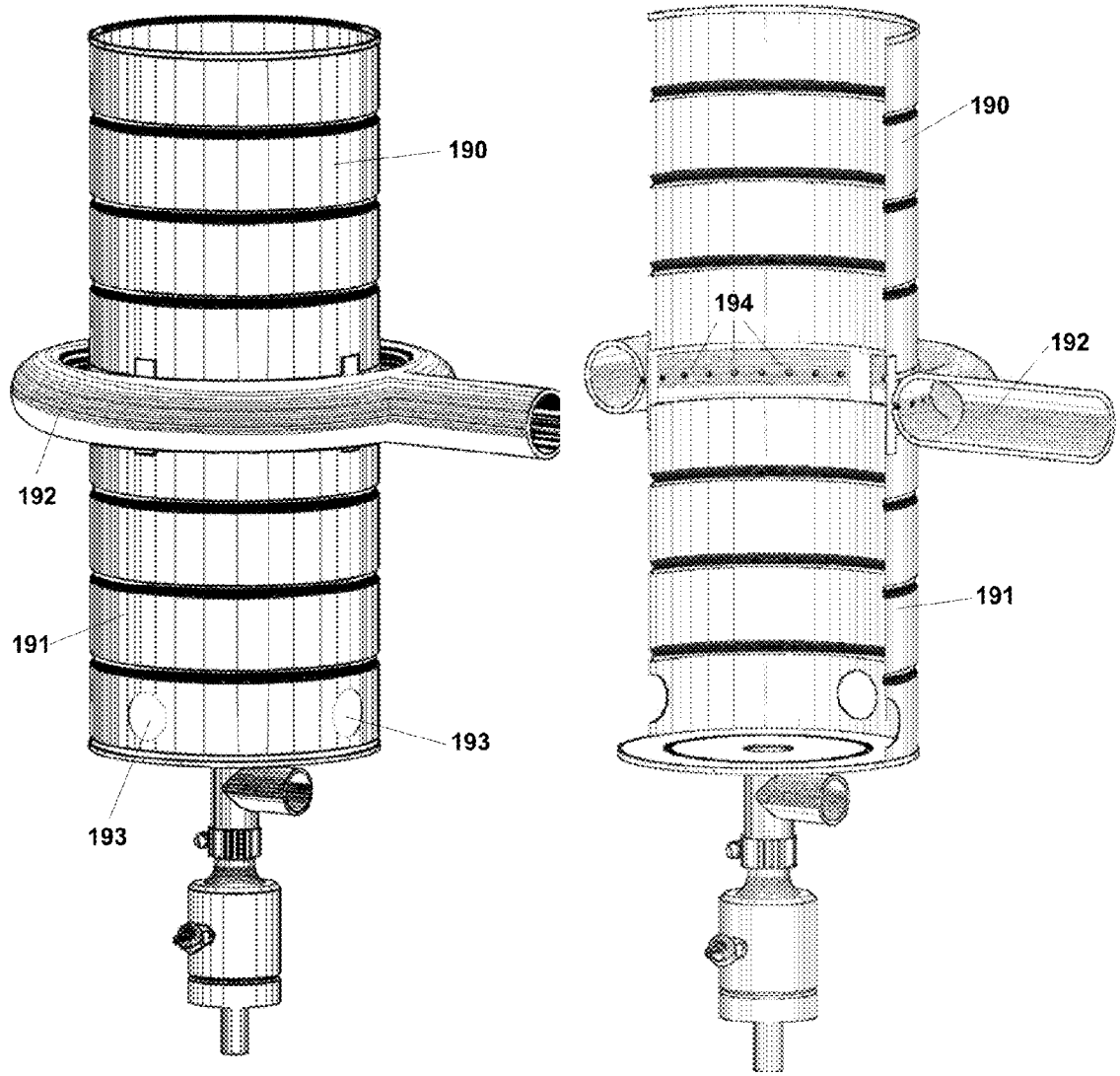
Fig. 19a                    Fig. 19b

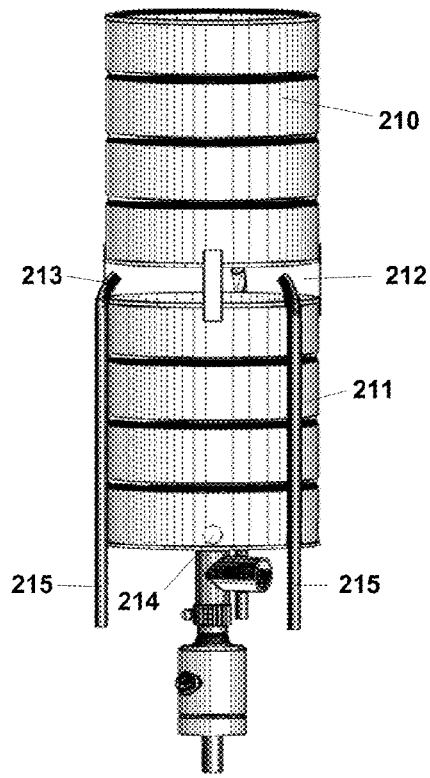
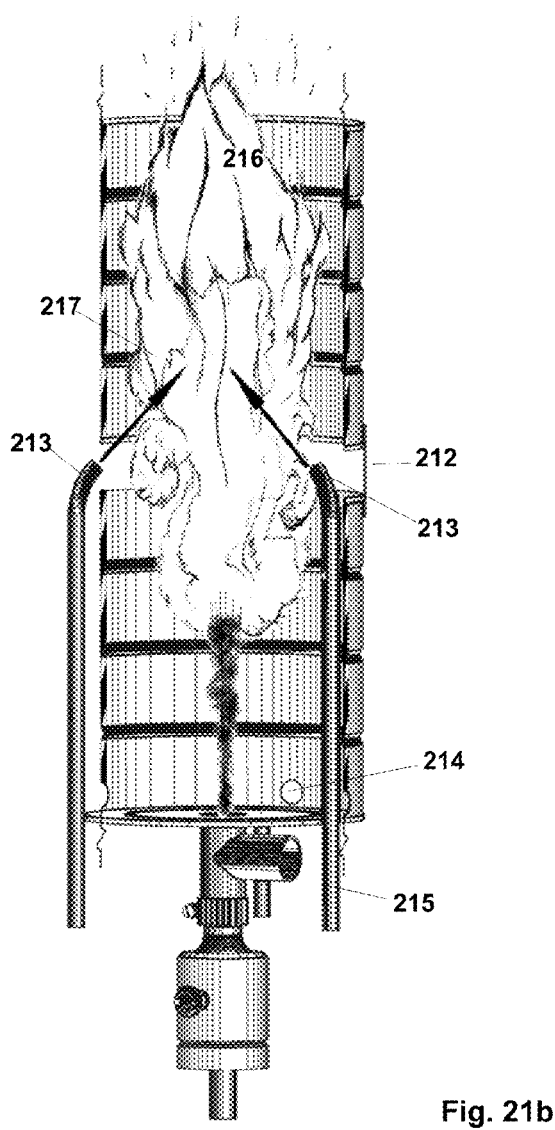
Fig. 21a
Fig. 21b

Particle & Agglomerate
Recirculation & Mixing

Exploded View

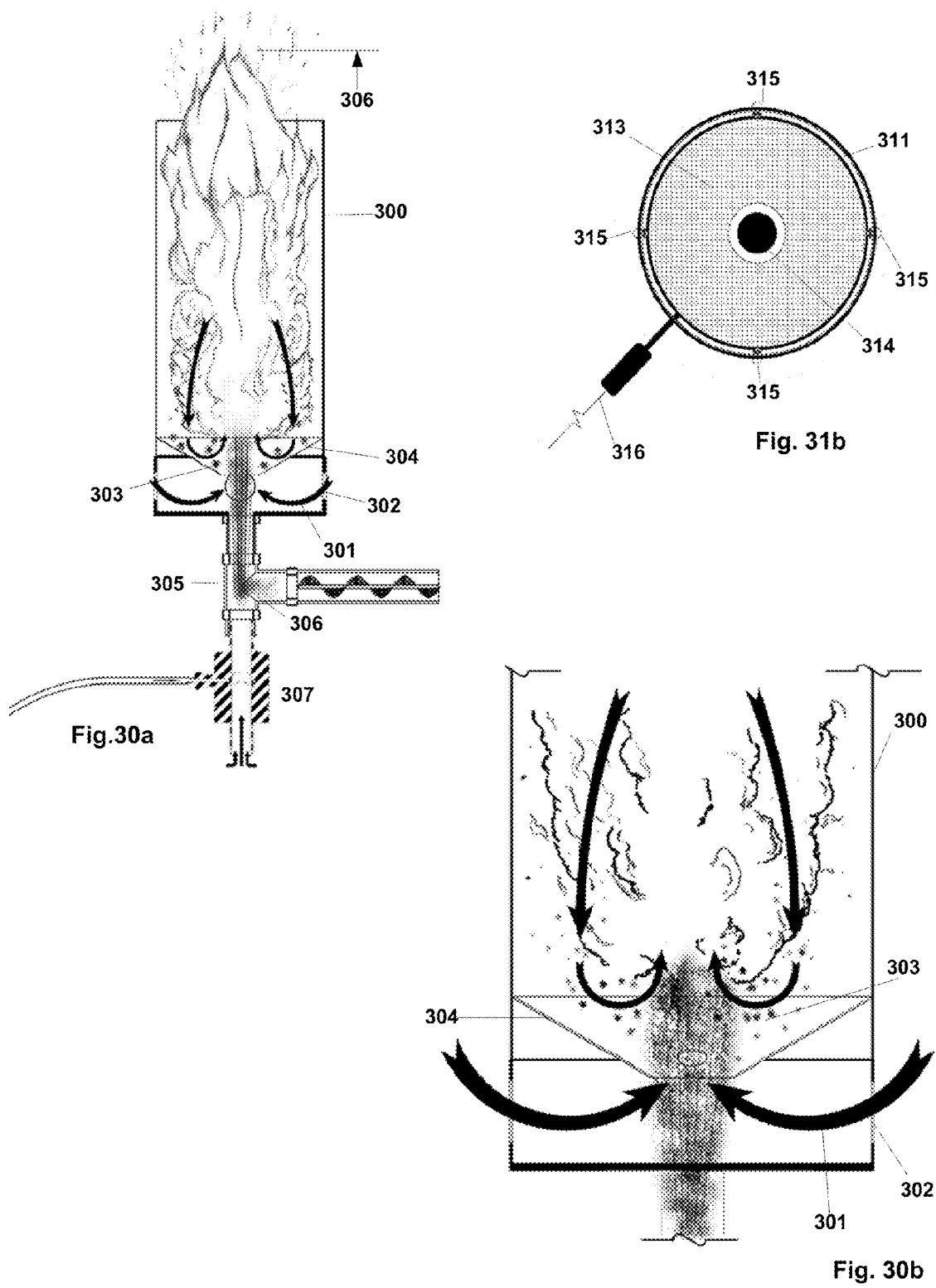

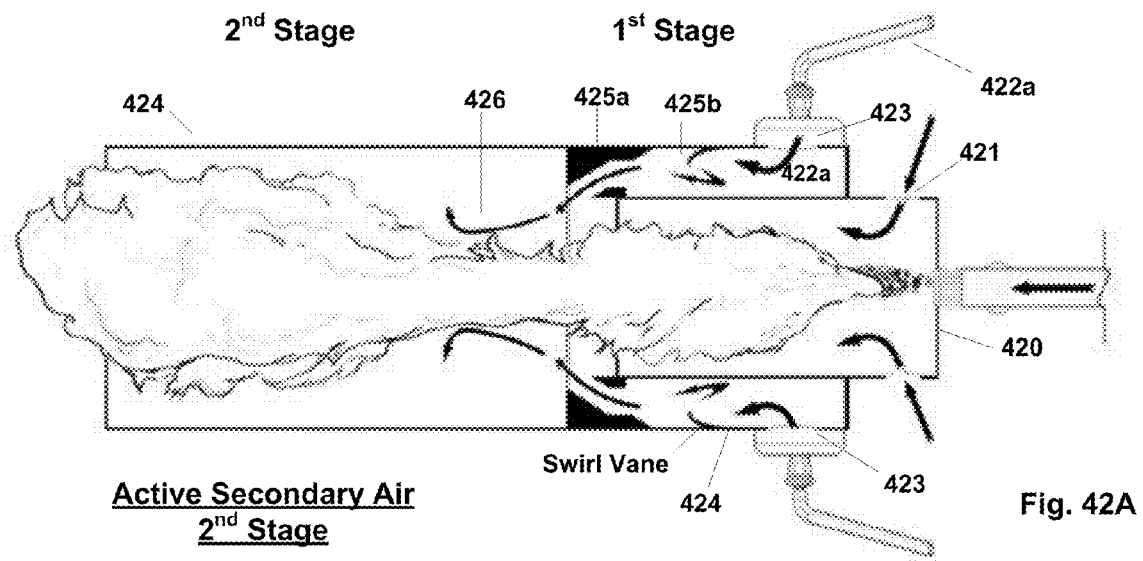
Fig. 42A — Active Secondary Air 2nd Stage
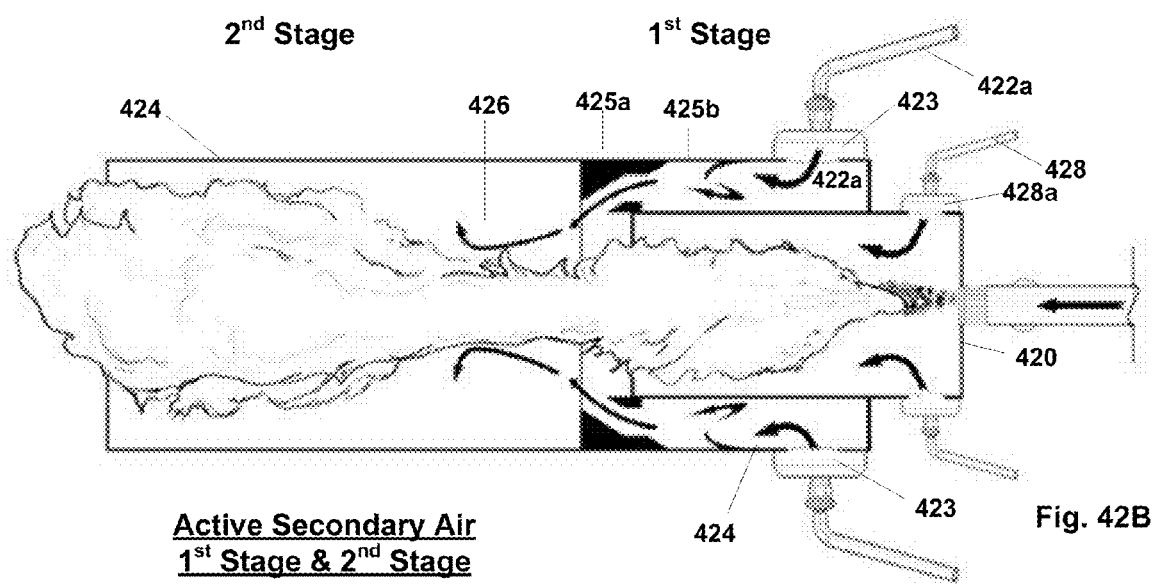
Fig. 42B — Active Secondary Air 1st Stage & 2nd Stage

Furnace System for Heating with Powder Fuel

POWDERED FUEL CONVERSION SYSTEMS AND METHODS

REFERENCE TO RELATED APPLICATIONS

This application claims one or more inventions which were disclosed in U.S. Provisional Application No. 61/042,996, filed Apr. 7, 2008, entitled "POWDERED FUEL CONVERSION SYSTEMS AND METHODS" and U.S. Provisional Application No. 61/074,244, filed Jun. 20, 2008, entitled "POWDERED FUEL CONVERSION SYSTEMS AND METHODS". The benefit under 35 USC §119(e) of the United States provisional applications is hereby claimed, and the aforementioned applications are hereby incorporated herein by reference.

This is a continuation-in-part patent application of co-pending PCT Patent Application No. PCT/US2007/024044, entitled "POWDERED FUELS, DISPERSIONS THEREOF, AND COMBUSTION DEVICES RELATED THERETO", filed Nov. 16, 2007, which claims priority to U.S. Provisional Application No. 60/859,779, filed Nov. 17, 2006, U.S. Provisional Application No. 60/868,408, filed Dec. 4, 2006, and U.S. Provisional Application No. 60/993,221, filed Sep. 10, 2007. The above-mentioned applications are herein incorporated by reference.

BACKGROUND OF THE INVENTION

1. Field of the Invention

The invention pertains to the field of solid fuel combustion. More particularly, the invention pertains to sustained burning of explosible biomass powder with on/off control.

2. Description of Related Art

The present invention concerns processes, methods, devices, and systems that, taken separately and together, allow for the processing of biomass and other solid fuel materials into an explosible powder and the combustion of the materials for a direct conversion into energy to heat or perform work. This disclosure describes the harnessing of long-feared dust explosions and operating new solid fuel burners to accomplish a unique energy conversion process.

The present invention is largely based upon the application and new integration of some advanced yet elegantly simple principles, portions of which exist unconnected in various bodies of knowledge in the fields of fluid mechanics, physics, kinetics, industrial power plant process design, and combustion theory. This technology will soon gain integrated global scientific community attention and be applied in the engineering of fuel source production, distribution, combustion burner design, heating, and other energy conversion applications.

A thorough discussion of the invention's background and practical and theoretical bases is presented to convey the uniqueness of the invention, the scope of its various embodiments and variations, and how it may be practiced. The present disclosure shows how prior art attempts to utilize powder in fuels have come up short, failing to unveil a practical and complete picture of the methods and processes, which will soon be established as a new body of knowledge and practice, becoming an affordable and practical alternative to America's ever growing need for renewable energy.

Before delving into the prior art, it is important to summarize key points about this new art and what performance and benefits can be expected from its implementation. A burner of the present invention preferably has numerous features: instant cold start ON-OFF control; stable combustion the moment the powder-air mix is ignited; use in either vertical and horizontal modes; burning solid fuel in a single-phase mode as if it were a vaporized liquid or gas; completeness of combustion within the burner housing itself, rather than in a large high temperature furnace reactor; an ultra-short particle residence time requirement; burning substantially explosible powders; recycle consuming with self-contained management of initially unburned particles; and smaller and simpler than prior art solid fuel systems. The burner and fuel in combination are important to operation of a burner of the present invention, as are the burner itself, the type and quality of fuel, and integration with a Positive Displacement Powder Dispersion (PDPD).

A major point in our disclosure is the surprising revelation that a solid may be heterogeneously combusted in a gas in a method that differs very little from a true single phase regime, yet differs greatly from traditional combustion practices over the years which continued to rely on two-phase principles of a stirred reactor. This topic will be introduced in the review of prior art next, and explained in-depth later in fluid mechanics terminology with reference to theory.

What has been the thinking, goals, and focus for design of burners, furnaces, and fuels over the last three to five decades, both in large power plant burner, furnace and heat recovery design and fuel selection? It is apparent, after review of representative literature written during the last half century, that the basics of furnace design assumptions practiced in the mid-twentieth century still control mainstream thinking.

Residential and small commercial heating furnace design assumptions have remained similarly bound and influenced by larger power plant concepts, except for changes in two significant areas. First, process control and energy saving design improvements have resulted in increased efficiency of heat recovery from small to large furnaces. Today, latent heat is extracted from hot flue gases with efficiencies in the low 90th percentile normally. Second, using technology formerly only affordable in power plant furnace systems, these smaller furnaces and boilers are beginning to experience technology additions to reduce airborne post combustion pollutants, since it has not been cost-effective on a per BTU basis or mandated outside the power plant.

Practicing new techniques of air pollution abatement have produced major strides forward by reducing, removing, and cleaning various pollutants from power plant and furnace flue exhausts. Increased use of biomass based fuels for co-firing with fossil fuels has further reduced stack emission levels. Ultra-clean coal, may soon become an affordable option for the residential and commercial users, but due to processing costs, has yet to become economically attractive for large coal fired generating stations.

The use of biomass for heating or transportation is often limited by our experiences as well, both on individual and governmental levels. We tend to think that alternatives to fuel oil must be liquids and fuels must transport and pump like liquids. Likewise, supplements to gasoline must be liquid, except for wood gas and the hope for hydrogen.

Relevant Combustion History, Fuels, and Practices

There are several conditions which must exist simultaneously to achieve complete combustion, known in the industry as the "Three T's". The fuel mixture must be 1) in an environment of adequately high Temperature; 2) for a sufficiently long enough Time; 3) with reasonably Turbulent mixing conditions to provide proper oxidation to complete fuel combustion in the Space allowed (see C. E. Baukal, Jr., ed., *The John Zink Combustion Handbook*), and that "Space" is known by a variety of names in the industry such as a furnace, combustion chamber, boiler, firebox, and process heater (vertical cylindrical, cabin style and reactors), all of which are large chambers or vessels emulating an "ideal mixed reactor".

It is important to remember that the primary method of heat transfer to the fuel particles in such large furnaces is by radiation rather than conduction from particle to gas as we employ.

Even back in 1950, furnace and burner design was driven by the goal of attaining "ideally mixed reactions" as it states in the *Plant Engineering Handbook* (W. Staniar, ed.), incorporated by reference herein. Design of a burner of the present invention must deal with the bulk these same criteria, but is not constrained to use of a model of the downsized power plant for furnace design, which requires a hot, radiating refractory and its inherent large size. As a benefit, our burners can start up cold, and operate with ON/OFF control, unlike coal fired furnaces burning pulverized coal, which take hours to startup and shut down:

"The development of pulverized-coal firing for purposes of steam generation has been due, in large measure, to a better understanding of furnace design requirements. Uniform distribution of fuel and air to the furnace is also of prime importance. Turbulence provides the means for effective distribution and speed(s) ignition of the incoming fuel and promotes rapid combustion by continually making available the free oxygen needed by the ignited combustible matter. These requirements are the governing factors in burner selection and application."

"The selection [of a firing method] for any given installation is governed by a number of variables, of which the principal ones are size, shape, and volume of furnace available to develop the desired capacity. Furnace dimensions establish the maximum length of flame travel available . . . . Quantity of coal to be burned, as well as its volatile matter and sulfur content, fusion temperature of ash, and fineness of pulverization will influence not only method of firing and type of wall construction to be used but also the method of ash disposal."

"Each of the firing methods [vertical (downward) firing; horizontal turbulent firing; and tangential firing] requires a different burner design because of the variations in the manner in which air and coal are mixed to produce efficient and complete combustion. Fundamentally, however, all burner designs must be such that the air and coal are supplied to the furnace so as to provide stable and prompt ignition; positive adjustment and control of ignition point and flame shape, completeness of combustion; uniform distribution of excess air, temperature, and gas flow at furnace outlet; freedom from localized slag deposits; protection against overheating, internal fires, and excessive wear in the burner; and accessibility for adjustment and replacement of parts."

Coal has been burned both in crushed and pulverized forms for over half a century. There are many variables that interplay including moisture, percent volatiles, ash, and BTU value for given types of coal and the type of furnace. For example, a high percent volatiles can cause heating value loss or excess smoking issues for stoker-fired plants, if the specific furnace has inadequate space and time to mix the volatile gases with air and completely combust them. A requirement for an upper limit on volatiles is a typical solution for specific types of furnaces.

Conversely, when firing pulverized coal, it is important "to set a lower limit (for percent volatiles) in order to maintain flame propagation, particularly in completely water-cooled furnaces" according to the *Plant Engineering Handbook*, page 373:

"Solid fuels, when burned in suspension, should contain an appreciable quantity of extremely fine dust so as to ensure prompt ignition. The amount of coarser material must be minimized if best combustion results are to be obtained."

"The fineness to which coals should be pulverized will depend on many factors. Caking coals (sulfur containing bituminous coal, coking coal, forms a fused heavy crust at the surface), when exposed to furnace temperature, will swell and form lightweight, porous coke particles. They may float out of the furnace before they are completely burned. As a result, carbon loss will be high unless pulverization is very fine. Free-burning coals (contains no sulfur and does not cake), on the other hand, do not require the same degree of fineness because the swelling characteristic is absent."

"High-volatile coals ignite more readily than those with low volatile content. Therefore, they do not require the same degree of fine pulverization. With the exception of anthracite (called stone coal), however, the low-volatile coals are softer and may be said to have a higher grindability."

"Some large furnaces may operate satisfactorily on high-volatile coal as coarse as 65 percent minus 200 mesh. Small water-cooled furnaces, using low-volatile coal, may require a fineness of 85 percent minimum through 200 mesh. Other influencing factors are burner and furnace design, disposition of furnace volume, length of flame travel, furnace temperature, and load characteristics. In general, however, small furnaces require finer pulverization than large ones."

"The fineness of the product is usually expressed by the percentage of dust that will pass a sieve with specific size openings. For testing pulverized coal the most commonly used sieves are the 50-mesh sieve (210 microns) for determining the oversize and the 200-mesh sieve (74 microns) for determining the fine dust."

In summary, the use of pulverized coal in furnaces is most beneficial for ignition, where an "appreciable quantity of extremely fine dust" is utilized. Pulverized coal offers benefits for handling with many types of stokers but is a known detriment and avoided for caking types of coal. Coal raw material composition and resulting combustion issues can be compensated for by adjusting the particle size to be finer or coarser. The percentage of volatiles is similarly employed as a trade-off, with a higher volatile percentage enabling a distribution of larger particle size coal to be used.

As evidenced by the art practices, pulverized coal particle size is used to address fuel handling and coal type composition issues. By relying on the % volatiles consumed in multiphase combustion combined with large reactor size and residence time common to all furnaces, it is clear that there is no teaching in the art for using only substantially explosible coal powder as a feed stock with a cold, small and low-speed burner design. The main value of having a portion of the overall pulverized size distribution well below 200 microns is for reliable ignition and fast burn only. Further in-depth fluid mechanics comparison of the differences between of our combustion regime and coal power plant furnace techniques may be found later in this disclosure.

In traditional furnaces used for steam generation in power plants, whether they are fed by coarse crushed coal or fine pulverized coal, much of the actual combustion takes place over time inside the furnace's large volume. Typically, multiple burners are used to "fire" into the radiation filled furnace cavity reaction chamber, where much of the combustion is completed and heat energy is released for subsequent exchange.

Biomass, Wood and Hog Fuel Combustion

Sources of biomass have been used sporadically in localized developments to convert accumulating "bio-scrap" for recovery of some of its energy content and to "dispose" of this otherwise waste product. The pulp and paper industry and affiliated sawmill industry are leading examples. The following gives perspective to the supply.

*Biomass as Feedstock for a Bioenergy and Bioproducts Industry: The Technical Feasibility of a Billion-Ton Annual Supply*, (R. D. Perlack et al.) sponsored by the U.S. Departments of Energy and Agriculture in 2005 offers two significant quotes from the Executive Summary regarding the availability of biomass as a fuel source:

"This study found that the combined forest and agriculture land resources have the potential of sustainably supplying much more than one-third of the nation's current petroleum consumption." And regarding development of a vertical industry of supply: "In the context of the time required to scale up to a large-scale biorefinery industry, an annual biomass supply of more than 1.3 billion dry tons can be accomplished with relatively modest changes in land use and agricultural and forestry practices."

Large "powder burners" from either Petrokraft or the VTS Powder burner are utilized in Sweden and in Europe according to a 2004 doctoral thesis written by Susanne Paulrud, "*Upgraded Biofuels—Effects of Quality on Processing, Handling, Characteristics, Combustion and Ash melting*". This technique is typically applied to large-scale heating plants over a megawatt. The fuel for these burners is "finely milled wood powder or finely milled pellets." Wood powder analyzed by sieve and laser methods shows percentages of explosible particles ranging from 3% to about 46%, far too low to operate in the explosible mode. These burners utilize classic swirl for containment and recirculation mixing, but "aerodynamics and stoichiometry can make it difficult to achieve stable ignition and good burnout". Even with the finest particles, predicted particle traces show distinct zones for evaporation, boiling, and devolatilization before char burnout, indicative of two phase combustion. This fact plus the large burner airflow designs and particle distributions used confirm no capability of operation mimicking a single phase combustion regime.

Large burners such as the German burner utilized in the Canadian system by Alternative Green Energy Systems Inc. (AGES), likewise consume wood particles, sawdust and what they describe as powder as evidenced by the complexity, orientation, and ash concerns of their combustion equipment. This advanced system, however, was clearly not designed for exclusive use of a "substantially explosible" biomass wood powder.

U.S. Pat. No. 4,532,873, "SUSPENSION FIRING OF HOG FUEL, OTHER BIOMASS OR PEAT", issued in 1985 to Rivers et al., is an excellent example of the previous and current art when it comes to the direct burning of various types of biomass for heat recovery, in this case in a water-wall boiler.

While this hog fuel biomass burning system may initially seem very similar to our disclosure, detailed examination will make absolutely clear that this entire system operates using a totally different combustion regime and substantially different operating principles burner hardware, and fluid mechanic processes in its two-phase operation.

The patent states that the fines portion is an ignition source, imparting stability to the flame, and that "the presence of the fines portion is the heart of the invention" as it simply "eliminates the requirement for running with supplemental oil . . . . Hog fuels must be substantially reduced in size to provide an ignition energy source". The large particle size distribution curve of FIG. 1*a* depicts a typical hog fuel non-explosible particle size distribution, compared to an explosible powder particle size curve on the left.

The stated stability of their two-phase combustion regime has only a 2.5:1 turndown ratio compared to our 10:1 ratio, and their burner cannot tolerate cold secondary air unlike a burner of the present invention. The process by Rivers, et al. is stated to work "for all furnace configurations, kilns and the like, but is most particularly suitable for use with water wall furnaces and boilers". It relies on fines to initiate and stabilize the combustion and radiant heat transfer from a hot furnace to complete it, especially when, large and oversized non-explosible particles are concerned.

This hog fuel burner system requires a distribution with particle sizes much larger than ours, allowing for up to an estimated 75% of the particles outside the explosible range ("15-85% less than 150 microns") and "65 to 100% less than 1000 microns", meaning 35% could be larger than 1 millimeter (1000 microns), a size that is 4 to 5 times the boundary between explosible and non-explosible wood powders.

Even the slightly narrower region claimed by Rivers, et al. ("at least 60% by weight of the particles are finer than about 1000 microns") allows for a significant portion of non-explosible particles. The statement "A fines portion including at least 15% by weight less than 150 microns was found suitable" clarifies that there is no requirement for significant or substantial use of "fines". The hog fuel burner does not operate in what we call the explosible range, a term they never use. Explosiblity is a phenomena they only understood from a standard industry standpoint, for they were afraid of dust explosions like the rest of industry, as made exceedingly clear by this last clarifying statement. "Fuels much finer than 85% less than 150 microns are likely to be too 'dusty' increasing dust explosion hazards and otherwise requiring an excess of pulverizing power to produce."

The present disclosure focuses on combustion of substantially explosible mixtures. Other art, including the hog fuel patent just described and co-firing designs, specify the use of a distribution of a mixed particle size fuel, often called "powder". Only some component segments of the broad, larger fuel particle size distribution are "fine powders" that may, only when used alone, actually be explosible.

However, these "fine powder" portions are subsets of a much wider and essentially non-explosible fuel particle size distribution such as shown in FIG. 1*a*, and are utilized at best simply as a quick and easily burnable ignition and combustion maintenance energy source. This small fraction has the stated primary purpose to "sustain combustion" of larger particles and chunks, the major portion of their fuel size distribution lying outside of the explosible range, the region which we disclose, claim, and prefer.

In the present disclosure, all of the fuel performs the functions of ignition and combustion temperature maintenance, not simply a portion nor even a significant portion of the overall fuel composite particle size mixture. Substantially all of the fuel has the job of ignition and heating of its neighbors in the entire mixture, even "less burnable" agglomerated clumps or occasional, longer high aspect ratio non-explosible particles having explosible diameters found in the fuel due to manufacturing sieving/separation imperfection.

In a case study begun in 1995, and entitled "Co-Combustion of Biomass in Pulverised Coal-Fired Boilers in the Netherlands" (M. L. Beekes et al.), co-combustion of pulverized wood with pulverized coal was studied at the Gelderland power station. Waste wood was used in a coal-fired boiler in a pulverized mode, as it "has the advantage of being a very dry and fine fraction material that is uniform, easy to handle, and with high energy content that can be burned much like oil or gas". The 635-MWe coal-fired production began operation in 1981, and in the mid to late 1980's was upgraded with flue gas desulphurization, $NO_x$ reduction, and electrostatic fly ash filters. Using four burners of 20 MWe each, this bio-scrap can provide about 12.5% of the operating energy input.

Wood chip up to 3 cm in size were reduced by a hammermill at the plant to a maximum particle size of 4 mm. The particles were sieved and divided and further separated using a dust collector. The particle size distribution of the wood powder is given as 90% less than 800 µm (a coarse 20 mesh), 99% less than 1000 µm, and 100% less than 1500 µm, with a moisture content of less than 8% by weight. With the material dependent dividing line between explosible and non-explosible powder particle size for wood residing in the neighborhood of 200+/− microns, it is obvious that a significant portion of the particles, likely well over 50%, are not explosible, meaning their combustion process is different from ours.

Combustion took place inside a boiler furnace built in the following burner configuration: "Four special wood burners with a capacity of 20 MWth each are mounted in the side walls of the boiler (two on each side) below the lowest rows of the existing 36 coal burners. There are 3 rows of 6 coal burners in the front and back walls. The coal burners can also be used for burning oil and therefore the combination wood powder/oil is theoretically possible."

Use of large furnaces as high temperature reactors allowed larger particles as a substantial portion of the entire fuel stream to be utilized, as ignition happens inside the furnace through radiation, not particle-to-gas conduction, characteristic of our single-phase appearing combustion regime.

The "Safety Precautions" section of the report combined with their operating particle size specification and use with a large furnace makes it abundantly clear that this system was not operating in the explosible range and therefore not mimicking a single-phase regime as we practice, disclose, and claim. A byproduct of their " . . . micronizing process creates wood dust particles that pose a possible hazard for dust explosions. Therefore [the following] safety precautions must be taken . . . . " Like other recent prior art uses of biomass scrap for industrial energy conversion, they too were unaware of the potential to operate in the combustion regime of the present invention.

In the North American wood products and pellet industries today, it is common to see large cyclonic burners such as units manufactured by Onix used for chip and coarse sawdust drying. These Webb Burners™ are costly and large in size to insure adequate residence time for particle char burnout. Suspension burners are taking over most installations, as they offer efficiency gains of 25% through stat gas recycle plus considerably less maintenance. These large burners are designed for large particle fuel, and therefore do not operate using the principles of this disclosure.

The limitations of the prior art establish the need for systems and approaches for the conversion of biomass and other solid fuel powders directly into energy by such means and methods to afford ON-OFF control of clean, dependable, and efficient combustion.

SUMMARY OF THE INVENTION

A burner system of the present invention operates based on the fluid mechanics driven process of a moving stream of a powdered fuel in an oxidizing gas, feeding a stable stationary deflagrating flame wave with on-off control. Balancing mass flow velocity of an explosible fuel dispersion with deflagrating flame front wave velocity produces a stationary and stable combustion front and zone. To aid in this balance and improve stability, the burner system may include both active and passive secondary air, which provides turbulent mixing, particle recirculation, combustion zone support over a wide turndown range, and combustion completion. A de-agglomerization system may be used to break up agglomerate clumps of the powdered fuel to return them to an explosible state.

BRIEF DESCRIPTION OF THE DRAWINGS

FIG. 10A shows schematically a horizontal explosible powder fuel dispersion in an embodiment of the present invention with no flame.

FIG. 10B shows a magnified view of FIG. 10A.

FIG. 11 shows schematically velocity and gravity effects on a horizontal explosible powder fuel dispersion with no flame.

FIG. 19A shows stacked cans with a multi-holed air ring supplying secondary air.

FIG. 19B shows a cut-away of the stacked cans of FIG. 19A.

FIG. 21A shows stacked cans with three secondary air nozzles and a 1-inch gap.

FIG. 21B shows a cut-away of the stacked cans of FIG. 20A with a deflagrating flame.

FIG. 30A shows a wide hole 30° cone combining both recirculation and secondary air in an embodiment of the present invention.

FIG. 30B is a magnified view of the bottom section of the burner of FIG. 30A.

FIG. 31B is a top view of the ultrasonic agglomerate lump dispersing screen of FIG. 31A.

FIG. 42A depicts the internal structure of a large horizontal two-stage burner of the present invention with dual coaxial enclosures for active secondary air management.

FIG. 42B adds first-stage active secondary air to the two-stage burner in FIG. 42A.

DETAILED DESCRIPTION OF THE INVENTION

Figure 1A:
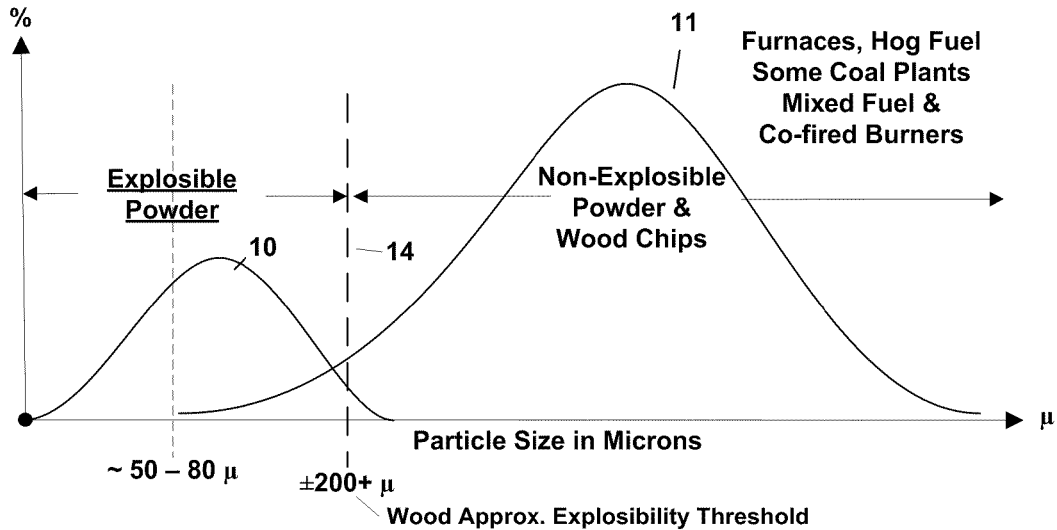
FIG. 1A depicts schematically explosible and non-explosible particle size distributions.

The invention described herein enables the sustained combustion of explosible powder mixed with an oxidizing gas in a dispersed travelling suspension to produce heat or perform work. The combustion technology and systems disclosed herein provide an opportunity for a major reduction in dependence on fossil fuels, leveraging and utilizing local production and distribution of renewable biomass energy fuel to fill in this gap, without the introduction of significant quantities of "new" $CO_2$ into the atmosphere.

No burner system to our knowledge is designed to exclusively handle explosible biomass and other solid fuels suspended in a substantially explosible mixture of an explosible powder with an oxidizing gas, preferably air, with the result of direct energy conversion, in a manner that mimics single-phase combustion of propane or methane gas.

We are the first to develop, use, and disclose an explosible powder as a fuel in a burner, where the burner was designed around combusting a substantially explosible solid powder travelling in a moving stream with the process calculated to mimic a single-phase regime. We have developed and disclose the "Bunsen burner for solid powdered fuels", then moved far beyond in combustion efficiency control as we manage dust explosions.

A significant feature and advantage of our burner disclosure is the incredible simplicity of the design. While integrating a number of complex features, this simple design provides a direct conversion of sustainable dried biomass and other powders in the form of a substantially explosible powder. In this simple process disclosed in PCT/US2007/024044, using our newly disclosed burners, no additional intermediate processes, consuming time, energy, and financial resources are required.

Because of our design strategy, a significant part of our claims is our ability to operate a solid fuel burner with substantially instantaneous ON/OFF control, on demand. An additional unique feature is our ability to modulate the burner output linearly over an operating dynamic range in excess of 10:1, while maintaining our near-instantaneous ON/OFF control capability. This modulation of a solid fuel burner output, with a fast response time of 1 to 2 seconds to a change in demand, is unique and unheard of for non-gaseous or non-liquid fuel source supply systems and their respective burners. This combination of ON/OFF and linear output response control is unique for solid fuels, especially the wide dynamic range achievable in a preferred burner configuration.

Our disclosure of means and methods to establish and maintain explosible conditions for burning also represents additional discoveries. Our ability to deliver and burn solid powdered fuel, particularly biomass, with substantially 100% combustion completeness in a burner, is a surprising and unexpected discovery. The lack of observable or sensible soot and volatile by-products, combined with near-zero combustion residue (left-over ash, slag, char, unburned particles) attests to this fact. This unexpected benefit involves our choice of a combustion regime afforded by burning a substantially explosible powder in an explosible mix dispersion in our burners. This unique benefit is based on the fluid mechanics and kinetics of burning explosible, high surface area-to-volume ratio powders, which dictate the combustion processes for energy conversion in this special region of gas-particle mixtures which we call explosible.

We have been able to reduce classic and long-practiced prior art conversion of solid fuels to energy, particularly biomass sources, from a cumbersome and inefficient multi-phase process to a substantially single-phase combustion process, acquiring numerous benefits like significantly reduced size combustion devices and cold start capability. By being substantially single-phase in appearance, our process eliminates the time/space consuming necessity of vaporizing volatiles and later slowly consuming char, which dominate combustion of larger, non-explosible particles found in many so-called "powder" fuel distributions including some pulverized coals and wood based hog fuels.

Many will immediately ask why the fuels, combustion techniques, and resulting applications we disclose have not been discovered and developed before. Some with a technical background in the art will be amazed with what is new, and the implications for an entirely new vertical industry, "from farm to flame". Those skilled in the art will immediately be able to build on and practice our inventions. While some old and current applications appear similar, in hindsight the uniqueness and simplicity of our novel and radically different approach to fuel production and energy conversion will be appreciated. The low levels of flue gas VOC's, with no noticeable soot, smell or smoke and the completeness of combustion offered by our disclosed powder fuels and conversion means is indeed surprising and unexpected.

A goal for each new burner design of the present invention is to maximize the near-instantaneous combustion of all explosible particles in the moving explosible dispersion stream with a stationary deflagrating flame wave front, while minimizing the amount of agglomerate, particles, and combustible gases (non-$CO_2$/$H_2O$) surviving the initial pass that must be burned through recirculation, thereby driving substantially to zero any unburned particles remaining thereafter.

A preferred goal for various embodiments of our burner inventions is to establish design and operating process parameters to achieve a heterogeneous combustion regime whereby we have instant ON/OFF and a range of 10× linear BTU/hour control, with the combustion process substantially taking place inside our cylindrical stovepipe burners, enclosures that are surprisingly small relative to prior art.

As detailed elsewhere in our disclosure, the vast majority of combustion completion occurs within the confines of an upward firing vertical burner enclosure, mimicking a single-phase process. For example, when combined with a typical industrial or home forced air (or hot water) type of furnace, the host appliance provides only a system for heat exchange and flue gas handling and heat recovery, plus furnace process and environmental control. When our burners are integrated with such furnaces, there is no sharing of the combustion functions. The same holds true for near horizontal and below horizontal burner implementations of the same basic technology, commonly used for oil fired furnaces.

Our discovery of near-instantaneous combustion of all explosible particles in a small and initially cold burner is a surprising and inventive improvement over comparatively slower combustion prior art practiced in burning hog fuel (see U.S. Pat. No. 4,532,873), current wood chip furnaces with other biomass fuels, as well as pulverized coal (see M. L. Beekes et al.). Typical biomass-based fuels contain substantial portions of larger particulate and sometimes non-explosible powder. To achieve char burnout for complete combustion, a long residence time is usually required in the combustion zone, since the overall mass of larger, oversized particles burn slower, even when "seeded" with powder sawdust or dust in the explosible range.

To operate a burner combustion devices of the present invention, we rely on the use of a substantially explosible powder as the total energy source for conversion. This fuel particle size distribution with its upper limit near the explosible diameter for a given fuel source material is the heart of our disclosure in PCT Application No. PCT/US2007/024044. This unique fuel provides the motivation for development of a burner combustion system tailored to work with such specific explosible distributions to achieve the surprising capability of substantially 100% complete combustion of a solid fuel, using methods that make it behave as if it were a gas operating in a single phase regime.

These inventive techniques are scalable to design burner and Positive Displacement Powder Dispersion (PDPD) system components and combinations to produce a flame from the size of a candle to a megawatt power station burner, yet with substantial apparatus design and configuration differences from current fuel and burner technology art. A primary, but not limiting, focus is small and medium scale residential and commercial plus industrial applications of this energy conversion technology to reduce our dependence on import and utilization of foreign hydrocarbon-based fuels.

A complete burner-PDPD combination of the present invention is convertible and adaptable to various explosible powders, each with their own calorific energy and explosible particle size limit. Tests have been run on flour, pancake mix, confectioner's sugar, and corn starch as well as particle size distributions of various hardwood (74 micron called 200 mesh) and softwood (177 micron called 80 mesh) explosible powders. Bio-scrap such as corn stalks, and field grass, hay, and various woody biomass have also been reduced in test grinding operations using a wide range of commercially-available particle reduction apparatuses and combusted in our burners.

Combustion systems of the present invention have a dynamic range of operation (turn-down ratio) far exceeding that typically found in prior art commercial and industrial burners utilizing biomass products with a great similarity to the adjustability of propane (LP) and natural gas burners found in the common stove.

The technology and combustion regime practiced and disclosure herein is very different from current commercially available burner/furnace combinations that use wood chips and/or powder as a sole source or in co-firing applications. Emissions are ultra low, with no visible soot and no discernable odor.

Focused use of a substantially explosible powder combined with the various burner embodiments in this disclosure allows for attainment of near 100% complete combustion. No significant burner or furnace residence time is required for complete combustion of particles. No significant ash is produced, hence grates common to solid fuel furnaces are not required and regular cleanout of unburned char is not necessary. Staged combustion is not required but may be preferred. We utilize combustion process models very different from many conveyor- and auger-fed furnaces, where substantially all the fuel is burned by two phase combustion, in large, high-temperature, environment reactors where radiation is the primary source of particle ignition and heating.

A focus is to utilize powder forms of biomass including, but not limited to, corn stalks, grass, sawdust, bamboo, wood chips, and chemically-cleaned, ultra-clean coal, as a direct replacement for liquid and gaseous fuels. In our PCT application PCT/US2007/024044, we disclosed the requirements for these powdered fuels to be explosible and process methods of combustion by a deflagrating flame. The present disclosure reaffirms and relies upon material contained in that application, and further discloses a number of methods, systems, and burner apparatuses to perform combustion, thus enabling the use of more powder fuels to provide energy for heat or to perform work.

No one has previously invented the type of combustor/burner system we disclose, because there has been no awareness of the controllable nature of the burning principles required to harness dust explosions, and essentially no supply of the proper explosible powder fuel supply. We disclose a radically new type of burner-PDPD system, designed and developed for "the exclusive use of a substantially explosible powder" continuously supplied and dispersed, then combusted in a substantially explosible mixture.

The goal-directed mindset of harnessing dangerous and therefore feared and avoided dust explosions, combined with the development approach used, delivered us to the point of a series of discoveries that enabled this invention. The combination of our investigative mindset and our prototype development approach is based on unique "out of the box" thinking, that freed us from the very constructs which have bound many other combustion investigators, researchers, scientists, engineers, and inventors for the last several decades, leaving our foundational technology essentially undiscovered and unappreciated until our work began.

Burners of the present invention, with a range of embodiments and preferably designed for use with an explosible powder combusted in an essentially single phase mode, are surprisingly small and simple. In total, the present invention provides a missing piece to the puzzle of biomass energy harvesting and conversion.

The present invention provides methods, systems, and apparatus for one skilled in the art to assemble and utilize this new technology of "harnessing dust explosions" as a means of direct, efficient, and low cost energy conversion of solid fuels.

A burner system of the present invention has not been previously known, since there had been no design nor integration combining the critical combustion principles and carburetion techniques for flow control and dispersion with solid fuel burner designs. No significant supply of the proper explosible powder fuel exists either.

In contrast to coal furnaces, as detailed herein, the vast majority of combustion completion occurs within the confines of an upward firing vertical burner enclosure in one embodiment of the present invention, mimicking a single-phase process. For example, when combined with a typical industrial or home forced hot air, forced hot water, or forced hot steam type of furnace, the host unit provides only a system for heat exchange and flue gas handling, in essence heat recovery, plus process and environmental control. When a burner of the present invention is integrated with such furnaces, sharing of the combustion functions is not necessary.

DEFINITIONS OF TERMS

Before further description of the present invention, and in order that the invention may be more readily understood, certain terms have been first defined and collected here for convenience.

The term "agglomerates" as used herein describes large, non-explosible particles of varying sizes and shapes comprised of numerous small particles self-adhering due to mechanical shear and other factors.

The term "air" as used herein describes a mixture of gases containing free oxygen and able to promote or support combustion.

The term "biomass" as used herein describes any organic matter available on a renewable or recurring basis, i.e. complex materials composed primarily of carbon, hydrogen, and oxygen that have been created by metabolic activity of living organisms. Biomass may include a wide variety of substances including, but not limited to, agricultural residues, such as grasses, nut hulls, oat hulls, corn stover, sugar cane, and wheat straw, energy crops, such as grasses including but not limited to pampas grass, willows, hybrid poplars, maple, sycamore, switch grass, and other prairie grasses, animal waste from animals, such as fowl, bovine, and horses, sewage sludge, hardwood or softwood residues from industries such as logging, milling, woodworking, construction, and manufacturing, and food products such as sugars and corn starch.

The term "blended powdered fuel" as used herein describes a powdered fuel that comprises two or more distinct powdered fuels, each of which may vary in particle size, material, or composition.

The term "burner" as used herein is generic to "burner assembly", and "flame holder" and describes a device by which fluent or pulverized fuel is passed to a combustion space where it burns to produce a self-supporting flame. A burner includes means for feeding air that are arranged in immediate connection with a fuel feeding conduit, for example concentric with it. In patent documents the expression "burner" is often used instead of "combustion apparatus" and not in the restricted meaning above.

The term "burner assembly" as used herein describes a unitary device or fixture, including a flame holder and associated feeding or supporting elements.

The term "char" as used herein describes the mostly carbon solid residue that remains when biomass volatiles are driven off during pyrolysis.

The terms "combustion" and "combust" as used herein, without reference to a type of device, i.e., a combustion device, describe the act of deflagration. These terms are distinguishable from the act of simple burning, which is the direct combination of oxygen gas and a burnable substance.

The term "combustion area" as used herein describes a location where combustion occurs, for example, adjacent to a nozzle or inside an engine cylinder.

The term "combustion chamber" as used herein describes a chamber in which fuel is burned to establish a self-supporting fire or flame front and which surrounds that fire or flame. See also combustor and burner.

The term "combustion device" as used herein describes any system that burns or deflagrates a fuel of any type. Such combustion devices include internal combustion engines, furnaces, grain dryers, and generators.

The term "combustion gases" as used herein describes the exhaust gases produced by burning the fuel, including chemical reaction products (e.g. $CO_2$, $H_2O$, $NO_x$, $SO_x$), water vapor, and the non-reacting air components (e.g. $N_2$). VOC and TOC are ratings used by the EPA.

The term "combustor" as used herein describes a combustion chamber with an igniter. While most of the traditional dictionary sources define combustor in the context of jet engines or gas turbines, papers, reports, and products developed by those practicing in the art refer to burners combining a fuel, an igniter, and an oxidizing gas inside a combustion chamber as a combustor.

The term "combustion zone" as used herein describes the part of an apparatus where the reaction takes place between air and fuel.

The term "complete combustion" as used herein describes a combustion reaction in which the oxidizer consumes the fuel, producing a limited number of products. As such, complete combustion of a hydrocarbon in oxygen yields carbon dioxide and water. Complete combustion of a hydrocarbon or any fuel in air also yields nitrogen.

The term "controlled stream" as used herein describes a movement or stream of particles that may be directly controlled and modified, e.g., by feedback modification, based on parameters flow rate, mass transfer rates, power or heat output, temperature regulation, and the like. The stream may be finely or coarsely controlled as the particular application may require. Moreover, devices, such as sensors described herein below, may be used to provide the data necessary to control or modify the stream. In particular embodiments, the stream may be controlled for the purpose of producing a uniform explosible powder dispersion.

The term "deagglomeration" as used herein describes the act of breaking up or removing large particles comprised of groups of smaller particles self-adhering in clumps.

The terms "deflagrating" and "deflagration" as used herein describe rapid burning with intense heat output and possible sparks in a subsonic combustion that usually propagates through thermal conductivity, e.g., the combusting material heats the next layer of cold material and ignites it. It should be understood that deflagration is distinguished from detonation which is supersonic and propagates through shock compression.

The term "devolatization" as used herein describes the releasing of combustible volatiles and tar from solid wood or other biomass or combustible fuel during heating and is used interchangeably herein with the term "pyrolysis".

The term "equivalence ratio" as used herein describes the ratio of the actual ratio of the explosible powdered fuel to the oxidizing gas to the stoichiometric ratio of the explosible powdered fuel to the oxidizing gas.

The term "explosible" as used herein describes a property of a powder, which, when dispersed under the appropriate conditions as a powder-oxidizing gas mixture, is capable of deflagrating flame propagation after ignition. Explosible powders that form explosible powder dispersions are capable of flame propagation when mixed with the appropriate ratio of an oxidizing gas. Numerous explosible powders, which are distinguishable from "explosive" or ignitable powders, are described in Table A.1 of *Dust Explosions in the Process Industry* (R. K. Eckhoff).

The term "gas" as used herein describes any substance in the gaseous state of matter, which contains a minimum amount of an oxidizing gas, e.g., $O_2$, to produce an explosible powder dispersion, even if insufficient to provide complete combustion, and is used interchangeably herein with the term "oxidizing gas". This term is intended to encompass gases of singular composition, e.g., $O_2$, and mixtures of gases, such as air. This is in contrast to the use of this term as the abbreviated form of the word gasoline, liquefied petroleum gas, or natural gas.

The term "heat exchanger" as used herein describes a device to transfer thermal energy from the hot exhaust gases to a heat transfer fluid that can be water, air, thermal oil, or an antifreeze solution in a combustion system.

The term "heterogeneous combustion" as used herein describes combustion where the two reactants initially exist in different phases, whether gas-liquid, liquid-solid, or solid-gas. Heterogeneous combustion describes a solid particle oxidizing at its surface.

The term "homogeneous combustion" as used herein describes combustion where both reactants exist in the same fluid phase, either gas or liquid.

The term "incomplete combustion" as used herein describes a combustion reaction in which a fuel is incompletely consumed by the combustion. Incomplete combustion produces large amounts of byproducts. For example, incomplete combustion of hydrocarbons may produce carbon monoxide, pure carbon in the form of soot or ash, and various other compounds such as nitrogen oxides.

The term "particle size" as used herein describes the size of a particle, e.g., in terms of what size mesh screen the particle will pass through or by metric description of the size (e.g., in microns). Moreover, certain embodiments of the powdered fuel are defined, in part, by particle size. Particle size may be defined by mesh scales, in which larger numbers indicate smaller particles.

The term "particle size distribution" as used herein describes the prevalence of particles of various size ranges, i.e., the distribution of the particles of various sizes, within a powder sample.

The term "particulate" as used herein describes very fine solid particles, typically ash plus unburned carbon that are entrained by the combustion gases and escape to atmosphere. Usually the main air pollutant from biomass combustion.

The term "positive displacement" as used herein describes a technique using devices that move a known volume of material per unit operation as in per stroke, per index, or per unit time.

The term "powder" as used herein describes a solid compound composed of a number of fine particles that may flow freely when shaken or tilted. The powder composition, particulate size, or particulate size distribution may be selected based on the application in which the powder is being used. "Powdered" is a substance that has been reduced to a powder.

The term "powdered fuel" as used herein describes a combustible solid fuel, reduced in mean particle size to a point where the substantial majority of particles are below its particular explosible threshold and is used interchangeably herein with the terms "explosible powder", "powder", and "fuel".

The term "powdered fuel dispersion" as used herein describes substantially uniform mixtures of powdered fuel and an oxidizing gas, which are selected to be explosible based on the nature of the powder (e.g., size or composition of the constituent particles) and the ratio of the powder to the oxidizing gas and used interchangeably herein with the term "powder dispersion". The explosibility of the powdered fuel dispersion may be affected by a number of factors including, for example, the surface area of the powder particles, the energy content of the powder, the concentration of an oxidizer such as oxygen in the powder dispersion, the temperature of the powder and the oxidizer, the heat transfer rate, and the powder particle size. The terms "powdered fuel dispersion" and "powder dispersion" are also intended to cover those dispersions that include an imperfectly distributed mixture made with an imperfect distribution of an explosible powder, provided that such dispersions are explosible.

The term "pyrolysis" as used herein describes the thermal decomposition of organic fuels (e.g., biomass resources, coal, and plastics) into volatile compounds (e.g., gases and bio-oil) and solids (chars) in the absence of oxygen and usually water. Types of pyrolysis are differentiated by the temperature, pressure, and residence (processing) time of the fuel, which determines the types of reactions that dominate the process and the mix of products produced. Slow (conventional) pyrolysis is characterized by slow heating rates (0.1 to 2° C. per second), low prevailing temperatures (around 500° C.), and lengthy gas (>5 seconds) and solids (minutes to days) residence times. Flash pyrolysis is characterized by moderate temperatures (400-600° C.), rapid heating rates (>2° C. per second), and short gas residence times (<2 seconds). Fast pyrolysis (thermolysis, using the fast pyrolysis experiment of Nunn et al., 1985) involves rapid heating rates (200 to 105° C. per second), prevailing temperatures usually in excess of 550° C., and short residence times. Currently, most of the interest in pyrolysis focuses on fast pyrolysis because the products formed are more similar to fossil fuels currently used.

The term "secondary air" as used herein describes air supplied to the combustible gases liberated by the primary air in order to complete their combustion. The term secondary air includes tertiary and higher order airs.

The term "single-phase combustion" as used herein describes combustion where fluid mechanics single temperature and single velocity assumptions can be made. Gases such as propane and methane burn in a single phase regime, whereas gasoline and wood chip combustion is inherently two phase, liquid-gas and solid-gas respectively. Explosible powders, including sufficiently small particles under the proper circumstances and mixed at the molecular level, burn indistinguishably from and as if they were gases in a single-phase regime.

The term "stoichiometric" as used herein, for example in "stoichiometric combustion" or "stoichiometric mixture", describes the ratio of the explosible powdered fuel to the oxidizing gas in the powdered fuel/oxidizing gas mixture, i.e., a powdered fuel dispersion of the invention, that is suitable to support deflagration and substantially consume the explosible powder in the mixture or dispersion. The stoichiometric amount of oxidizing gas necessary to consume the explosible powder in the combustion area may be distinguished from the amount of oxidizing gas of the powder dispersion, which is sufficient to create an explosible mixture yet is typically lower than the total amount of oxidizing gas that is ultimately capable of consuming the powder. As such, powders of the present invention may be explosible even without a stoichiometric amount of an oxidizer.

The term "turbulent flow" as used herein describes fluid flow having the following characteristics: three-dimensional irregularity, diffusivity as in mixing, a large Reynolds number, dissipative in turning kinetic energy into heat, and continuum where the smallest scales are much larger than molecular scale, and is a property of the flow, not the fluid.

The term "turn-down ratio" as used herein describes a numeric ratio representing highest and lowest effective system capacity. Turn-down ratio is calculated by dividing the maximum system output by the minimum output at which steady, controlled, efficient, pollution-free combustion is sustainable. For example, a 4:1 turn-down indicates that minimum operating capacity is one-quarter of the maximum.

The term "turbulent combustion" as used herein describes a combustion characterized by turbulent flows. In certain embodiments of the invention the deflagrating combustion is turbulent combustion, which assists in the mixing process between the fuel and oxidizer.

The term "volatiles" as used herein describes organic vapors and gases released from biomass during low temperature heating, including that portion of biofuels that is converted to vapors and gases during pyrolysis, i.e. all components other than residual char. "Volatile mass" as used herein describes the mass of the powder fuel particles that includes material or compounds, such as water, which vaporize or volatilize at or below the combustion temperature of the powdered fuel.

Basic Concepts about Explosible Particles

Basic combustion is rooted in fluid mechanics theory and other science. A powdered biomass fuel of the present invention burns like a gas for the following simplified fluid mechanics based reasons: 1) The time scale over which a particle (solid or liquid) interacts with the surrounding gas phase scales with R where R is a length scale (radius) of the particle. 2) As R decreases, the time required for particles to reach equilibrium with the surrounding gas phase goes down with the value of R.

3) As the particle R further decreases, the thermal equilibrium time becomes small compared to the time required for other processes such as diffusion and devolatization to occur. 4) At that critical particle radius R and below, a mixture of those particles and air is "explosible" under some definable conditions. 5) The explosible mixture can be dealt with mathematically as if a mixture of two gases, because a single-phase approximation works.

The following points form a technical preamble and introduction to the use of substantially explosible powdered fuels. 1) A powder-air mix is "explosible" when it supports combustion as a wave process, rather than more common burning in an ideally mixed reactor (i.e. furnace).

2) Explosible combustion of a solid fuel granular-air mixture happens when a particle's heating and combustion time is close to the time required for the passage of a combustion wave, and the reaction energy is such that the combustion energy released in the wave continues to be sufficient to raise the temperature of the adjacent zone of unburned fuel-air mixture above its ignition temperature.

3) A granular solid fuel dispersion in an oxidizing suspension is "explosible" when the particles are small enough for single-phase/single-velocity/single-temperature fluid mechanics approximations to accurately describe its behavior, and the dispersion is presented for combustion at an ignitable, hence explosible concentration.

4) The dynamic relaxation time for a single particle in a gas scales with $R^2$. As the particle diameter decreases below its material specific explosible size upper limit, the difference between the two-phase behavior of a solid particle-gas mixture and a single-phase gas-gas mixture disappears.

5) An "explosible" solid fuel powder behaves indistinguishably from gaseous or liquid fuels under proper conditions. A granular solid fuel, when dispersed in an air suspension, can be made to move as a gas and behave in combustion as a "pseudogas", all without actually being one.

6) Any biomass or chemical solid fuel source, can, by reduction to a particle size below its specific critical value, be considered an "explosible" powder. The cost of reducing a solid fuel from a non-explosible form, to a particle size that renders it "explosible", is small compared to the cost to convert it to a real liquid or gaseous fuel.

The main foundational technology of our discoveries falls in a gray zone between three large bodies of knowledge, with fluid mechanics, kinetics, and dynamics on one corner of this unstudied and therefore unreported abyss, industrial dust explosions on another, and the engineering design of combustion systems including burners, boilers, furnaces, and other heat using/producing equipment on the third.

The integrated technology disclosed herein is neither directly addressed nor covered by any of the three. While we have gained confirmation of the science behind our discoveries and furthered our understanding from the theoretic and practical experiences available from each body of knowledge, none has predicted our inventions.

Many of the experts that write about industrial dust explosions are not necessarily well versed in the fields of fluid mechanics and combustion dynamics theory, but their research into dust explosions and mitigation is useful to some topics in this disclosure.

The particle distribution density in an oxidizing gas that supports dangerous dust explosions is a range of concentration spanning more than two orders of magnitude, from 50 to 100 g/m$^3$ to 2 to 3 kg/m$^3$. While Eckhoff (*Dust Explosions in the Process Industries*, 3$^{rd}$ Edition, Rolf K. Eckhoff, 2003, Elsevier, hereby incorporated by reference) describes this range as "quite narrow", it actually defines a wide controllable process range for our invention, whereby we perform energy conversion of a dust-like explosible powder with a stationary deflagrating flame wavefront balanced with and surrounding a moving, premixed explosible powdered fuel dispersion in a burner.

In "The [Popular] Science of a Grain Dust Explosion" (R. K. Eckhoff) the critical parameter is grain dust particle sizes at 0.1 mm or below. As the particle size decreases, the risk of an explosion increases. Concentration contributes to the dust's flammability and must be between 40 grams per cubic meter and 4000 grams per cubic meter according to this source. The actual limits vary based upon particle size, composition plus temperature and humidity, and may differ slightly from Eckhoff's reported range. Also, the dust must be in suspension, not just accumulated in layers, for an explosion to occur.

Serious damage occurs only when there are both primary and secondary types of dust explosions. An ignition source initiates the primary explosion, producing a shock or blast wave that propagates throughout an area loaded with dust layers, suddenly raising this large supply of idle dust into air suspension. This highly-explosive fuel-rich suspension may be ignited within microseconds by the primary dust flame, and the results are catastrophic.

Fluid Mechanics Background to Combustion of Explosible Powders

This section provides a basic description of combustion of an explosible powder with emphasis on deflagration and flame speed. In contrast to a dust explosion, where the dust is stationary in a confined space prior to ignition and the flame wave moves during the explosion, in a burner system of the present invention, the fuel dispersion is moving to an open space and the flame is stationary. A flame is produced when a flammable fuel source, an oxidizer, and a high-temperature environment, such as an ignition source of the present invention, are all present. As long as the three components are present, the flame will continue indefinitely.

From a fluid mechanics standpoint, in the present invention the deflagration of substantially explosible powders is built on a portion of theory that fluid mechanics scholars and practitioners have not yet explained as a whole. While we are not exploring a previously-unknown branch of fluid mechanics, there is no one body of knowledge as of yet describing our unanticipated discovery concerning the application of these phenomena for the purpose of ON-OFF controllable energy conversion in fluid mechanic, kinetics, combustion, or heat transfer terminology and theory.

It is indeed ironic that this region of operation has been avoided by virtue of its most important phenomenon, dust explosibility. The present inventors have discovered amazing benefits from the generous and forgiving properties of combustion in what fluid mechanics calls single-phase combustion of solids. Specifically, while operating in a profoundly single-phase mode, premixed explosible powders have a far wider operating range in terms of stoichiometry, than do the commonly known fuel gases such as propane, methane, and gasoline to name a few.

Figure 12A:
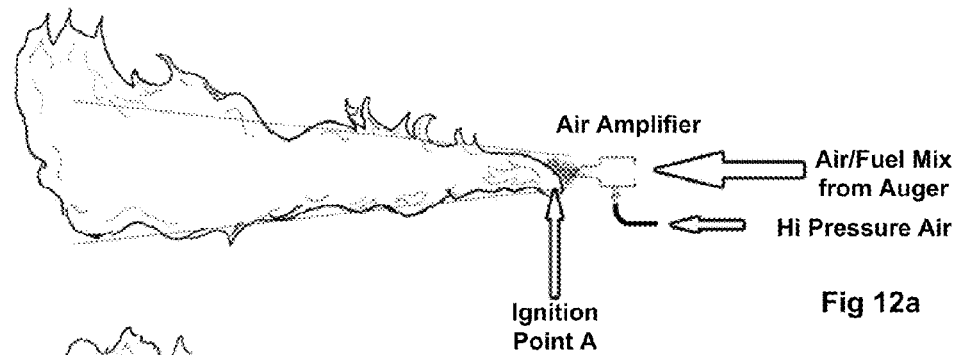
FIG. 12A-D shows unconfined free space ignition at four ignition points in a horizontal explosible powder fuel dispersion.
Figure 12B:
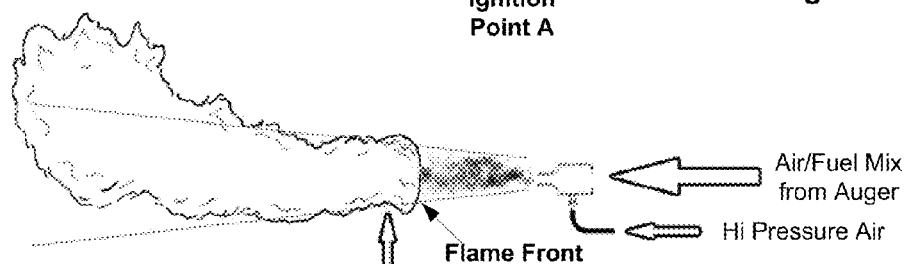
Figure 12C:
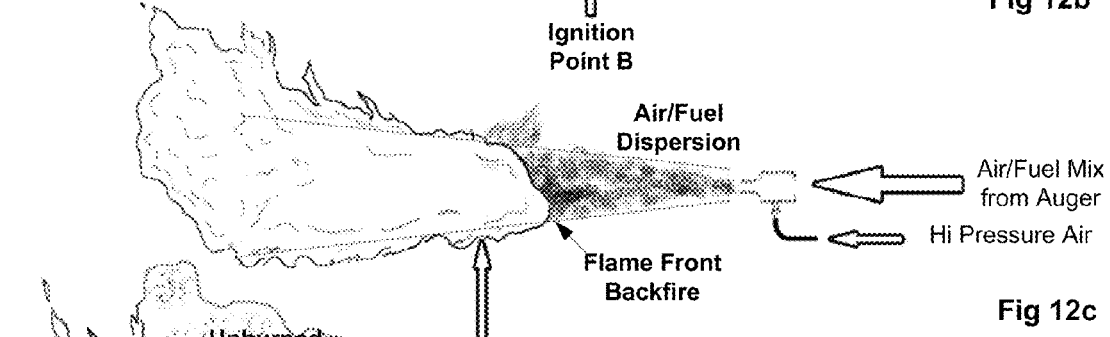
Figure 12D:
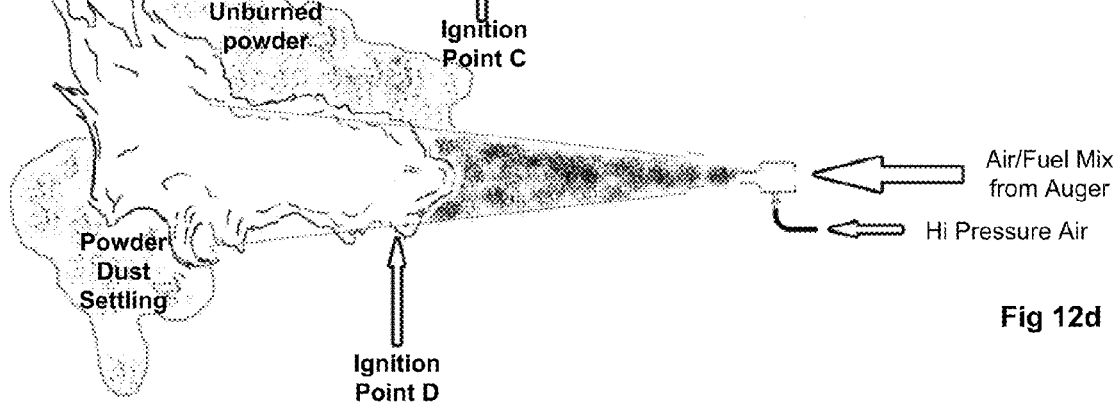
Figure 13:
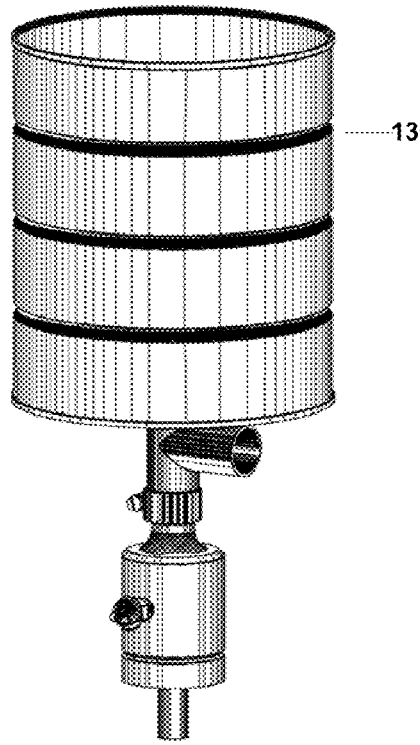
FIG. 13 shows a first can embodiment of the present invention.
Figure 14:
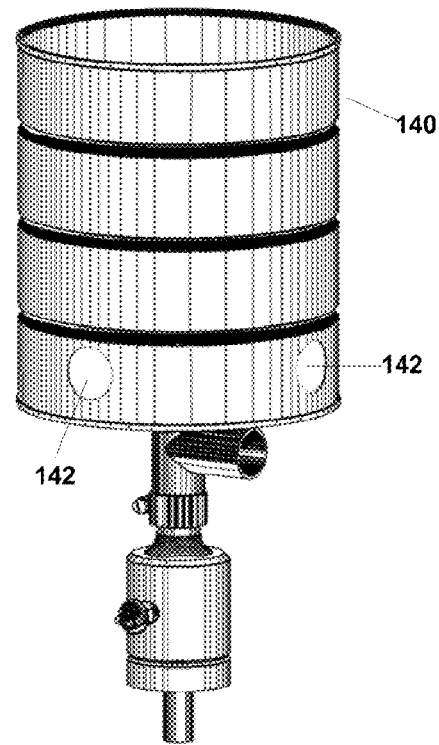
FIG. 14 shows a can embodiment of the present invention with secondary air holes.
Figure 15:
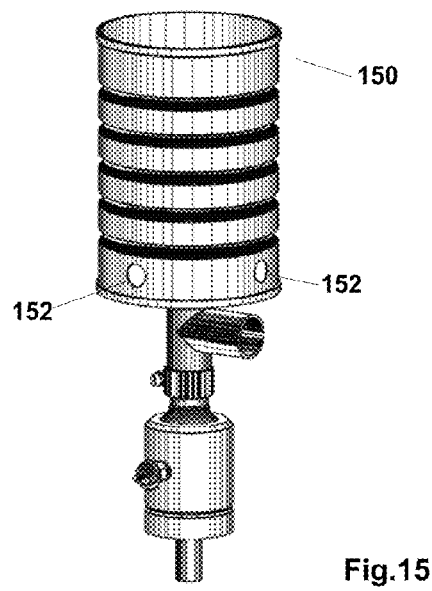
FIG. 15 shows a small can of the present invention with secondary air holes.

When a Positive Displacement Powder Dispersion (PDPD) feed system of the present invention disperses an explosible solid fuel, suspended in an oxidizing gas, horizontally into any open space (see FIGS. 10A, 10B, and 11), this moving stream, which is initially well above stoichiometric, begins to slow and diverge, becoming ready for ignition. An arc igniter or propane torch flame instantly ignites this explosible mixture with a noticeable "whump" sound a few inches downstream of the PDPD feed nozzle as shown in FIG. 12A.

This unconfined and stationary flame front immediately consumes unburned solid fuel particles in the moving stream, travelling "upstream" at a near equal and opposite velocity of about half a meter to a few meters per second. If the velocity of the flame front remains highly subsonic, this combustion phenomenon is called deflagration, which means "to burn rapidly". In certain process flow and confinement situations, the flame propagation velocity may increase to near or beyond the speed of sound, producing detonation, a very intense explosion resulting in shock wave generation in the air-fuel mixture and surrounding area. This is not a common event in such an unconfined environment, as a local, stationary deflagrating flame is our method of combustion in this moving stream, travelling at the flame speed but never far from the ignition zone.

A lot can be understood about the process by first discussing deflagration. Burning rapidly, deflagrating flames are produced by chemical reactions between "very finely divided fuel and oxidizer particles". The speed with which a deflagrating flame moves through a near-stoichiometric mixture is related to the fuel ignition temperature, its calorific value and particularly to the particle or grain size of both the fuel and oxidizer, which may be in solid, gas, or liquid states. Biomass fuels ground to be explosible powders have a surprisingly high calorific output. In general, it is safe to say that the greater the uniformity of this mixture and the finer the fuel explosible powder is ground (up to a point below 80 µm), the faster the flame speed at which it burns.

From a fluid mechanics perspective, balancing the mass flow velocity of the premixed explosible fuel with the deflagrating flame front/wave velocity produces a stationary and stable combustion front and reaction zone. Central issues here are a 500-to-1 to 1000-to-1 density difference between the powder and gas and the low flame speed. The faster the stream speed, the easier to keep the powder suspended, but increasing the stream speed high enough above the flame speed blows it out.

Referring to FIG. 1A, a particle small enough to be explosible has a large surface-to-volume ratio and burns in a different modality from non-explosible larger particles of the same material with a far lower surface-to-volume ratio. This modality is called single phase combustion. Yarin and Hetsroni (*Combustion of Two-Phase Reactive Media*) describe combustion of explosible particles in an explosible mixture as having no gas-phase mixing and no gas-phase combustion. For particles in an explosible mixture, the particle temperature does not vary with radius, but only with time. "Single temperature" behavior is part of what makes our combustion process appear essentially single-phase. For particles small enough to be explosible, burning occurs at the surface of the particle. Combustion time, including time for moisture elimination and devolatization, is short compared to the deflagrating flame front transit time. This type of "flash burn" is near instantaneous, but it can be delayed if the combustion becomes diffusion-limited by the ability of oxygen in nearby air to further support combustion due to lack of supply.

In what is called a heterogeneous reaction, the solid fuel burns in air in a single phase process as if it were a gas or vapor fuel for the combustion of substantially explosible powder particles, even though initially these two reactants exist in different solid and gas phases. The reaction between the oxygen and the explosible solid particle at its surface consumes the particle in a flash burn in a single-phase surface reaction. For particles larger than the explosible limit, the reaction process is termed homogeneous, since substantial devolatilization produces outgassing of fuel vapor, which reacts with oxygen in the air in the gas phase of a two-phase reaction. In the present disclosure, the term homogeneous, unless otherwise stated, has nothing to do with the uniformity of the mixture and its lack of gradients in particulate dispersion and temperature.

Particles burning in the explosible powder fuel regime do not outgas volatiles. As discussed by Yarin and Hetsroni, as the fuel particle size goes down, the particle heating rate goes up and combustion time goes down. At a sufficiently small particle size, pyrolysis time (required to outgas volatiles), although it has become extremely short, is still large compared to particle combustion time. That is where the process dividing line is. Below that size, oxidation processes take place at the particle surface at a rate limited by oxygen diffusion, and hence no sensible volatiles are produced.

R. I. Nigmatulin (*Dynamics of Multiphase Media: Volume 1*) discusses the propagation of a combustion wave in two-phase processes, which is described as "gas-solid combustible particles". This process is defined by interactions amongst hydrodynamic, thermophysical, and chemical processes. His theoretical analysis of the interactions of these phenomena involves a system of equations that treat hydrodynamics, heat and mass exchange, and chemical kinetics in a two-phase medium, with descriptions of assumptions that can be made to reduce it to single phase.

The actual mechanism of combustion propagation in mixtures of combustible particles in a gas depends on the particle-burning regime, powder fuel concentration, burner combustion chamber geometry, and the actual method of initiation (sustained ignition). Like our process, Nigmatulin states that propagation velocity or flame speed of the combustion wave front ranges from centimeters to a few meters per second. We estimate the flame speed response surface range of explosible powders tested to be in the neighborhood of half to about a meter per second, varying with the equivalence ratio.

The three possible particle combustion regimes are: heterogeneous—our modality, quasi-homogeneous—the combustion of fuel vapor and gasification by-products, and vapor-phase—the combustion of volatile components.

Particle size is the prime criterion determining the regime of combustion. With heterogeneous combustion in a general form, actual burning occurs at both the surface and within the combustible fuel particle. Heat from the combustion chemical reaction is transferred directly to the particles to maintain ignition temperature. Particles of small enough diameter, which are free of or have minimal volatile organics, such as graphite, electrode coal, and other powders, burn this way.

Larger particles falling outside the explosible range, with considerably lower surface to volume ratios, combust in a combination of the indicated regimes. Part of the reaction occurs in one regime, in this case a vapor-phase regime, followed by another portion of the reaction in the heterogeneous regime.

As particle sizes increase beyond explosible, the time required for devolatization in the vapor-phase becomes significant. The effect of levels of percent volatiles becomes limiting. Combustion occurs in a virtual thin layer around a droplet or particle in the vapor-phase in what Nigmatulin calls a microflame or an F-phase. Local temperatures are not uniform, as the spherical flame layer temperature is greater than the drop or particle temperature, which in turn is greater than the temperature of the surrounding gas. Particles of coal, powder, explosives, wood particles and chips in suspension burners, metal and diesel fuel droplets combust in this regime until their volatile components totally burn out.

Ignition occurs when the particle's surface temperature rises to a certain level. A heterogeneous regime stage of "slow" burning occurs, and if the regime is vapor-phase, the vaporization or gasification stage occurs. Before any phase transitions occur, the gas heat flux to the particle surface actually penetrates the particles. In our case, the major portion of the temperature difference occurs in the gas, so the average temperature of the surrounding gas and the particles just prior to ignition are approximately equal, or single temperature. The Nusselt number, a dimensionless ratio describes the heat exchange.

For the more specific regime of heterogeneous particle combustion, Nigmatulin states that there is no F-phase in the regime, along with no fuel vapor, and that the heat of chemical reaction is transferred directly to the particles. The reaction rate constant for this heterogeneous particle combustion regime is given by the Arrhenius law and described by the empirical formula for the dimensionless Nusselt number. For our disclosure, the Sherwood number describing the diffusion influx of the oxidizer to the particle's surface indicates a diffusion regime of burning, not a kinetic one, since at the wave front of the reaction zone, the process goes from kinetic to diffusion, per Yarin and Hetsroni.

A candle flame burns in a single phase combustion process, yet it is common to get smoke and soot from it. Similarly, a kerosene flame is a single phase combustion process, yet it too produces smoke, some soot and detectable aromatic vapors. Portable kerosene heaters such as the Kerosun® or salamander type heaters prove the point. Most everyone is familiar with the smoke produced when two phase combustion processes are "fuel-rich", running on too little air for a given quantity of fuel. Yard equipment such as lawnmowers, chain saws, snow blowers, and the like smoke profusely when partially choked and running fuel-rich. This smoke signifies that the engine is operating above the proper stoichiometric fuel-to-air ratio (FAR). Likewise, fresh logs, thrown atop a hot bed of coals, smolder and smoke prior to eventually bursting into flames. This phase of combustion is actually producing volatile, rich, combustible woodgas in an operating environment of too little air, more specifically at about three times the stoichiometric FAR. It is by this basic oxygen-starved process that woodgas is produced for use as an alternative fuel.

Unlike with the lawn equipment and stove wood examples above, the present inventors have run 80-mesh pine explosible powder (~177 microns mode particle size diameter) with so little primary air and so much fuel that the particles begin to drop out, yet no smoke or soot is produced! This is an amazing phenomenon for a material which only differs from a pine log physically in its size. Yarin and Hetsroni describe a stoichiometric state of fuel:air ratio as having a value of λ (lambda)=1. This dimensionless number is called the equivalence ratio in the present disclosure. A rate twice stoichiometric has a λ=2. Our burner tests, running purposely fuel rich, have had values of λ=3 to 5+, yet burned without smoke or soot from a grossly over-rich fuel mixture.

Although it is a bit of an oversimplification, it is useful to view the issues of smoke, soot, and char production as practically non-existent when burning explosible powder in an explosible mixture, whether near stoichiometric or not. The particles either burn completely and nearly instantly if adequate oxygen is present, or they do not burn at all with insufficient oxygen, simply heating to combustion temperatures. The only charred particles collected so far have been significantly oversized and therefore non-explosible by definition.

Figures 4, 7:
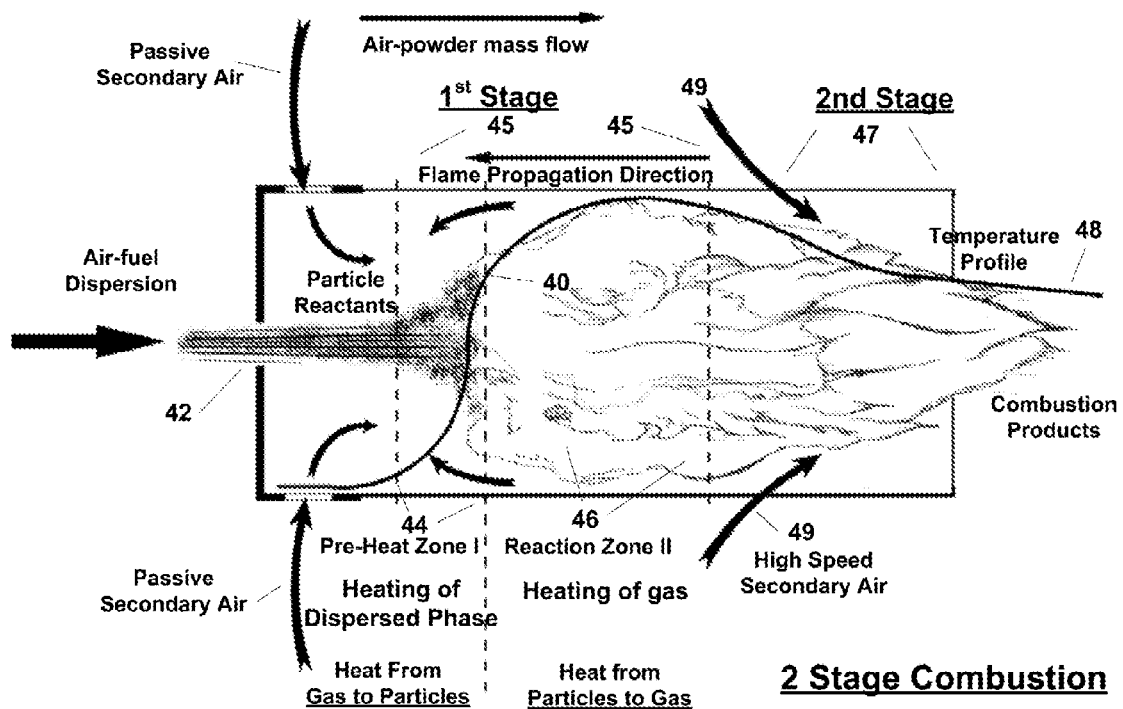
FIG. 4 shows graphically two-stage combustion of a stationary deflagrating flame wave front at the interface of a moving stream of premixed solid particles in an oxidizer.
FIG. 7 shows volatile organic compounds (VOC's) from a flue gas analysis.

The burners of this disclosure take advantage of these facts, particularly the wide range of equivalence ratio that supports combustion from slightly less than λ=1 (lean) to nearly λ=10 (10× stoichiometric). Simply put, we preferably utilize a two-stage combustion process as depicted in FIG. 4. The first stage comprises the heating side where the cold mix of air and particle reactants is pre-heated by the gas, and initial combustion begins at the stationary deflagrating wave. As particles move into the reaction zone, heating continues, now from particles to gas, and combustion continues until available oxygen is depleted. The particle combustion time constant in this stage is a function of its radius, $T_{1st\ Stage}=f(r)$.

The second stage begins in the reaction zone when active high speed secondary air travelling, for example, at 10 times the flame speed enters the burner enclosure, to increase the turbulence and supply much needed oxygen to the waiting hot particle mix. Combustion resumes and moves toward completion of char burnout. Particle combustion in this second stage far more rapid, as the time constant is now a function of its radius squared, $T_{2nd\ Stage}=f(r^2)$.

Far outside of the stoichiometric region, a powder-air mixture of the present invention may still be explosible, and yet follow the same laws as a single phase methane hydrogen gas mixture in air. The surprising difference is as follows. A powder-air mixture, acting as a single-phase mixture in combustion, is still explosible at several times stoichiometric, whereas a true single phase methane-hydrogen-air mixture, with the same over rich λ equivalence ratio (high fuel to air ratio) is non-explosible. Surprising but true.

If, for a given low air flow and overly rich fuel mixture, we continue to add powder, further increasing λ, eventually at some point the mass is so great and the particles so closely spaced that the feed stream becomes a "thermal ballast", absorbing the heat of combustion, and burning is not sustained.

When we blow an explosible powder-air mixture into one of our "stovepipe" burners at λ=2 or 3, we get a complete combustion of portions of the explosible powder mass until the oxygen inside the combustion chamber is depleted. Initial first stage burning in the wavefront occurs at the surface of the particles and, in this case, becomes diffusion-limited by the supply of oxygen in nearby air to further support combustion. At this oxygen-starved operating point, a portion of the powder fuel mass not only remains unburned, but also much is uncharred with no significant pyrolysis begun. Combustion so far has remained single phase. The unburned portion of the explosible powder mass continues ballistic travel beyond the dying flame front toward the top exit of the burner. As will be discussed in detail later, the addition of secondary air to this oxygen-depleted region demarks a second stage, where diffusion-limited combustion resumes far faster.

Without secondary air, when the heated, oxygen-starved mixture emerges at the burner top exit, it ignites and combustion recommences. At no time in this oxygen-starved situation is any observable or sensible smoke or soot produced. The powdered fuel primarily either burns or it does not. We have observed no significant middle ground with particle sizes within the explosible range.

At values of λ below 1, an explosible powder-air mixture follows single phase gas laws quite nicely, whereas at values of λ≫1, these rich mixtures may reach a point where they do not. If λ=2, burning at the particle surface doesn't change, only the concentration per cubic meter does. For explosible particles, surface burning characteristics do not change and do not matter for combustion.

When an explosible mixture of an explosible powder is blown horizontally into an open atmosphere with no containment, the burning may be described as a heat transfer process, where particles arriving at the stationary combustion wavefront are warmed up through gas conduction by the proximity of others burning. The turbulence that does occur is usually generated by shear around the outer volume of the moving air-powder dispersion in response to the Bernoulli Effect and gas thermal expansion from combustion.

When dealing with small particles of an explosible powder with a particle size in the explosible range, the percentage of volatiles has no significant or limiting effect on the combustion process. While combustion articles comparing pulverized coal powders do not exactly agree with this statement, the conflicts may be related to energy release per unit of coal for types with different percentages of volatiles, rather than disagreement on the regime of burning. For single-phase and multi-phase combustion, when a particle is small enough to be explosible, its heterogeneous surface burning behavior enables single-phase fluid mechanics approximations to be applied, and in deflagration it behaves as if it were a single phase combustion process.

At most of the desirable operating conditions, a combustion process of the present invention is simple, since it is profoundly single-phase in behavior. This sole, single-phase burning appearance as a solid combusts like propane, renders moot objections, concerns, and challenges that may be raised about the discovery and uniqueness of our disclosures. Perhaps the most beneficial result of this regime of burner operation is approximate 100% combustion completeness with incredibly low levels of byproducts (see FIG. 7).

As described by Yarin and Hetsroni, large particles have a very distinct devolatization state, which requires a longer time to complete than the near-instantaneous flash burn of particles comprising an explosible powder. For particles above the explosibility threshold (200+ microns for wood) to the 1-mm range (1000+ microns), devolatization time is relevant and increasing. For particles too big to be explosible, combustion occurs in a two phase process, involving moisture elimination, devolatization/pyrolysis, outgassing of combustible vapors, and smoke generation, followed by burning of char to essentially complete the combustion.

When operating in the explosible particle size distribution region to combust substantially explosible powder, only single-phase phenomena are observed. Pyrolysis-devolatization is not relevant in this region, as the predominant particle temperature relationship is to time, because the temperature gradient across the diameter of the particle this small is essentially zero.

Multi-phase combustion phenomena are observable when chunks, either large particles or agglomerates of small ones, are burning. These chunks follow ballistic trajectories often taking them out of the burner onto the floor beyond the leftmost area of gravitational powder particle settling shown in FIG. 11.

When particles are larger than the explosible range, the combustion process is multi-phase. When particles are within the explosible range, phenomena such as swelling, devolatization and outgassing are not observed, possibly occurring within milliseconds and therefore not of concern.

Figure 2A:
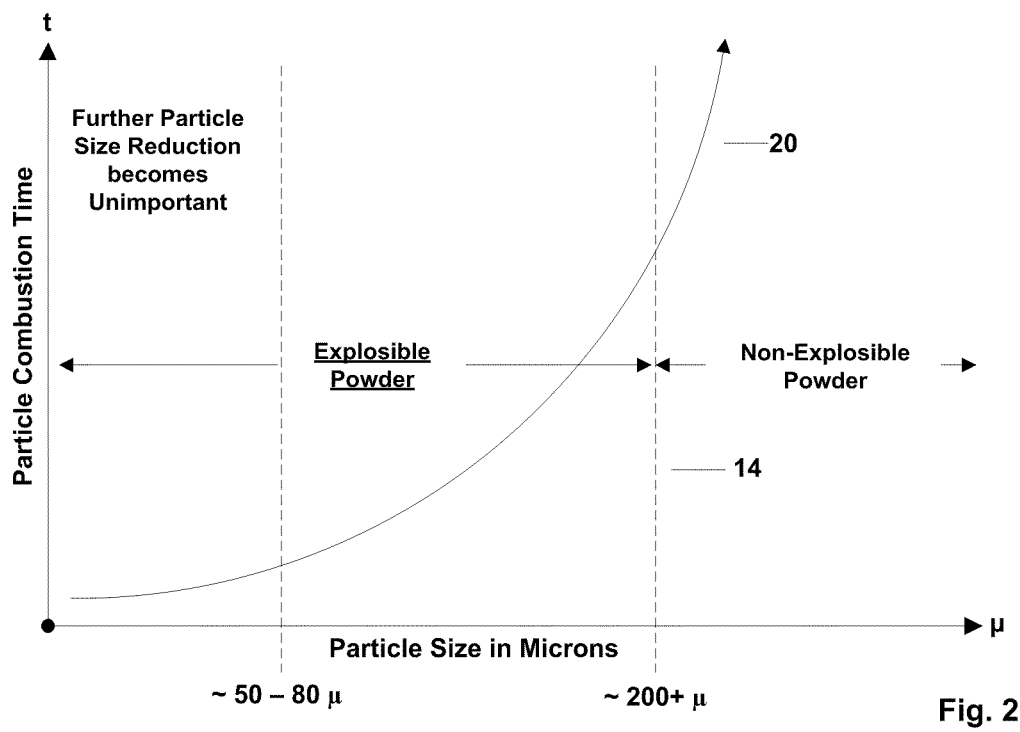
FIG. 2A shows schematically particle combustion time versus particle size.
Figure 2B:
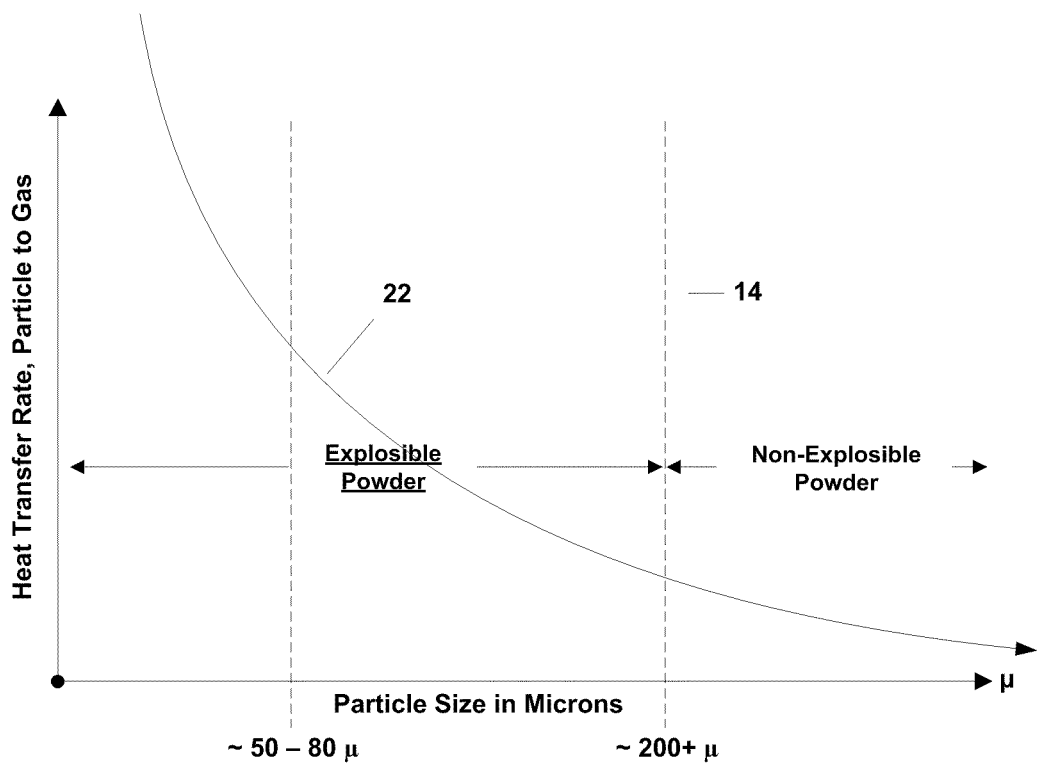
FIG. 2B shows schematically heat transfer rate part to gas versus particle size.

Time-consuming devolatization is only a concern when the temperature of a particle varies significantly with its radius, or along the radius (see FIGS. 2A and 2B). This is a typical characteristic of larger particles outside the explosible range, from coarse powder to sawdust to logs, all of which combust in a two-phase regimen. Devolatization occurs and limits combustion speed with significance only outside the explosible range where we do not claim substantial operation (see FIG. 2B).

The flame speed and particularly the primary air-fuel mixture feed speed differences from pulverized coal are important to understand. Powdered solid fuel of the present invention is transported through a nozzle together with primary air in a dispersion at a low speed above the flame speed, for example twice the flame speed. The stream slows, diverges, and is ignited, forming a stationary standing wave flame front riding on and burning around the fuel-rich core of the flowing explosible powder-air stream.

With a burner of the present invention, there is no requirement that the combustion zone and enclosure ever be at radiant temperatures like with traditional and custom methods for burning various forms and particle sizes of pulverized coal. The fact that the stability of our deflagrating flame front is well-maintained and supported in a heterogeneous combustion mode without requiring any radiant heat transfer is a key point of uniqueness, differentiating our invention from prior art.

As a further example and comparison, classic techniques include feeding pulverized coal mixed with primary air in a suspension into a furnace/burner at a rate of twenty or more times the flame speed, a process parameter that would not work within our invention disclosure. Only by virtue of sending the coal premix into a reactor with controlled high temperature radiating walls is sustained and complete combustion possible under these conditions. For our invention, burner wall temperatures are not important to initiate and sustain combustion, and no large ideally-stirred reactor is required. These are significant differences.

For direct comparison, in the prior art, dry pulverized coal may be transported through a nozzle together with primary air at a high speed (up to at least 56 ft/s, according to Y. Kwan et al. in "*Advanced Coal-fueled Combustor for Residential Space Heating Applications*"), more than an order of magnitude above the flame speed (10 to 30 times greater) into a burner, which is a small reaction chamber emulating a large one. Some designs then continue the combustible flow into the actual furnace, a large reaction chamber where combustion is completed, with ignition initiated by the mechanism of radiation heat transfer (P. M. Krishenik, "Modeling of Combustion Wave Propagation in a Carbon Dust/Gas Mixture"), rather than particle-to-gas heat transfer as is utilized in the case of our combustion burners.

Ballester et al. tested a prototype burner with two types of coal, bituminous and lignite, and oak sawdust powder. The design was to burn powder in a regime where heat transfer was primarily radiant as in a high temperature reactor. The large power station-oriented coal combustion experts, like all their peers over the years, completely missed the fact that their two coals were pulverized in the 20 to 40 micron range and were in fact of explosible size. Rather, they performed their tests and comparisons with biomass oak dust having particles too large to be explosible ($\chi_w \ll 1$), by blowing the fuel into a high temperature chamber of 2000° F. or higher, often at 40 to 60 times the flame speed. In such chambers, the vast majority of the heat transfer is radiant from the chamber walls, thereby igniting and combusting the entire distribution in a two-phase regime, where time and space are not significant limitations, and the value of $\chi_w$ does not matter much.

It is important to remember that in most large furnaces there exists an iron-clad lower limit on combustion rate, the minimum fuel mass flow rate to keep the combustion zone at combustion temperatures so that ignition of particles, large and small, continues as new fuel reactant arrives. The net result is that furnaces and burners designed to emulate their high temperature radiation-based ignition environment have a far narrower operating range and a far smaller turndown ratio than a far smaller burner of the present invention.

It is also important to compare to pulverized and ultrafine coal powder combustion burner strategies utilized in this DOE final report from 1989 by Y. Kwan et al. Our whole concept is different than the strategies utilized in pulverized coal powder combustion burners and large power plants, as demonstrated by the following combustor design and operational comparisons:

A burner of the present invention is not required to be integrated with a big furnace-radiating reactor volume for combustion completion. No atomization is required. Our primary air-fuel mixture is fed from the nozzle at just above the flame speed, whereas a coal powder premix is sprayed at 10 to 30 times the flame speed. Our burner is completely standalone for operation, while coal burners must be connected to a large furnace refractory. Our burner is small in size, not burdened by coal combustion design goals and complexity common to large furnaces.

The DOE coal combustor required pre-heating the fuel, a quarl and refractory (a 10% energy loss), pre-heating of secondary air, as well as hot gas injection and/or external flue gas recirculation. We have none of these requirements!

Our burner preferably uses a simple spark igniter and continues with self-sustained combustion and no further or external ignition intervention required. The DOE combustor needed oil or gas fuels for a pilot light to initiate and initially sustain ignition, heat the combustor, and stabilize the flame. We require none of those heating functions or hardware. While our burner is self-sustaining through a simple conduction regime, the DOE unit design emulated the radiation heating found in typical coal furnaces to ignite particles continuously. No standard coal combustor would sustain a flame if disconnected from the irradiative furnace reactor! Our burner is standalone. When it comes to size, the DOE burner's "BTUs per hour per cubic foot" is far lower—perhaps one-tenth of the output per cubic foot of a burner of the present invention.

However surprising, our burner can in fact burn cold, dry powdered coal of the proper particle size using our fluid mechanics combustion regime just described.

When secondary air is included, as in a number of embodiments of the present invention, combustion of an explosible fuel-air mixture begins instantly in an initially cold burner, is sustained through kinetic particle to gas conductive heat transfer, and is completed substantially within the burner itself, rather than in a large, pre-heated furnace reactor driven by radiation heat transfer, which is typical art for pulverized coal.

The DOE-sponsored final report on combustion devices for home heating using coal included pulverized coal industry combustion design and operating principles, which are clearly different from burners of the present invention. Their burner took 70 minutes to come up to operating temperature, even using pulverized and dry ultrafine coal (DUF), whereas our burner has practically instant ON-OFF capabilities and can be running in the operating region in well under 5 seconds.

A preferred use of our burner in many applications is as a single burner. It is not initially intended to be used in vertical banks or arrays of multiple near or below horizontal burners, although there is no intent to be limited by this design goal. It is not intended to burn coal dust slurries. It is designed to operate in a single-phase combustion regimen.

Others have chosen to pulverize coal prior to combustion for a variety of process and economic reasons. Coal is far easier to pulverize than many biomass and other powder source fuels. Some coal particle distributions have contained a significant amount of particles in the explosible range, others substantial, yet they have not been combusted using the theory and practice of the explosible mode and single-phase combustion regimes we disclose. The same holds true for various types of hog fuel. Rather, this pulverized fuel has been and is being combusted using processes and two-phase regimes with classic burner and furnace ideally stirred reactor technology, hardware, techniques, and approaches.

One skilled in the art may easily differentiate the present invention from the prior art by noticing what is not important or required to practice our disclosure versus current art examples given. This comparison, combined with the radically different fluid mechanic single phase regime emulation and methods practiced further substantiates the uniqueness of our disclosure.

DETAILED DESCRIPTION OF THE FIGURES

FIG. 1A shows two curves 10, 11, conceptually depicting two particle size distributions. An important component to our unique powdered fuel energy conversion process is our preferred use of a substantially explosible powder as a fuel, with particle sizes from a few microns up to the neighborhood of 200 microns, as seen in curve 10.

Wood particles much larger than 200+ micron limit are not typically explosible, burning more slowly in a common two phase regime. The actual size limit for explosibility varies for different types of biomass and other explosible powders based on a number of variables which include, but are not limited to, particle surface area-to-volume ratios, particle aspect ratio, percent moisture, percent volatiles, calorific value of the powder/dust, temperature, dispersion concentration, particle internal structure morphology, and the like. The term 200+/− microns is used to denote the dividing line between explosible and non-explosible powders generically in this disclosure. The actual particle size diameter for different types of biomass and other powder fuels may be found in a variety of resources (*Dust Explosions in the Process Industries*, R. K. Eckhoff).

In some ways, a basic measure of the explosibility of a particle distribution is the ability of that distribution, including its largest particles, to flash burn in an explosible mode in the various burners we disclose in tens of milliseconds, emulating a single phase combustion regime commonly seen with propane and other liquid and gaseous fuels.

The distribution 11 on the right of FIG. 1A includes a wide range of particle sizes, with a predominant membership in the non-explosible range. Wood chips, saw dust, ground waste, hog fuel, coal, and other combustible biomass up to whole trees and hydrocarbon-based fuels have been burned in large furnaces for boilers, power plants, and other common modes for years as cited in numerous references in this disclosure. More recently the literature describes mixed fuel and co-fired burners and combustion schemes for predominantly non-explosible dusts and powders. While a portion of the particle size distribution may fall into the explosible range, today's technology applications tend to produce energy with large mean particle sizes by comparison, often by stated choice to avoid the explosion dangers of particle dust and fines, which fall into the explosible range. Particle size distribution is a major differentiator between our disclosure and current art.

Figure 1B:
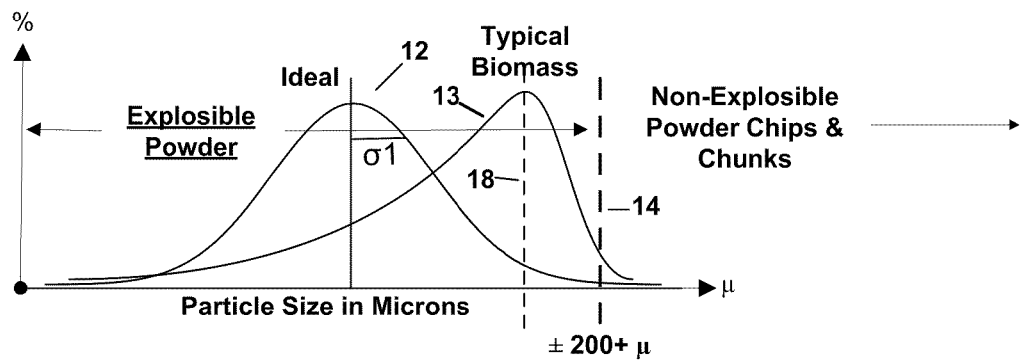
FIG. 1B shows an ideal particle size distribution and a more typical distribution for substantially explosible fuels.

FIG. 1B depicts an ideal particle size distribution 12 centered around the 50 to 80 micron mean, and a more typical curve 13 found in various types of substantially explosible fuels from biomass and other powdered sources. This curve 13 is skewed heavily to the right, toward a mode larger particles than the mean or median would indicate, yet is still within the explosible region. The skew is primarily based on the manufacturing processes, from sieving to more selective separation techniques utilized.

As with all manufacturing processes, there tends statistically to be a minor portion of the overall distribution which may fall just outside the desired region. This amount is a somewhat adjustable quantity depending on economic throughput models combined with the reproducibility of the manufacturing and separation equipment. For some uses, control of this right-hand tail of the curve accounts for different quality levels or grades of fuel.

Figure 1C:
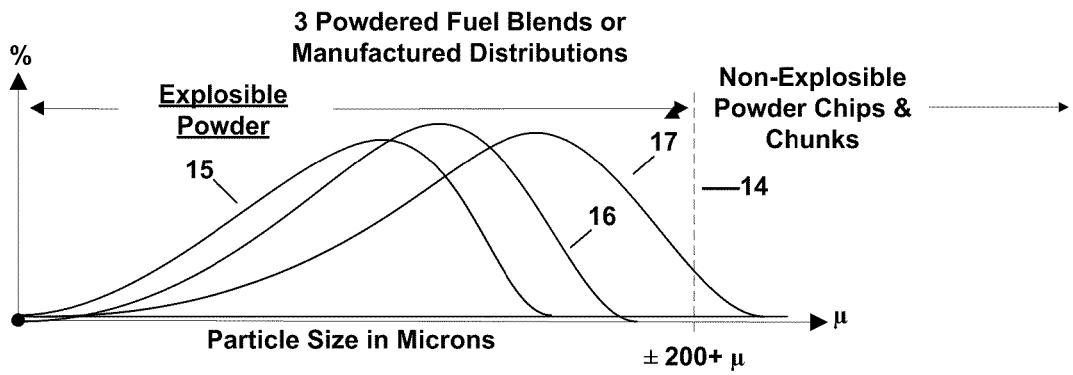
FIG. 1C shows three different shapes of substantially explosible powder distributions.

Three different shapes of substantially explosible powder distributions 15, 16, 17 are depicted in FIG. 1C. The particle size distributions for embodiments of the inventions herein may have a variety of statistical characteristics, based on uses and economics.

By selecting powder dispersions wherein the powder size distribution has a median mode represented by curve 16, dispersions are achieved that are explosible regardless of variables such as the surface area of the powder particles, the energy content of the powder, the concentration of an oxidizer such as oxygen, the temperature of the powder and the oxidizer, and the heat transfer rate, provided that sufficient oxidizing gas is present to qualify as explosible in nature. Accordingly, embodiments of inventions herein are capable of deflagrating dispersions of powdered fuel with little or no adjustment required for various powder materials.

FIG. 2A depicts the general relationship 20 between particle size of a powder particle and the particle combustion time. Dashed line 14 depicts the explosible limit for the powder—a threshold above which the dispersion is not explosible. This threshold varies from dispersion to dispersion and the other noted factors above. For example, with respect to the concentration of an oxidizer, a first dispersion including a particular powder may not be explosible where the dispersion include air having 20.95% oxygen, while a second dispersion including the same powder may be explosible where the dispersion includes pure oxygen. For methods and apparatus for determining a powder's explosible limit, see W. Bartknecht, *Dust Explosions: Course, Prevention, Protection*.

FIG. 2B shows there is a generally inverse relation 22 between the heat transfer rate and the particle size, with the most predominant portion of the curve existing in the explosible powder region. The heat transfer rate for smaller particles is generally higher than for larger particles. Again, dashed line 14 depicts the explosible limit. The curve of FIG. 2B provides the explanation for why fuels composed primarily of large particles on the order of 500 μm must remain in a furnace for a significant period of time.

Figure 3:
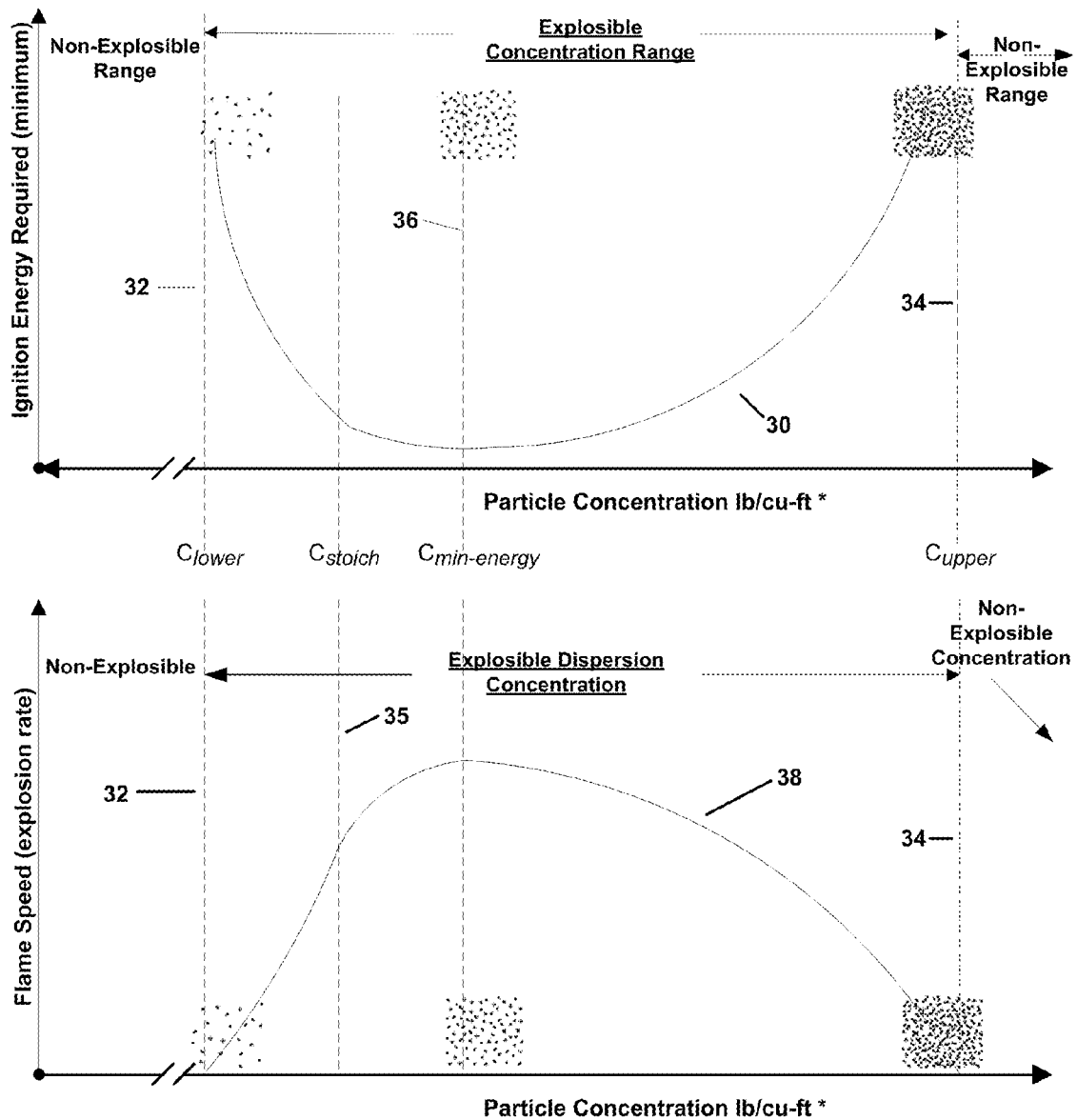
FIG. 3 shows minimum required ignition energy and flame speed as a function of fuel concentration for an explosible powdered fuel dispersion in an oxidizing gas.

FIG. 3 shows a matched set of graphs taken from Eckhoff, the first depicting the minimum required ignition energy 30 as a function of fuel concentration for an explosible powdered fuel dispersed in an oxidizing gas. An explosible powder is only explosible in a concentration range with an oxidizing gas between a lower concentration limit 32 and an upper concentration limit 34. Above the upper critical concentration, the concentration of oxidizing gas is too low to burn all of the fuel. Below the lower critical concentration, the particles are too far apart for enough heat to be transferred from burning particles to unburnt particles to ignite the unburnt particles. The minimum ignition energy required to ignite the particles has a minimum within the explosible concentration range at 36.

FIG. 3 also shows schematically the flame speed 38 as a function of fuel concentration for an explosible powdered fuel dispersion in an oxidizing gas. Again, flame speed is relevant only in the explosible particle concentration range between a lower concentration limit 32 and an upper concentration limit 34. This curve is reminiscent of fluid mechanic depiction of the flame speed versus the equivalence ratio $\lambda$.

From the industrial dust explosion perspective, these curves represent a comparatively narrow explosion range. However, from our combustion process point of view, the range of concentrations in which a single-phase combustion regime operates is rather wide and generous. The least energy required to initiate the most violent explosion with the highest flame speed is at a concentration somewhat greater than stoichiometric where $\lambda>1$. Also noteworthy is that the range of explosibility for a dust dispersion of solid particles in relation to stoichiometric concentration is far greater than any ranges found with liquid or gaseous fuels such as propane, methane, or gasoline.

FIG. 4 graphically depicts combustion of a stationary deflagrating flame wave front 40 at the interface of a moving stream 42 of premixed solid particles in an oxidizer.

In this embodiment, we are feeding a powder from the base of a horizontal auger, mixing it with air into a dispersion, and then feeding that powder-air mixture through a nozzle into our burner at a concentration considerably over stoichiometric, $\lambda=3-4$ with a velocity above the premix flame speed. Combustion occurs essentially as a standing wave front inside the burner, balanced on the slowing and widening powder dispersion in a zone where its concentration is lessened and turbulent mixing occurs through recirculation. We call the following two-stage combustion.

In the first stage 45, the primary process operating in Preheat Zone I 44 is the heating of the dispersed phase. The flame front is the transition line into Reaction Zone II 46 where heating of the gas is the primary dynamic. The diagram emphasizes the continuous gas-particle conductive heat transfer between the Preheat Zone I 44 and the Reaction Zone II 46 as a fresh supply of particle reactants are continuously fed into burners described herein for deflagration. A graphical temperature reaction profile 48 is overlaid inside the burner.

In the second stage 47, oxygen is depleted somewhere in the reaction Zone II, while hot particles at combustion temperature continue moving. The second stage begins with the introduction of high-speed secondary air 49 at an angle to encourage mixing and a velocity perhaps 10-times the flame speed. Adequate oxidizer drives char burnout to completion, a fast process that occurs in a time related to the particle radius squared ($R^2$), rather than just R as in the first stage.

Figure 5:
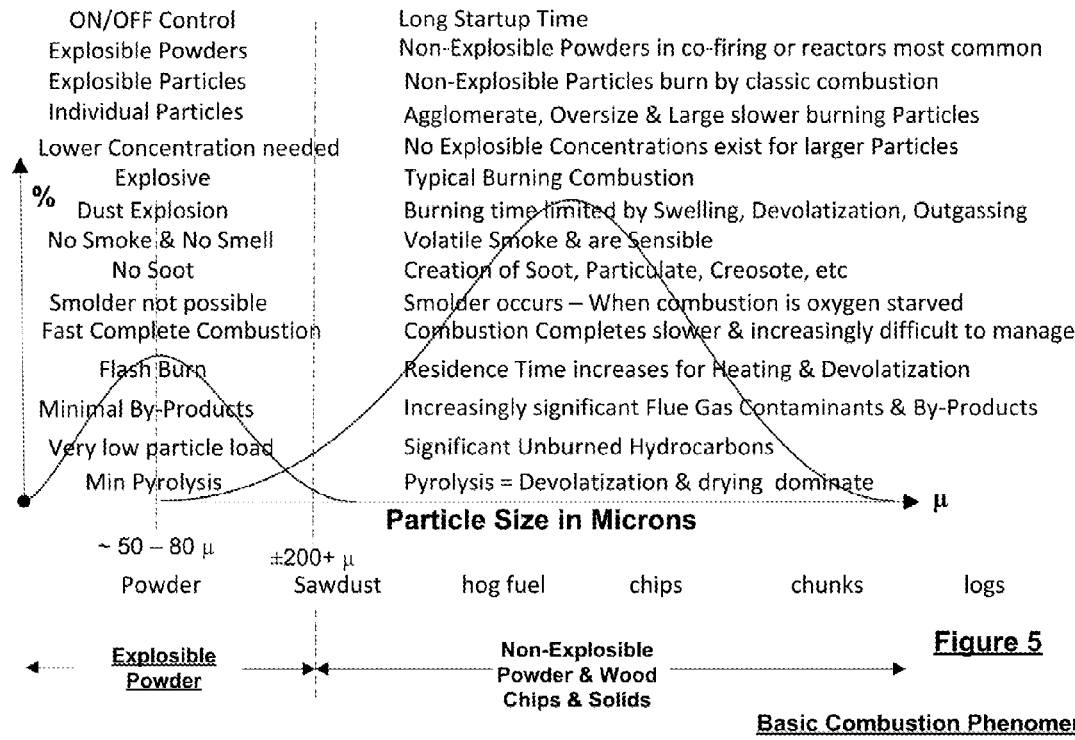
FIG. 5 shows basic combustion phenomena observed for two solid fuel particle size distributions.
Figure 6:
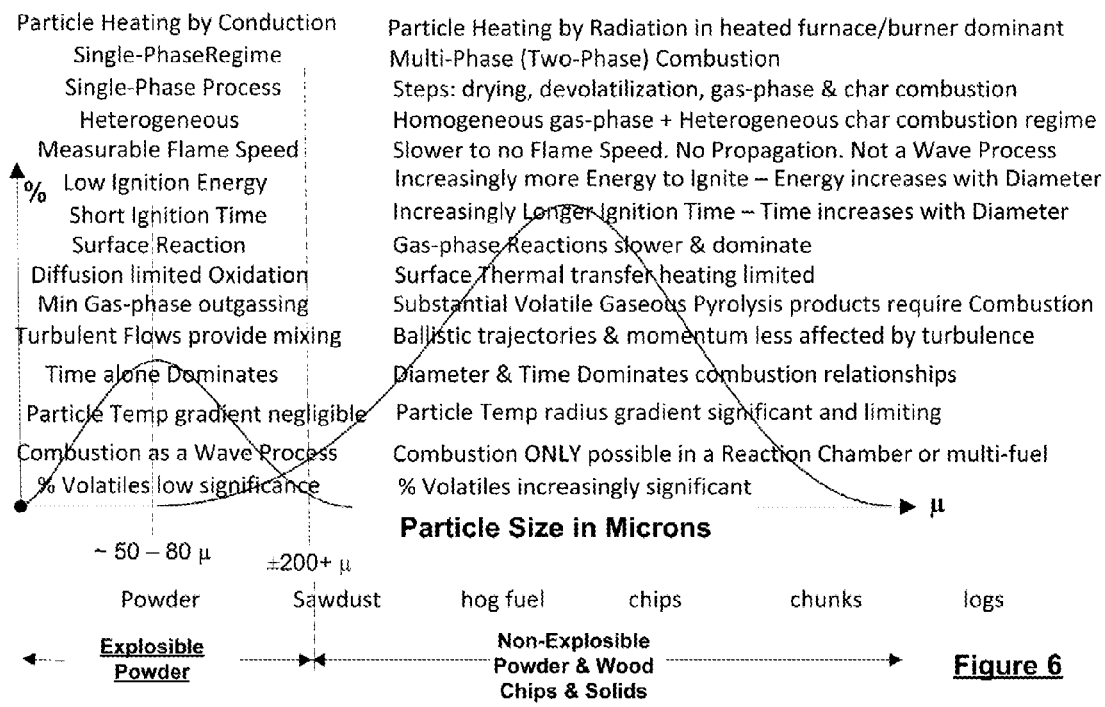
FIG. 6 shows fluid mechanical processes and phenomena observed for two solid fuel particle size distributions.

FIGS. 5 and 6 present a basic combustion and fluid mechanic summary of phenomena and detail the radically different behavior between combustion of explosible versus non-explosible particles. A list of comparison terms or phrases is overlaid onto the shape of the explosible and non-explosible particle size distribution curves of FIG. 1A to emphasize the unique differences between our operation and prior art.

FIG. 5 summarizes basic combustion phenomena observed when our disclosed devices and fuels are operating in the explosible regime compared with operation in the non-explosible, more traditional combustion mode. Each item in this overview summary of key combustion regime differences is discussed in detail in other portions of our disclosure. The summary, taken as a whole, makes clear the novel and surprising nature of our disclosure in combustion terms familiar to many including those skilled in the art.

FIG. 6 summarizes fluid mechanical processes and phenomena observed when our disclosed devices and fuels are operating in the explosible regime compared with operation in the non-explosible combustion mode broadly utilized today. Each item in this overview summary of key combustion regime differences is discussed in detail in other portions of our disclosure. The summary, taken as a whole, makes clear the novel and surprising nature of this unpracticed combustion regime described in our disclosure using fluid mechanics and combustion dynamics terms familiar to those skilled in the art.

Figure 8:
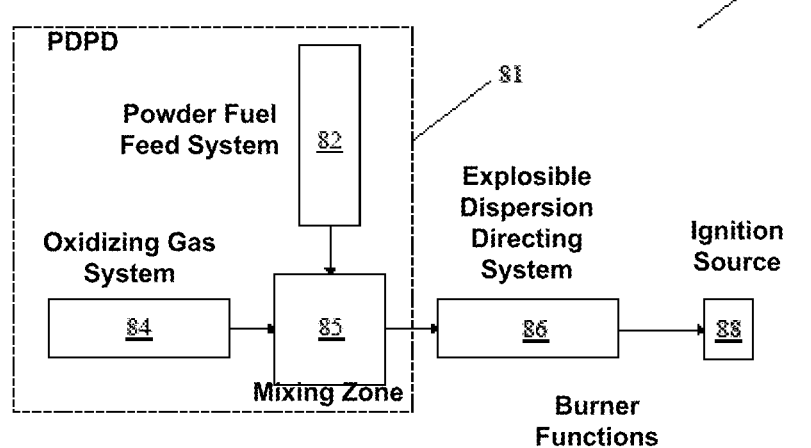
FIG. 8 shows schematically a burner in a first embodiment of the present invention.

A burner system of the present invention preferably includes five sections. FIG. 8 shows schematically a burner in a first embodiment of the present invention. The burner system 80 includes a powdered fuel feed system 82 for feeding a powdered fuel and an oxidizing gas feed system 84 for feeding an oxidizing gas. The powdered fuel and the oxidizing gas mix in a mixing zone 85 fed by the powdered fuel feed system 82 and the oxidizing gas feed system 84. An explosible dispersion directing system 86 fed by the mixing zone 85 directs the explosible dispersion toward the ignition source 88 in the confines of an enclosure (not shown). The ignition source 88 is located downstream from the explosible dispersion directing system and initiates a deflagrating flame for the explosible dispersion. The powdered fuel feed system 82, the oxidizing gas feed system 84, and the mixing zone 85 are collectively termed the positive displacement powder dispersion feed system. Each of these parts is described in detail below.

Figure 9:
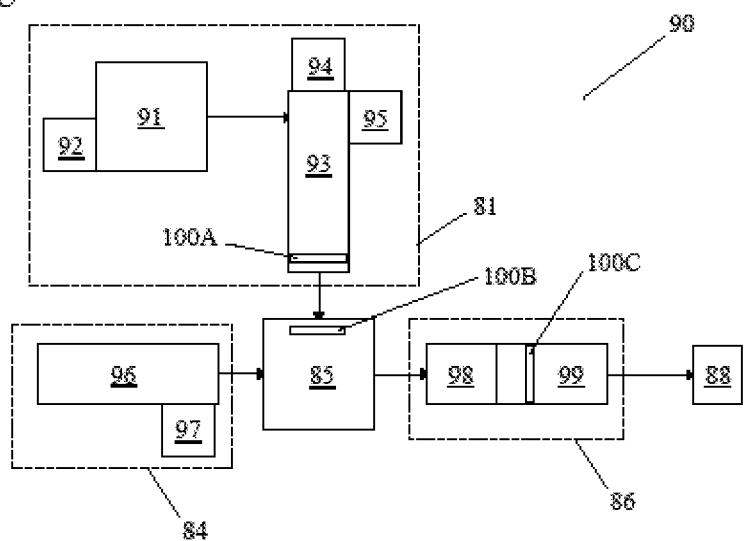
FIG. 9 shows schematically a burner in a preferred embodiment of the present invention.

FIG. 9 shows schematically a burner system in a preferred embodiment of the present invention. The powdered fuel feed system 82 includes a powdered fuel storage container 91, a fuel vibrating device 92, a fuel metering device 93, a usage meter 94, and a fuel feed power source 95. The vibrating device 92 vibrates the fuel storage container to reduce clumping of the fuel and to maintain flow of fuel, preferably by gravity, from the storage container 91 to the metering device 93. The fuel supply power source 95 controls the rate of fuel feed by controlling the metering device 93, and the usage meter 94 records the amount of fuel fed the metering device 93. The oxidizing gas feed system 84 includes an oxidizing gas source 96 and a gas metering device 97. The explosible dispersion directing system 86 includes a constriction device 98 and a flame stabilizing system 99 downstream from the nozzle. An agglomerization device 100A, 100B, 100C to break up fuel agglomerates that may have formed during transport or storage of the powdered fuel may be optionally located within or after the fuel metering device 93, within the mixing zone 85, or within the flame stabilizing system 99.

A burner system of the present invention is preferably turned on by initiating the powdered fuel feed system to provide powdered fuel at a predetermined feed rate and actuating the ignition source to ignite the fuel and produce a deflagrating flame. The oxidizing gas feed system may be initiated before, at the same time, or after the powdered fuel feed system is initiated, and the oxidizing gas from the oxidizing gas feed system carries the powdered fuel to the combustion enclosure past the ignition source.

A burner of the present invention is preferably sustained in the on position by continuing to feed powdered fuel and oxidizing gas at predetermined feed rates, which may vary with time depending on load requirements, to the deflagrating flame.

A burner of the present invention is preferably turned off by turning off the powdered fuel feed system. The oxidizing gas feed system is preferably turned off at the same time as the powdered fuel feed system but may be turned off before or after the powdered fuel feed system is turned off. Alternatively, the oxidizing gas feed system may be maintained at a predetermined flow rate, which may vary with time, when the burner is both in the on and off states.

Powdered Fuel Feed System

The powdered fuel feed system preferably includes a powdered fuel storage container, a fuel vibrating device, a fuel metering device, a usage meter, and a fuel feed power source. The powdered fuel storage container may be any size or shape, preferably with a downward sloping bottom, and made from any structural material. The container is preferably easily accessed for addition of powdered fuel to the system as necessary or fed from remote storage. The fuel vibrating device may be any high frequency device which promotes flow of the powdered fuel from the storage container to the fuel metering device and reduces agglomeration. The fuel metering device may be any device capable of feeding a solid material at an adjustable and controllable rate including, but not limited to, a screw auger, a conveyor, a rotary disk or other metering devices. The usage meter may be any device that counts and records the usage of the fuel metering device, such as the number of turns of a screw auger, to determine the amount of fuel being used by the burner system. The fuel feed power source may be any power source, but is preferably electrical, and either separate or the same power source may be used to run the fuel vibrating device and to drive and control the rate of the fuel metering device.

Oxidizing Gas Feed System

The oxidizing gas system preferably includes an oxidizing gas and a gas metering device. The oxidizing gas for the oxidizing gas feed system may be air, oxygen, or any other composition of gas containing oxygen. The oxidizing gas source may be ambient air, compressed air, or compressed oxygen. The gas metering device may be a valve, a pump, blower or any other device to control the feed rate of the oxidizing gas. The power source to run the oxidizing gas feed system and the power source to run the powdered fuel feed system may be the same or different power sources. Oxidizing gas is separately fed to the burner as a source of secondary air to support one or two stage combustion.

Mixing Zone

The mixing zone is a zone of the burner system which allows the oxidizing gas and the powdered fuel to intersperse after they come together. The mixing zone ideally allows the oxidizing gas to break up and distribute the powdered fuel into its individual particles so that it behaves as a reasonably uniform explosible powder when it reaches the deflagrating flame. The mixing zone may be a chamber, a conduit, educator, or a combination of chambers and conduit. The mixing zone is preferably designed to produce a dispersion by turbulent flow of the oxidizing gas.

Ignition Source

An ignition source for a burner of the present invention is used to turn the burner on by initiating a deflagrating flame in the fuel-gas dispersion fed by the PDPD system and formed by the flame stabilizing system. Since a burner of the present system preferably stays on until the fuel supply is cut off, the ignition source may be pulsed ON/OFF or continuous. The ignition source is preferably an electric arc ignition source or other spark source such as a conventional spark igniter. The ignition source may, however, alternatively be a gas flame pilot light, a glow plug, or any electronic igniting device.

Explosible Dispersion Directing System

The burner, or explosible dispersion directing system, receives the mixed dispersion from the PDPD through the nozzle and delivers it to the ignition source for initiation of the deflagrating wave. The explosible dispersion directing system also controls the process by taking advantage of the fluid mechanics of the dispersion and the deflagrating wave to optimize the burner for the specific application for the burner. The explosible dispersion directing system includes a constricting device and a flame stabilizing system. The constricting device controls the speed and area of the explosible dispersion as it is fed into the flame stabilizing system. In one embodiment, the constriction device is a nozzle. The flame stabilizing system is designed to control combustion makeup air system of the powdered fuel and may include an active or a passive secondary air system as well as a de-agglomerization system.

A number of tests were run burning horizontal, uncontained air-powder dispersions to learn about the dynamics of combustion before actual burner design and testing began. A short series of tests, using a leaf blower to supply air to the burner, were instructive. We learned the following: 1) Flame speed is important and relatively low for explosible powders. Full power through a 3-port dispersion nozzle touting 200 mph air velocity is just plain too much. It was nearly impossible to ignite the powder-saturated air stream closer than 4 feet from the end of the nozzle.

2) Lowering the air stream velocity (and flow) allows ignition to occur closer and closer to the exit nozzle. With these rather high velocities, the non-ignited air-fuel mix was still traveling faster than the flame speed and therefore the burning zone itself.

3) The lowest motor speed for both velocity and flow produced an explosible mix that is reminiscent of a flame thrower. Only at the lowest leaf blower velocities did the flame spread laterally from the ignition point.

4) The requirement for and merits of a robust, consistent metering system to feed a fuel/air pickup, mixing system, and delivery system was highly apparent, as this crude but instructive demo didn't really have one.

5) The initial flame front formed only if the mass flow velocity of the air-powder mix falls somewhat near or slightly above the deflagrating wave front velocity. Then burning move back (upstream) and stabilize from the ignition source. When this happens, a self-sustaining burn is possible after ignition with containment.

FIG. 10A shows schematically a horizontal explosible powder fuel dispersion in an embodiment of the present invention with no flame. The powder fuel dispersion 100 depicts the fluid dynamical behavior. Flow exiting the eXair air amplifier in much of the cone is initially a directed stream. Turbulence quickly begins circumferentially at the edge of the dispersion flow as stationary air is induced, producing noticeable eddies and drag vortices. The high velocity dispersion jet flow produces a high shear, resulting in turbulence as stationary air flow is induced by the fast moving air-particle mixture. Eddies and waves 104 are immediately apparent surrounding this diverging cone and contribute to a slowing of the air-particle mass flow even before gravity effects become pronounced.

Velocities are high near the center of the slowly diverging cone and not immediately amenable to ignition or to sustained burn. There is little or no visible evidence of any particle fall-out in the first several feet after the amplifier nozzle exit. The fine unignited powder, which is easily seen without ignition, tends to disperse evenly throughout the room, not just fall to the ground as discharge velocity approaches zero. Particles remaining in a slowly-diverging cloud form a uniform dispersion of fine powder.

FIG. 11 depicts the effects of gravity and turbulence on the velocity and momentum of an unignited horizontal dispersion 110 suspended solids blown into stationary air. The first region is characterized by a high velocity flow surrounded by high shear, low pressure room atmosphere and resulting edge flow drag induced turbulence and consequent mixing as predicted by Bernoulli. These phenomena continue for about four feet, abating into the second region of slowing velocities and reduced momentum, where the dispersion appears highly uniform except for some turbulence and thinning at the extreme edges.

At about eight feet the dispersed particles enter the third region where the dust-like powder begins to settle 112 under the influence of gravity due to a loss of momentum. Any undesirable oversized, higher mass particles, especially ones within the specified diameter but with aspect ratios greater than 2, stay in a ballistic mode until the end of the third region where they too succumb to gravity.

FIGS. 12A through 12D show unconfined free space ignition of a horizontal dispersion as the ignition point location is successively moved away from the nozzle source at four increments. Much insight into the deflagration of a substantially explosible air-powder mix can be gleaned from detailed observations and image analysis of the various physics and fluid mechanic phenomena at work in this test.

The air-powder premix enters the eXair air amplifier where final dispersion and velocity amplification are completed. The explosible powder dispersion exits the eXair nozzle initially in a fast moving, slowly diverging flow at a concentration several times stoichiometric with a velocity well above the dispersion flame speed.

At our preferred process feed settings, a propane torch applied directly at the nozzle outlet does not ignite the mixture, since the velocity is still above the flame speed, which ranges from about 0.5 to 1+ meters/second. The high solid fuel concentration is likely in the explosible range, but ignition is velocity inhibited.

Within about two inches from the nozzle, a deflagrating flame erupts at the ignition point 122 of FIG. 12A as shown in the top flame profile. With combustion supported by a propane torch, stationary room air is entrained by the fluid mass flow, with turbulent eddys moving forward while slowly rotating back towards the source as a result of shear. This alters the air-fuel mixture around the circumference in the cross flow direction. The "endless" supply of room air entrained by the high velocity stream is also a source of combustion air, following the Bernoulli Principle. "Slower dust" combusts better as it is near or at the flame speed.

The flame is not self-sustaining in this embodiment, but will continue to burn in a stable mode as long as the ignition source propane torch is held vertically in place. Variations observed are due to turbulence interplay with the constant expansion and upward flow of hot gas as all of the solid fuel is consumed. This solid fuel stream literally "burns like propane" with no observable or sensible odor, soot, or remaining particles.

At the ignition point 122 of FIG. 12A there is no upstream nor downstream movement of the deflagrating flame front wave, as there is a match of dispersion mass flow velocity with the substantially explosible air-powder mixture's flame speed. The flame front line is tilted slightly leftward but nearly vertical across the horizontal flow stream.

As the igniter is moved leftward (downstream) to the ignition point 124 of FIG. 12B about 8 inches from the nozzle exit, the deflagrating flame continues to consume all of the dispersed solid fuel powder suspension in an explosible mode. As velocities and concentration have decreased somewhat, the actual flame front moves upstream 2 to 3 inches from the ignition point and remains essentially stationary. A typical burn at the proper ignition point delivers near complete combustion, with little or no particle fallout.

The ignition point 126 of FIG. 12C is just over a foot downstream from the nozzle exit. A noticeable backfire is present, reaching about 4+ inches back towards the source, where it remains stationary as a stream of fresh reactants arrives. The far left "tail" of the flame wavers more with ignition this far out, as the effects of turbulent mixing, the reduction and resupply of oxidizer, and upward gas expansion from particle burning have increased effects on the variability of dispersion uniformity and therefore combustion.

The ignition point 128 of FIG. 12D is located about 16 inches downstream, the farthest from the nozzle source in this series of tests. A noticeable change in burning is observed, as the dispersion has become increasingly disturbed in its travels, widening both geometrically as well as in stoichiometric values of air-fuel concentrations. Unburned powder is observed surrounding the deflagrating flame cloud, at concentrations below explosible or temperatures that combine to preclude its combustion consumption. Ignition point 128 is considered to be outside the desirable operation region of our preferred methods and processes, but is included here to round out our disclosure.

During these tests, we also observed the usefulness of the eXair air amplifier with horizontal dispersion. Specifically, when operating without an ultrasonic deagglomeration function, the air amplifier turbulence performs a final destructive breakup and mixing of any remaining particle agglomerate and thereby reduces or eliminates any resulting particulate "fall out" around the burning stream, when compared to a simple pressure-driven stream from the mixing zone to the nozzle.

Introducing a typical continuous spark fuel oil igniter electrode structure into this fluid stream causes local turbulence and gravity-induced fallout of particles about 8" to a foot downstream of the igniter location, never to be ignited. This simple test made it clear that no structures may be located within the gas-powder dispersion fuel flow, as collisions with stationary surfaces interfere with proper and desired operation.

At low powdered fuel and oxidizer flow (about a 10:1 turndown ratio), these same basic phenomena are observed, yet the scale is shrunk considerably. The length, diameter, and volume of the deflagrating flame are significantly and proportionately reduced, as are the ignition point distances from the nozzle. In home heating terms, initial tests were at a typical furnace heating rate of about 200,000 BTU per hour, with low flow emulating a hot water heater demand at about 20,000 BTU per hour.

Vertical firing in FIG. 13 and beyond has some advantages. It is rather common with gaseous and some liquid burners, but not with solid fuels. To achieve symmetrical effects on the powder particulate dispersion before and during combustion, investigations were begun with a vertical air-fuel mixture flow utilizing principles of physics, dynamics, and fluid mechanics to create simple upward firing vertical combustion enclosures for substantially explosible powder dispersions. A vertical jet, rising up from an infinitely flat plate, follows certain flow patterns, which allow powder to drop out without burning. In our case, we have an immense density difference between powder and gas, somewhere between 500:1 and 1000:1.

The burner on a gas stove does not need to be confined in order to work well, over a very wide dynamic range. It sends a premixed, close-to-stoichiometric, preheated, well-distributed mix out a flameholder, where it burns cleanly. It helps to have an effectively zero fuel-air density difference, and truly single-phase operation.

With a horizontal, low-speed jet of explosible powder, keeping the powder confined in the combustion zone is a challenge. Our horizontal jet, blowing powder out into free space have worked best with powders of 200 mesh. When we used fuels comprised of larger particles with distributions beyond our specification or non-reduced agglomerate such as 80-mesh pine or baking flour, some of the powder burned, while another portion followed a ballistic path and was eventually steered by gravity unburned onto the floor.

A vertical jet, blowing up into free space, had similar, yet less severe problems, as the effects of gravity are uniformly distributed around the central flow axis, eliminating the asymmetric particle behavior.

The purpose of the initial vertical can burners, and the later stovepipe models, was to symmetrically confine the primary fuel-air flow such that the powder would stay in the air dispersion, while utilizing turbulent mixing to promote rapid heat transfer from the gas to the particles, thus maintaining a high enough temperature environment for sustained combustion with a stationary deflagration wave front.

A vertical dispersion allows all powder, especially that which is too dense or coarse, to stay suspended and confined in the jet combustion zone and burn in the stovepipe burner. It should be understood that at very low flow rates, the performance of large burner diameters begins to fall off and destabilize, as the side walls are far enough away to be similar to "free space", not providing the necessary turbulent recirculation.

The following section reviews a number of burner explosible dispersion directing system designs developed, fabricated, and tested in somewhat of a chronological order.

FIG. 13 shows a first can burner embodiment of the present invention. The first sustained burn was accomplished when the air-fuel dispersion generated by the PDPD and dispersion directing system was fed vertically into the first vertical burner 130 enclosure design at a velocity just above the flame speed. This first burner was fabricated from a 6-inch diameter×6¾-inch high coffee can. It produced a tall, rather lazy deep orange deflagrating flame rising several feet above the can with no sensible smoke or soot.

It was immediately obvious that further answers would be found buried in the complex relationship between powder-air mix flow, turbulent mixing, available combustion air, dynamics of a burning gas wavefront, gravity effect on explosible and larger burning particles, and actual stream velocity of the air/powder mixture.

From this first sustained combustion burner test, we learned a vertical burner allowed turbulent, recirculating air flow to "bring back" any heavy burning or unignited particles along with hot gas mixing. A large amount of turbulence was present inside the can, with a considerable downdraft around the edges to supply this air-starved situation. This downdraft introduced strong shear and thereby added to the mixing effects of turbulence on an otherwise uniform flow in a tight boundary zone formed between the inside walls of the medium sized coffee can and the periphery of the flow cone.

The nature of this downdraft, or backdraft, returned considerable particles back toward the source, further fueling and sustaining ignition by the main flame. The "combustion zone" ambient temperature rose dramatically, maintaining sustained ignition/combustion. Much of the heated and combusting air/fuel mixture did escape the top edge of the coffee can burner. With a simple yet novel combustion chamber, the combusting dispersion was slower to depart the source. We later learned that this was due to fuel particle size imperfections. After the initial ignition and rapid subsequent mushroom cloud-like explosion, the completeness of the combustion seemed to decrease and the particle nature of the flame and sparks became much more pronounced, as did turbulent air swirling around the main flow cone. However, burning was self-sustaining.

Both the larger 80-mesh softwood pine and 200-mesh hardwood produced more sparks with a vertical burner than a horizontal dispersion, especially at the top and plume periphery. These sparks were later understood to be the presence of oversized particles in a less than perfect explosible dispersion, plus an occasional larger particle agglomerate.

FIG. 14 shows a second can burner 140 of the present invention with four secondary air holes 142 located near the bottom of the burner exterior sidewall. The air holes at or near the burner base provide what we call a supply of passive secondary air to assist with combustion via several processes. External air is pulled or induced into the burner enclosure by the force of a negative draft generated in the combustion process and dispersion in-feed. The amount of passive secondary into the burner through these apertures is related to a number of parameters, including the pressure drop through the burner, the fuel flow combustion rate, and the combustion chamber stack height.

The presence of secondary air from the four 1-inch holes on the burner sidewall base improved flame stability inside the burner and allowed for a wider range of air-powder flows without flameout. The structure of the flame above the burner exit was less "lazy" and less tall, as combustion was completed at a decreased distance from the nozzle.

FIG. 15 shows a smaller can burner 150 of the present invention with secondary air holes 152. This 4" diameter can is a scaled down version of the original 6" burner. As the nozzle diameter did not decrease proportionately for this embodiment, less of the combustion occurred within the can, appearing more like a torch. A combustion chamber of this size, possibly with a decreased infeed nozzle diameter, would be useful for lesser heat load applications such as a 20,000 BTU/hour residential hot water heater.

In dealing with a 500:1 to 1000:1 density difference between powder and air and a low flame speed, a goal was substantial combustion completion within the burner itself, while containing, supporting, stabilizing, and levitating this rather high mass suspension for consumption by the stationary "traveling" combustion wave flame.

The fast vertical dispersion jet technique results in a higher initial velocity and greater shear than the target velocity. It introduces turbulence by the dissipation of kinetic energy in the primary fuel-air mix stream. Higher speed primary flow supports the weight of the powder and allows for a closed off bottom, thereby producing recirculation, sustained ignition, and combustion inside combustor. This design allows for a flat bottom, producing an abrupt pressure discontinuity, which is a major driver for recirculation and enables a wide operating range of flows and BTU outputs for a single burner size.

When the primary air-fuel stream enters our burner enclosures at high speed into the combustion chamber, this reduces the pressure, so air rushes from the surrounding area through the holes into the low pressure area. This recirculation and turbulence generation in our burners is explained by the Bernoulli Principle (Bernoulli's Law), which predicts a decrease in pressure in a direction perpendicular to the flow of a gas or fluid. Bernoulli's Equation is a consequence of the conservation of energy as applied to an ideal fluid, dictating that the sum of the pressure, the kinetic and potential energies (both per unit volume) is a constant value at all points along a streamline or laminar flow.

The velocity difference as the air-powder stream exits the nozzle into the combustion enclosure means there will be a pressure difference, since moving fluids exert pressure on stationary fluids. Recirculation and turbulence are initiated by the resulting energy transfer from the kinetic high speed air-fuel flow entering this enclosed environment. Likewise, the high speed stream induces the flow into the passive secondary air inlets near the base of many burner embodiments. Once ignition of the air-fuel mix occurs, hot gas expansion adds further kinetic energy into these dynamic processes.

Figure 16:
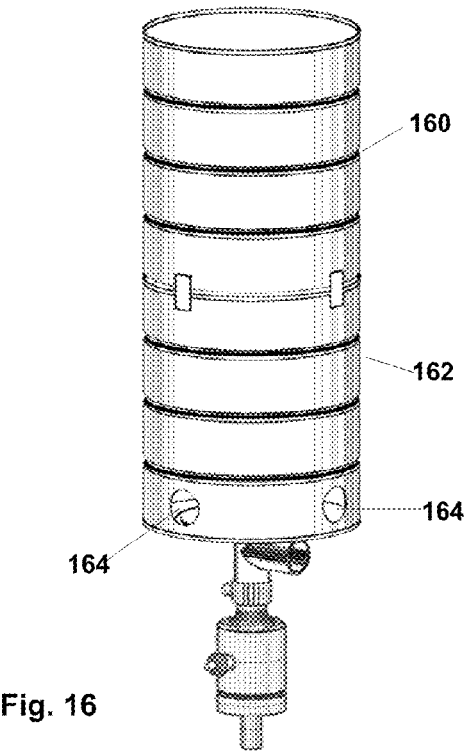
FIG. 16 shows stacked cans of the present invention with secondary air holes.

FIG. 16 shows two stacked burner cans 160, 162 with secondary air holes 164 at the base of the lower can 162. The addition doubled the combustion chamber length to about 13 inches and reduced the external flame height by providing an environment for further combustion completion. The increased stack height of the combustion chamber increased the vacuum to induce passive secondary air into the 1-inch holes at the burner base, yet the overall mixture combustion became oxygen-starved well below the top exit, indicating further secondary combustion air was needed.

Figure 17:
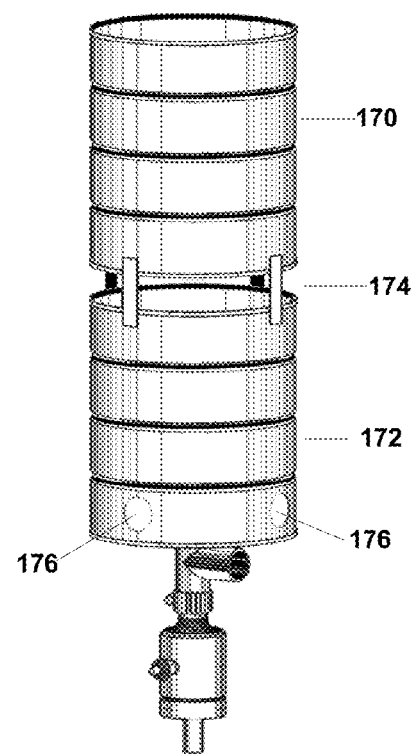
FIG. 17 shows stacked cans of the present invention with secondary air holes or slots and with a 1-inch gap between the cans.

FIG. 17 shows the upper 170 of the two stacked cans 170, 172 moved vertically upward to create a one-inch air gap 174 between the upper and lower cans of the combustion enclosure with the lower can having four 1-inch diameter passive secondary air holes 176. This gap 174 provides a second and additional source of passive secondary combustion air beyond the four holes or slots at the base. By providing this additional air through the gap, the flame height was lowered and more combustion of the oxygen-starved mixture was completed within the now 14-inch tall combustion enclosure.

Figure 18A:
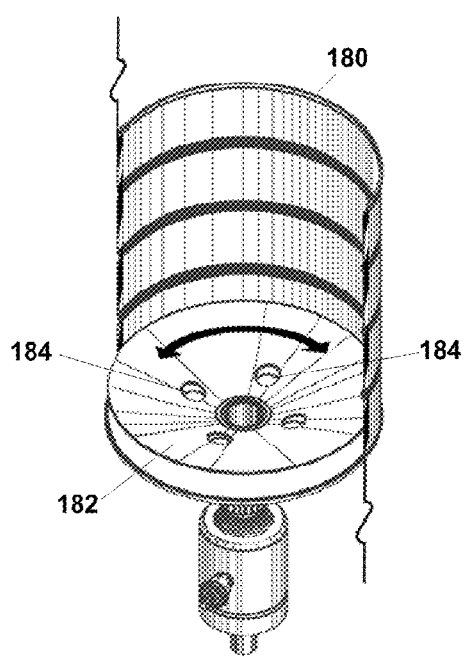
FIG. 18A shows a first cut-away of a burner can with a sloped bottom and adjustable bottom air holes in an embodiment of the present invention.
Figure 18B:
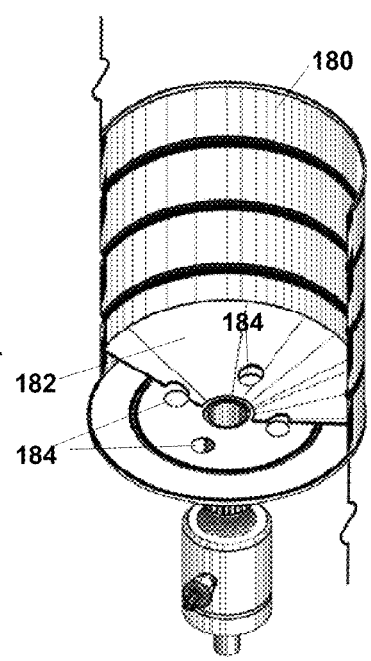
FIG. 18B shows a second cut-away of the burner can of FIG. 18A.

FIGS. 18A and 18B show a burner can 180 with a sloped bottom 182 and adjustable bottom air holes 184 as an alternative technique for providing a more controlled flow rate of passive secondary air with an axial rather than cross flow orientation. The sloped bottom functioned as intended by returning any unburned particulate back into the air stream. The ability of the bottom holes to control secondary airflow amounts was useful. An apparatus with adjustable slots or holes may be similarly used on the sides of the combustion chamber enclosure as an alternative to this method.

Also confirmed by this embodiment was the value of the cross flow, later called the "sweeper function" of passive secondary air, accomplished in previous prototypes by air inlet holes near the bottom of the enclosure. This cross flow provides greater radial recirculation and increased turbulent mixing, whereas this more axial secondary air flow is useful as a trim control for combustion completion, by providing a certain amount of makeup air for primary combustion air, as well as a trim method to control the deflagrating flame front vertical location and a wider lift area for unburned particles.

FIG. 19A diagrammatically shows dual stacked burner cans 190, 191 with a multi-holed air ring 192 supplying active secondary air through a one-inch gap. This burner also has four 1-inch diameter passive secondary air holes 193 on the bottom can 191. After combustion is fully developed in the first stage and the air-fuel premix is at or above ignition temperature, we safely introduce high speed secondary air into the oxygen-depleted environment to complete the combustion in the burner's second stage.

The effects and advantages of secondary air combustion are easily observable, when a single air jet with air traveling about 10 times the flame speed, $V_F$, penetrates the air-starved combustion zone of an uncontained deflagrating flame completing outside of a burner enclosure. The flow pattern of the high speed secondary air is seen, as a light or clear velocity profile, really excess oxygen, dissipates and combines inside the yellow-orange flame. We describe it as an "inside-out blowtorch flame" or an "inverted torch" with no flame in the middle, and it is an example of "inside-out completion".

To demonstrate this two-stage combustion, a generalized and easily-fabricated design was developed for testing. A high temperature 1.5-inch ID hose 192 was assembled in a closed loop with a common feed. As visible in FIG. 19B, a series of 1/16-inch diameter holes 194 were drilled on half inch centers around the inside of the ring at an upward angle to provide a complete air curtain of active secondary air. The air for this test was provided by a centrifugal blower with simple valve flow control.

The results were impressive. Providing a near-complete 360-degree uniform, angled flow of active secondary air significantly increased combustion completion in the upper section, the second stage of the burner. Flame temperature increased, and flame height at the combustion chamber exit decreased. The angle, flow velocities, volume, and interaction with the combusting particle suspension are all important as discussed later in this disclosure. Information from these early tests formed the basis for use of a range of methods in a variety of embodiments discussed throughout this disclosure.

There are a variety of methods useful for active secondary air delivery and distribution based on but not limited by the specific air distribution system used in this embodiment. An air manifold with holes or slots may be fabricated from materials capable of withstanding temperatures of 1500° F. or more. A single circle of machined holes may be augmented by an array of holes above and below the plane of the active secondary air module. The same holds true for slots or other geometric mini-nozzle features, all of which are to be covered by our disclosure (see especially FIG. 26B, FIG. 35, and FIG. 42). Passive secondary air, preferably entering the enclosure sides near the base, may also enter through the base if internal directing structures such as angled pipes or tubes control the direction of airflow to emulate the paths taken from side entry.

For example, we have observed the benefits of providing a low speed, almost gentle type of swirl in the second combustion zone through the use of angled active secondary air. To achieve this type of support, containment and mixing for the combusting dispersion via direction controlled active secondary air, a circular manifold may be utilized, comprised of an air channel/reservoir supplying machined holes, all angled identically, both rotationally (coaxially) to produce a light swirl, and at some upward vertical angle across the flow.

Figure 35:
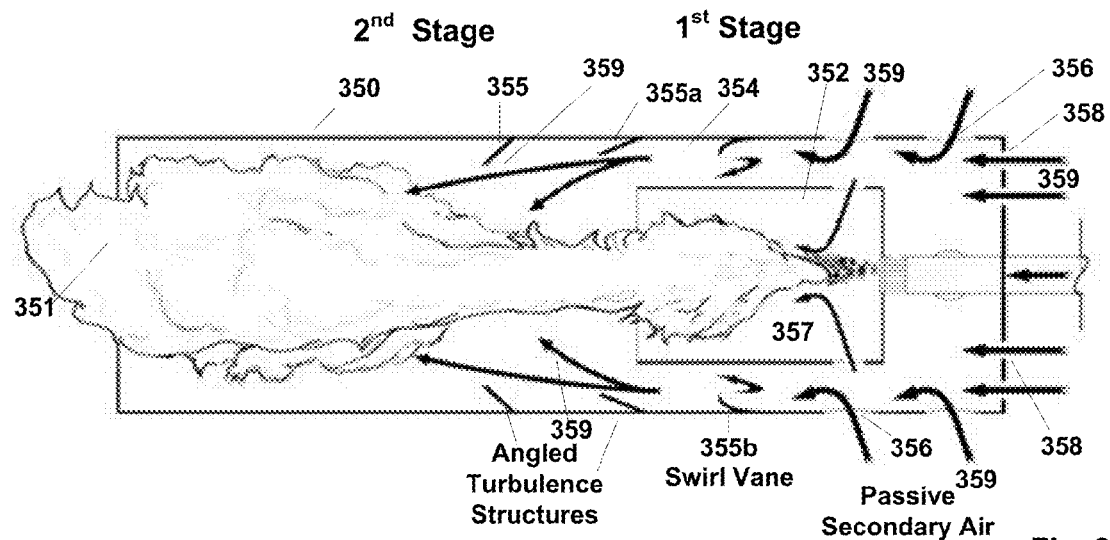
FIG. 35 shows the internal structure of a 4-inch horizontal burner of the present invention with dual coaxial enclosures for passive secondary air management.

An alternative, geometric passive method to the production of low speed swirl works by attaching a few stationary predominantly vertical (axial) and slightly angled "vanes" to the sides of the burner wall in protected areas not subject to collisions of high speed particles, for example in the recirculation zone or coaxial air paths (see FIG. 35 and FIG. 42).

A second alternative, geometric passive method to produce a low speed swirl may be accomplished by directing the flow of incoming passive or active secondary air at the burner base from each entry orifice at the same angle around the vertical flow axis of the burner. While these air velocities are less than those found in the upper combustion zone with active secondary air, beginning a low speed and gentle swirl early in the rising combustion process does provide containment and stability advantages (see FIG. 42A).

These methods extend the use of a single zone of secondary air into multiple zones along the vertical axis of the burner, depending on the degree of combustion control desired as in our two-stage burners. Air flow can be provided and controlled by a wide range of common industrial process means.

Some burner designs use a "swirler" to support and mix gases and particles in the combustion zone, including many years in burning coal powder. We achieve similar and perhaps more robust benefits by providing primary combustion air through the inlet nozzle as a component of the mixture stream, and supplementing with controlled secondary air.

We gain a significantly wider dynamic range of mass flow operation by our approach, as the "turn-down" ratios of swirler-based burners are limited, primarily on the lower flow end, by an eventual loss due to the collapse of a stable turbulent mixing by swirling support in the recirculation zone and often a minimum mass flow to maintain ignition temperatures in large radiant heat transfer-type furnaces and combustion devices.

Another significant difference with swirler-supported combustion is how we provide the total primary air for combustion. In embodiments of our invention, the total primary air flows through the same inlet as the fuel. Most mechanical swirler burners feed a very un-stoichiometric 1-2:1 premix ratio through a centrally located nozzle and then introduce additional primary air circumferentially around the main inlet to spin the swirler. The "support and mixing" functions of a mechanical, air flow driven swirler are much more non-linear than the elegantly simple approaches found in our disclosure, and result in low flow collapse of that function and the subsequent low turn-down ratio performance.

Figures 20A, 20B:
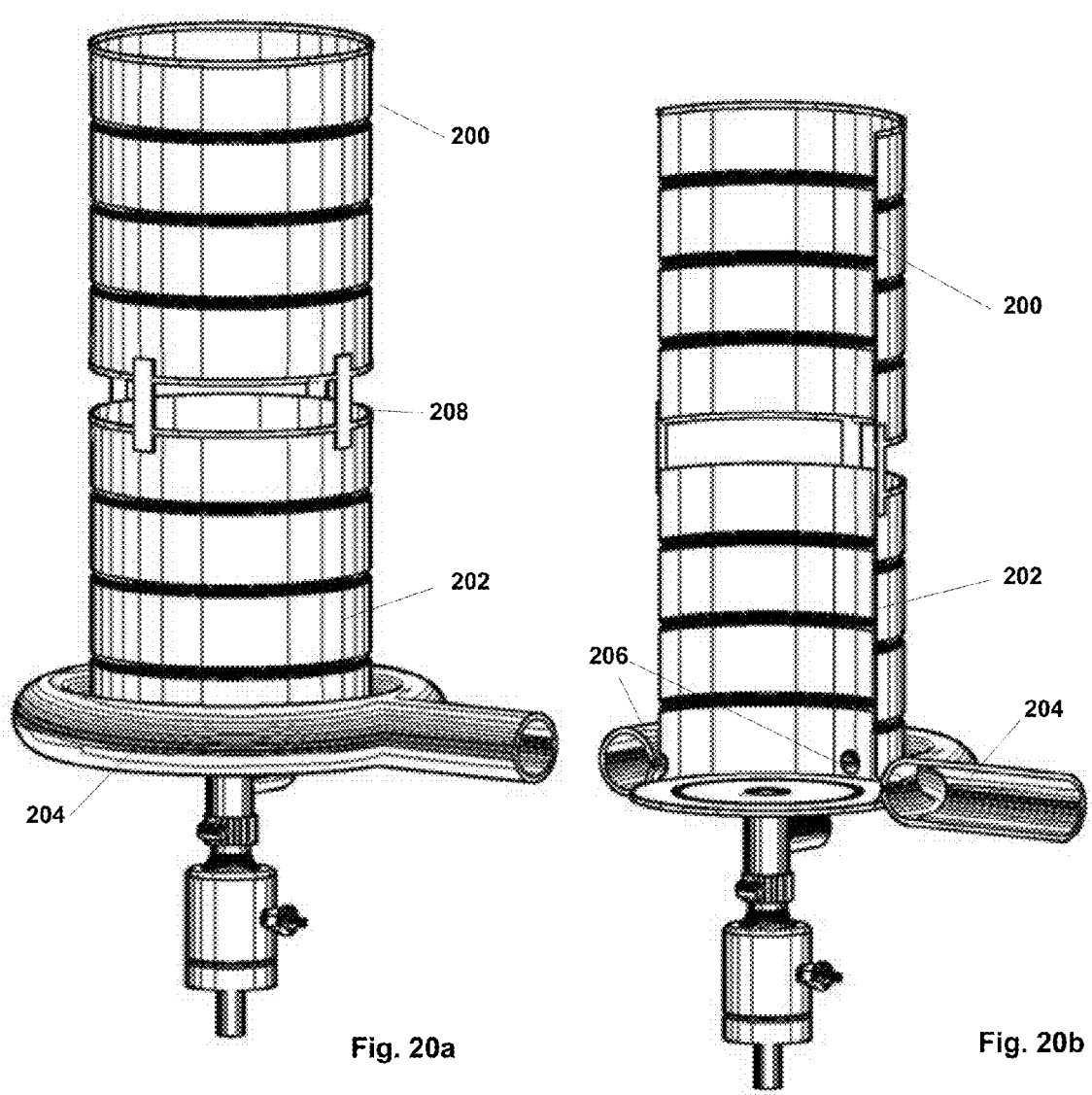
FIG. 20A shows stacked cans with secondary air from a blower into lower inlet holes.
FIG. 20B shows a cut-away of the stacked cans of FIG. 20A.

The burner of FIGS. 20A and 20B utilizes similar hardware as the burner of FIGS. 19A and 19B, but the active secondary air is fed into the lower 202 of the dual stacked cans 200, 202 of this embodiment by an air ring 204 through the four passive air inlet holes 206 on the sidewalls near the base and a 1-inch gap 208 between them for passive secondary air for the second stage. The use of active, pressurized air flow control through the lower portion of the burner may be advantageous for recirculation, mixing, and improved early combustion completion. Active secondary air benefits operation at lower flow rates and velocities so that the main and recirculating air-fuel dispersion and the return of oversized particles is not inordinately disturbed. Caution must be exercised since flows too high can cause flame out, overwhelm particle recirculation and handling functions, and interfere with the stability of the stationary deflagrating flame wave front.

Secondary air, such as this, under mechanical control is referred to generically as forced draft. Complete burner systems may be called mechanical-draft burners when the oxidizing gas is supplied under pressure by a blower or air pressure supply device. The supply of active secondary air for this normally passive secondary air situation in our solid fuel burner disclosures constitutes a separate embodiment, and would be delivered by alternate and improved means than that utilized for this simple demonstration.

FIG. 21A shows the dual stacked cans 210, 211, separated by a 1-inch gap 212 with the addition of three active secondary air nozzles 213. Holes in the lower can provide passive secondary air. We use the term "active secondary air" to describe a method whereby we can control the volume, pressure, and flow from an air source using various control means to aid with accomplishment of the function of combustion completion. The air source may be a high pressure source of compressed air or from any of a variety of blowers or other air moving means. Flows from "passive secondary air" are set by the geometry of the air inlets, internal structures and overall combustion chamber size parameters, and vary with the rate of expansion of gas from combustion of the air-fuel dispersion and its mass flow.

In one embodiment, three half inch copper lines 215 feed nozzles 213 comprised of an end cap with a $\frac{1}{16}$th inch hole. As is shown in FIG. 21B, an internal sectional view of the combustion enclosure, each nozzle is aimed toward the center axis of the combustion enclosure upward at a 45-degree angle. The flow is high speed to accomplish second stage completion. Caps of various nozzle hole sizes and dispersion angles were utilized in tests at numerous flow conditions for primary air, solid fuel mass flow rate and active secondary air flows. For a given air-fuel dispersion mass flow setting, increasing active secondary air flow lowers the height of the flame 216 protruding from the burner exit by completing more combustion within the second stage of the burner enclosure.

The vertical position of the deflagration flame wave front shown in FIG. 21B is controlled based primarily on fluid mechanics and combustion kinetics process parameters and their mathematical response surfaces. In this drawing, the position of the flame front in the first stage is rather high, indicating a high primary air flow velocity component of the air-fuel explosible dispersion mix. At lower primary air-fuel mass flow settings, the height of the stationary deflagrating combustion wave is considerably lower.

Figure 22A:
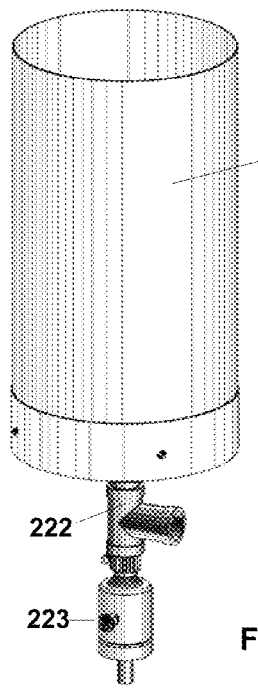
FIG. 22A shows a 6-inch stove pipe with no secondary air holes.
Figure 22B:
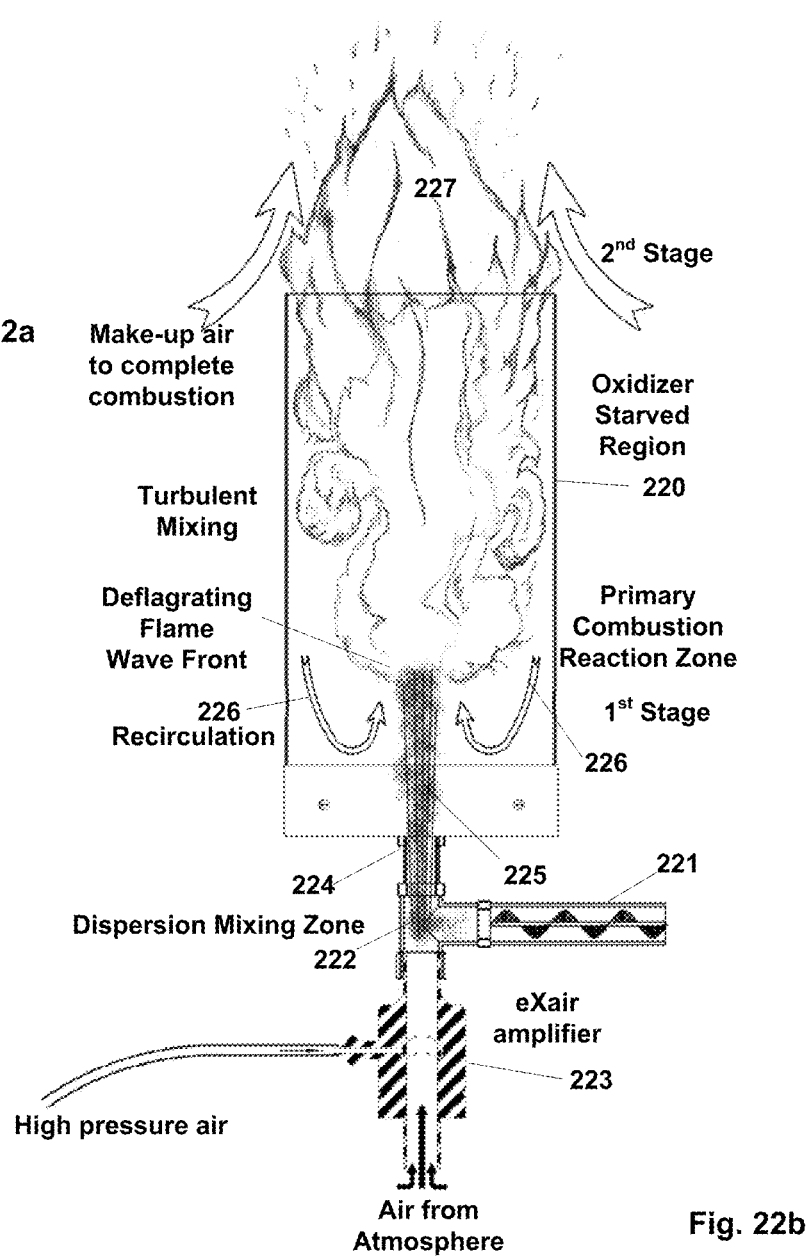
FIG. 22B shows simplified burner combustion basics for stove pipe of FIG. 22A.

FIG. 22A shows a ruggedized and taller version 220 of the original burner design, fabricated using heavy gage steel nominal 6-inch diameter stove pipe components and cast iron pipe fittings connected to the combustion enclosure. FIG. 22B graphically illustrates the simplified burner combustion system basic processes utilized for the stove pipe burner of FIG. 22A. It is the most general illustration of transition from the flowing fuel dispersion to the deflagrating combustion process.

Powdered solid fuel is delivered by the auger 221 at a controlled rate into the turbulent mixing zone 222, in this case a large "T" fitting. High velocity air flows vertically from the eXair amplifier 223, ideally breaking up any remaining agglomerate, and entraining the fine explosible powder particles into a dispersion for delivery vertically into the base of the combustion chamber generically referred to as the burner.

The air-fuel dispersion emerges from the nozzle 224, in this case $\frac{3}{4}$-inch ID, in stream flow at a velocity about double the flame speed and a concentration approximately four times stoichiometric. As this primary air-fuel dispersion enters the combustion chamber, the Bernoulli Principle affects the dispersion, slowing the speed and widening the fluid stream 225, decreasing air-fuel equivalence ratio.

The recirculation and turbulent mixing, shown by the two arrows 226 near the base, are critical to establishing and maintaining support for combustion. Ignition establishes a stationary deflagrating flame wave front at some vertical position above the nozzle, based on the actual process flow settings and fluid mechanic responses.

Vigorous combustion in the first stage reaction zone at the flame wave front nearly instantaneously consumes the particles, with the heat of reaction transferred from the gas to the particles by conduction in this narrow zone. Combustion continues until all of the available oxygen arriving in the primary air-fuel stream is consumed. Gas expansion continues, further adding to the turbulence and recirculation, and the unburned dispersion travels upward at combustion temperature, until finally encountering a fresh supply of oxidizer at the burner top, whereby the remaining fuel burns 227 to completion well above the stove pipe burner exit, beyond where we want the second stage to be.

Figures 23A, 23B:
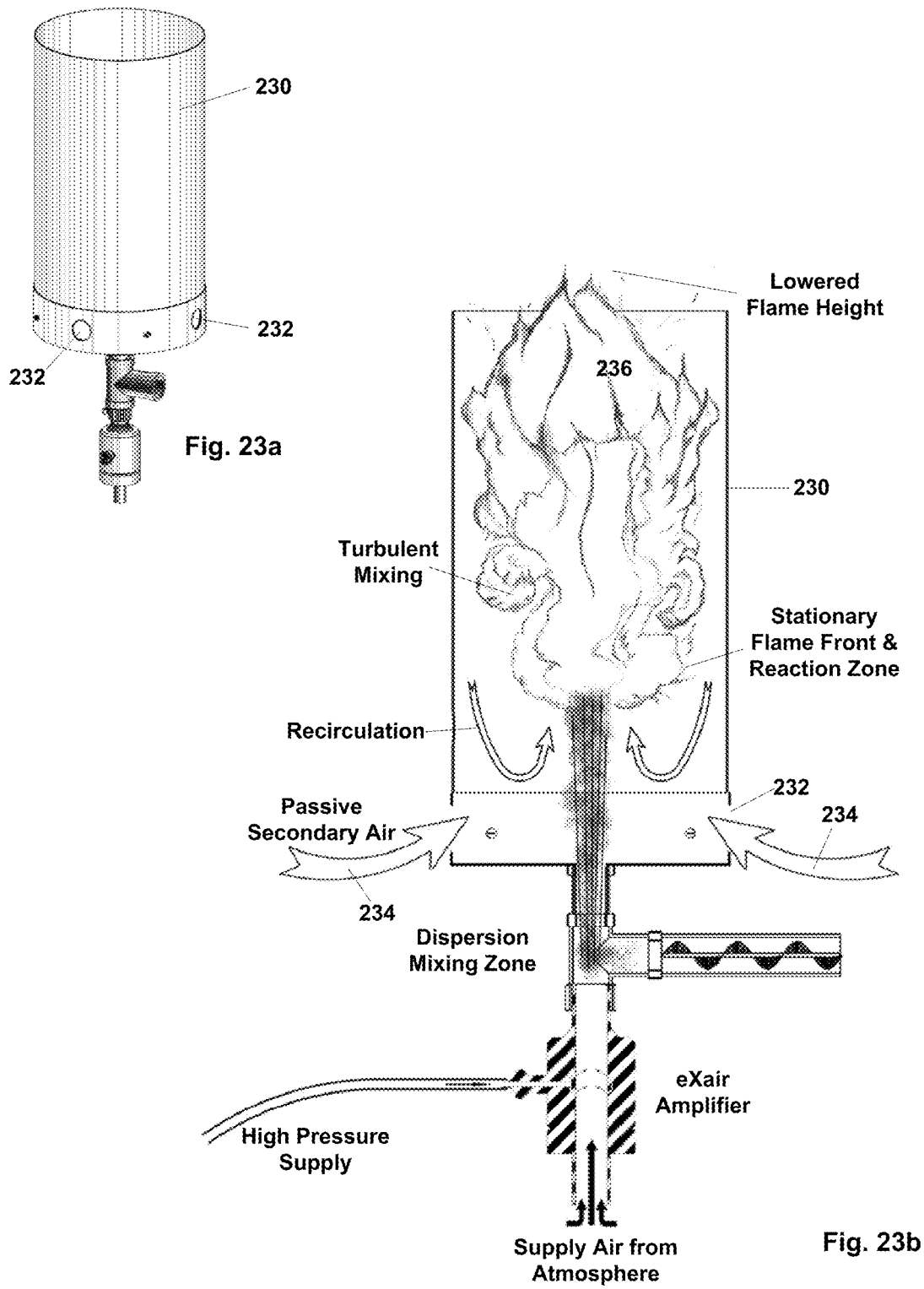
FIG. 23A shows a 6-inch stove pipe with secondary air holes.
FIG. 23B shows simplified burner combustion basics for stove pipe of FIG. 23A.

The embodiment of FIG. 23A adds four one-inch passive secondary air holes 232 to the design of FIG. 22A. FIG. 23B graphically illustrates the simplified burner combustion system basic processes with the added benefits of passive secondary air 234 at the burner base. The induced flow of air increases combustion within the enclosures first stage area. The oxidizer supply runs out in all air-fuel mass flow except the lowest flow conditions.

The flame 236 height in FIG. 23B is shown lower than that in FIG. 22B, indicating increased combustion completion occurred within the burner enclosure itself. An added benefit of this use of passive secondary air is increased flame front stability with improved mass-flow dynamic range of operation, specifically a larger turn-down ratio.

Figure 24A:
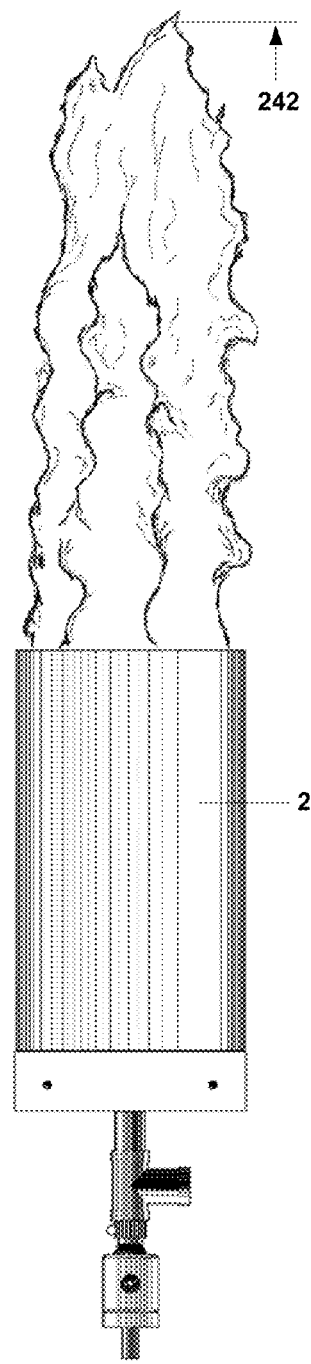
FIG. 24A shows flame height for a low primary air flow rate with no secondary air.
Figure 24B:
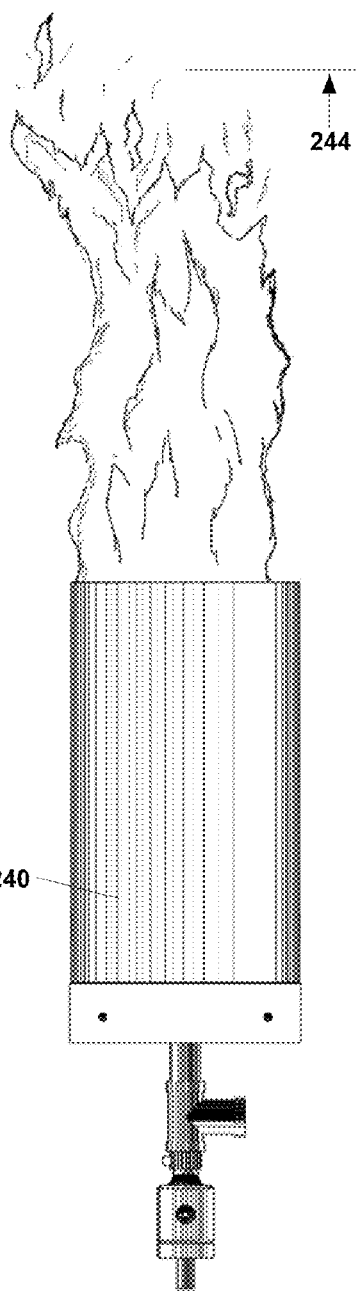
FIG. 24B shows flame height for a medium primary air flow rate with no secondary air.
Figure 24C:
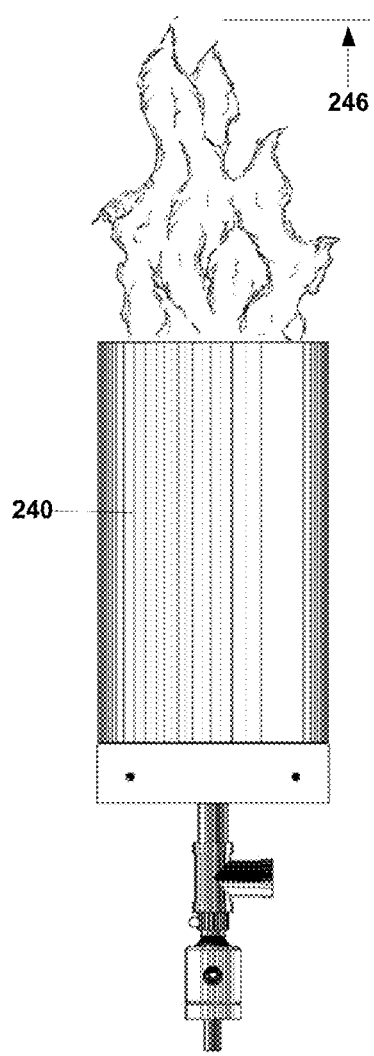
FIG. 24C shows flame height for a high primary air flow rate with no secondary air.

FIGS. 24A, 24B, and 24C demonstrate the relationship between the carrier gas primary air flow rates at a constant high powder mass flow and the resulting flame height 242, 244, 246 emerging from the burner 240 top for a basic six inch stove pipe burner with no secondary air flow and three settings of low (FIG. 24A), medium (FIG. 24B), and high (FIG. 24C) primary air flow. The low primary air flow shown on the left has the tallest flame height 242. At first this seems counterintuitive. At such a low flow, a high equivalence ratio, very little of the bulk fuel loading is completed inside the burner in the first stage. Therefore, this rather unstable flame completes upon exit at the top exhaust.

As the primary air flow rate is increased to a medium level shown in FIG. 24B, the oxidizing effect of increased carrier gas enables further completion inside the burner first stage, so the exit flame height 244 decreases proportionately, even though there has been no change in fuel mass flow. For FIG. 24C high primary air flow exit flame height 246 above the burner top is the lowest of the three flows. This setting requires the least vertical space to complete combustion with the highest stability.

Figures 25A, 25B, 25C:
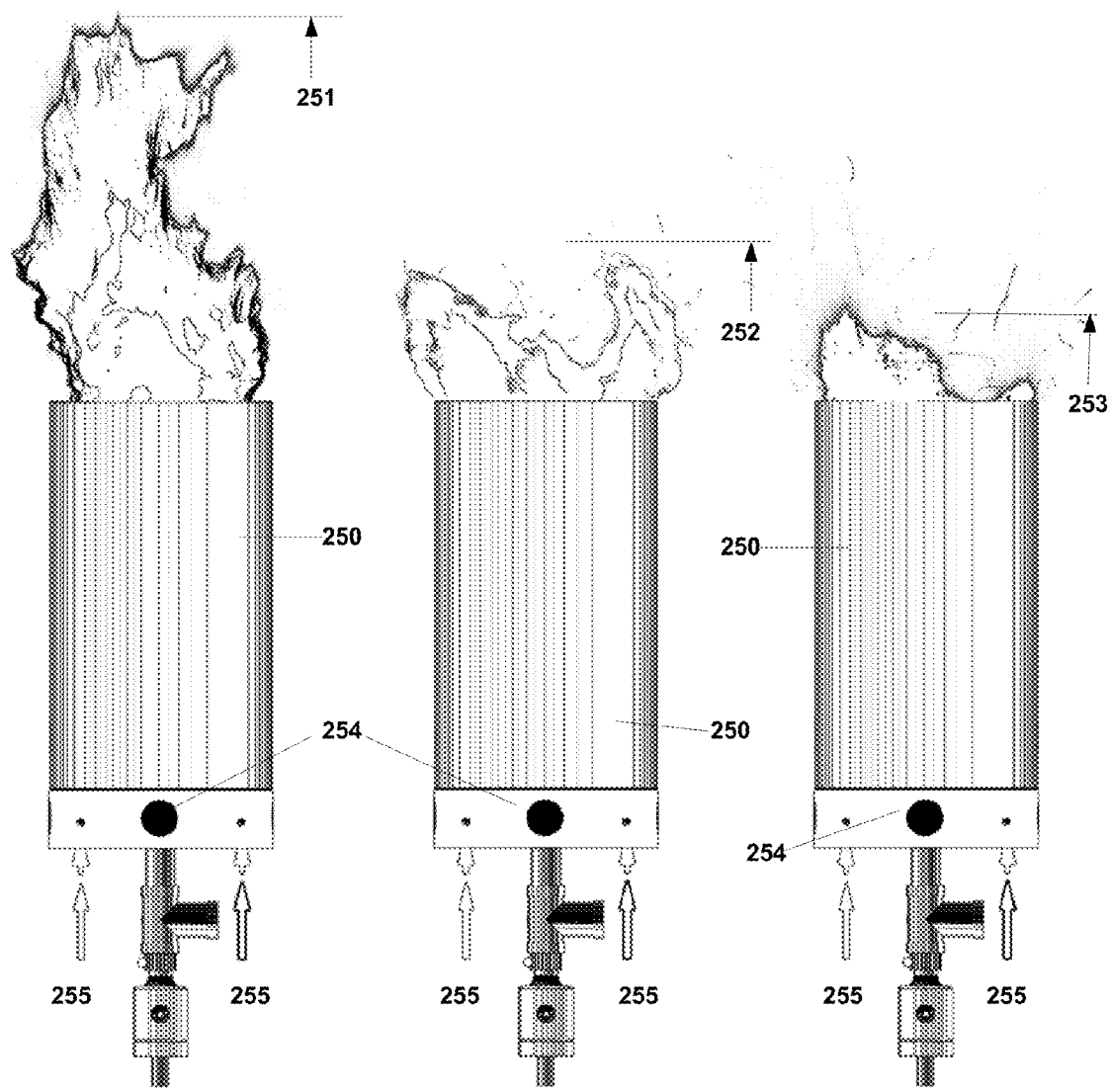
FIG. 25A shows flame height for a low active secondary air flow rate.
FIG. 25B shows flame height for a medium active secondary air flow rate.
FIG. 25C shows flame height for a high active secondary air flow rate.

FIGS. 25A, 25B, and 25C illustrate the relationship of the flame height 251, 252, 253 to three separate active secondary air flow rates while the primary mixture air flow and powdered fuel mass flow rates are held constant at a medium value. Passive secondary air enters through four holes 254 of 1-inch diameter near the burner 250 base, while the active secondary air enters through two vertical tubes 255 with a series of spray holes in the upper part of the burner. See FIGS. 26A and 26B for two vertical internal tube details.

FIG. 25A shows the tallest flame height 251, as a low amount of active secondary air is supplied, thereby requiring a substantial portion of the combustion to complete by virtue of room air available to the hot oxygen starved mixture at the top of the burner exit.

As active secondary air flow rates are increased in FIG. 25B and FIG. 25C, the combustion requires less vertical space to complete and the exposed flame height 252 decreases accordingly. The highest secondary air flow rate (FIG. 25C) completes all of the combustion within the burner enclosure, and is often the most desirable condition.

Figures 26A, 26B:
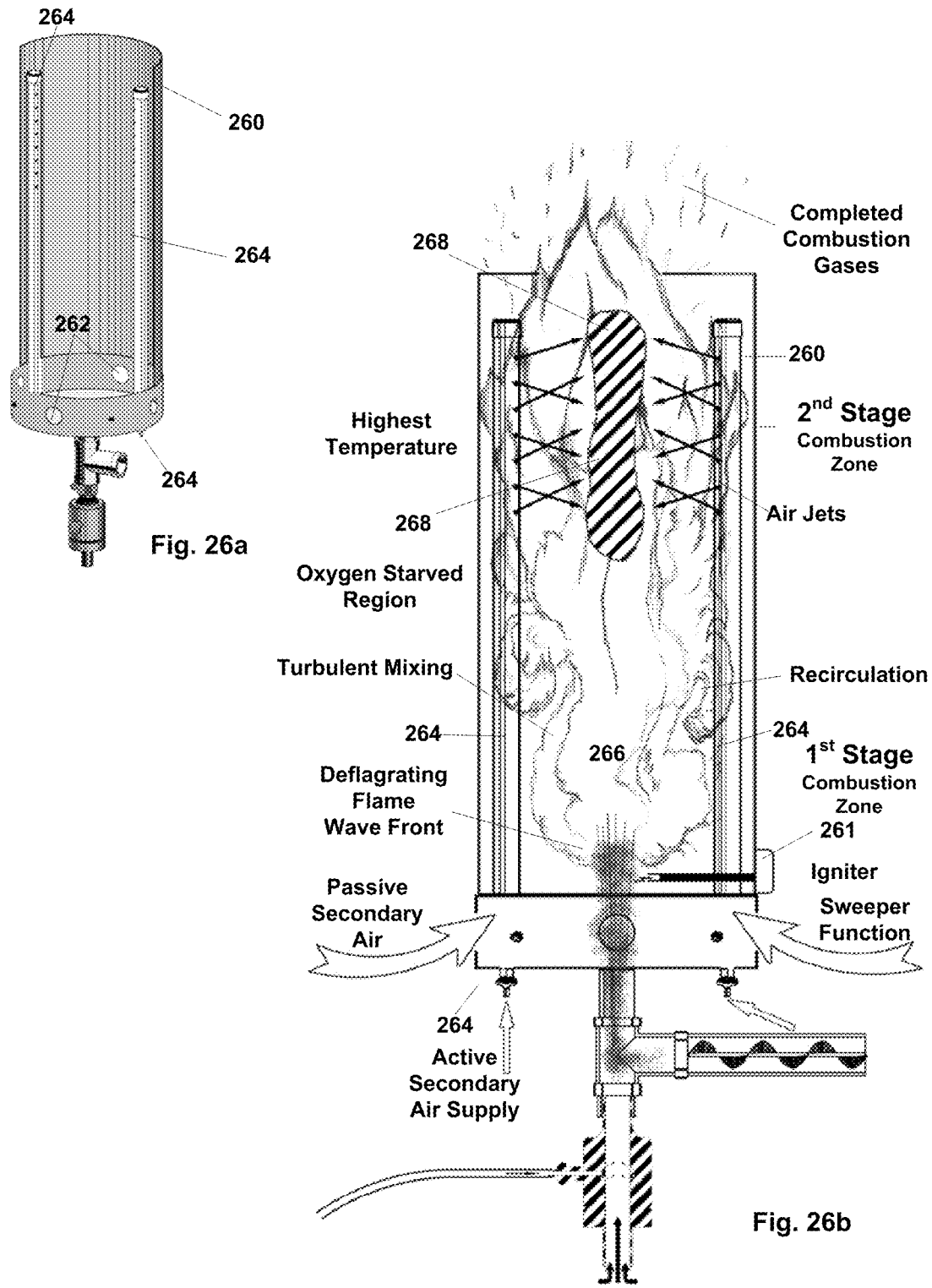
FIG. 26A shows a cut-away of a 6-inch stove pipe with copper secondary air nozzles.
FIG. 26B shows a schematic view of fluid flow with a deflagrating flame for the stove pipe.

FIG. 26A shows the configuration and internal combustion structure for a 24-inch tall by 8-inch diameter stove pipe burner 260, with 4 passive secondary air holes 262 and two multi-holed, internal vertical air tubes 264 that provide active secondary air to insure combustion completion in the second stage inside the burner.

The performance of this embodiment is excellent, allowing for the delivery of high BTU per hour rates while substantially completing combustion in the burner enclosure. FIG. 26B graphically illustrates the complete operation of this vertical explosible powdered fuel burner system fed from the positive displacement powder dispersion system's mixing system through to the exhaust outlet of this 8-inch diameter burner, with a focus on the internal combustion processes fluid mechanic and kinetic processes.

Two stationary combustion fronts with different flame speeds are observed in two distinctly separate combustion zones in our burner: the lower first zone 266 called the first stage, is a low speed process, with ignition by an igniter 261 and initial combustion near the base; and the second 268 called the second stage, a high speed combustion completion process driven by high speed active secondary air in the upper burner section.

Near the base is an annular combustion front at the bottom or initial surface of the flame front. This is a fuel rich zone or volume with the initial fuel-air (fuel-gas) dispersion arriving in the base of the burner at a velocity near double the flame speed.

There ignition is begun and sustained with continuous heating and conduction transfer from gas to particles in the reaction zone, which quickly raises the reactant mixture above ignition temperature to a sustained combustion temperature. The initial portion of the fuel air mix exiting the nozzle is not ignited until the velocity reduces and particle dispersion diverges with the mixture at an explosible equivalence ratio. Once heated and ignited by the flame front, the fuel in turbulent suspension at the flame front goes to completion, consuming available oxidizer in the region and heating neighbors.

This combustion front, following fluid mechanics principles discussed earlier in this disclosure, does not initially exhibit cross-sectional uniformity. It is predicted and can be observed that most of the initial burning takes place in a hollow, diverging volume characterized by high speed, rich and unignited flow in the center, with lower speed turbulent combustion wrapped around and forming the outside of the burning volume.

In this initial fuel rich zone, the powder-air stream is partially burned crossing the ignition wave front of the flame. This burning continues to consume and complete particle combustion until the locally available oxygen is spent. The remainder of the unburned or partially burned fuel suspension, raised above ignition temperature, moves away from the first stage zone combined with nitrogen gas, $CO_2$, and zero free oxygen.

Ideally, this superheated fuel rich, oxygen depleted annular powder cloud proceeds into the second stage combustion zone where it encounters a high speed uniform and concentric oxygen rich flow of active secondary air, rapidly burning completely.

Room temperature secondary air at reasonably high velocity and/or flow rates can enter this more stable second stage combustion zone, superheated greater than the combustion temperature, with an intense air stream at much higher velocity without flame blow out than is possible in the first stage initial combustion zone.

However, it is important that the active secondary air forces, which impact the hot oxygen starved dispersion, are not so energetic or widely off axis that they overwhelm the natural turbulent flow in this second stage combustion zone, knocking these hot particles out of suspension and thereby causing agglomeration or impact with the combustion enclosure walls. Proper choice of flows, velocities, and distribution technique and direction angles is important, as anyone skilled in the art can appreciate. These principles are extensible to a wide variety of secondary air delivery configurations used for two-stage combustion, and are not intended to be limiting.

It should be understood that the size of the burner combustion enclosure volume is primarily dictated by the BTU/hour rate planned for normal operation, even though we have a remarkable and uniquely high dynamic range of operation for a solid fuel combustion device, typically a 10:1 turndown ratio. For a burner this large, it makes sense that at low flow rates the width of the 8-inch burner is close enough to "free space" that its performance declines. This 200,000 BTU/hour embodiment is therefore not normally intended for continuous operation in the 10-20,000 BTU/hour range.

For flow rates sufficiently low, the vertical walls of a burner have too little effect on the flow patterns, since they are effectively "infinitely" far away. Specifically for low air-fuel explosible mixture flow rates, this wide burner provides less flow resistance to the dispersion stream, hence will generate less turbulence by shear, resulting in a decrease of mixing, recirculation and flame re-ignition, thereby bringing a decrease in temperature to the lower part of the enclosure.

At low flow conditions, the Bernoulli effect continues to operate, yet is substantially reduced in effectiveness. With this wider outlet opening for a given height burner, we lose the various benefits of flue gas and flame recirculation as mentioned above. Simply put, at low flow rates the 8-inch burner is close enough to "free space" that it stops working well compared to more appropriate mechanical designs.

Figure 27:
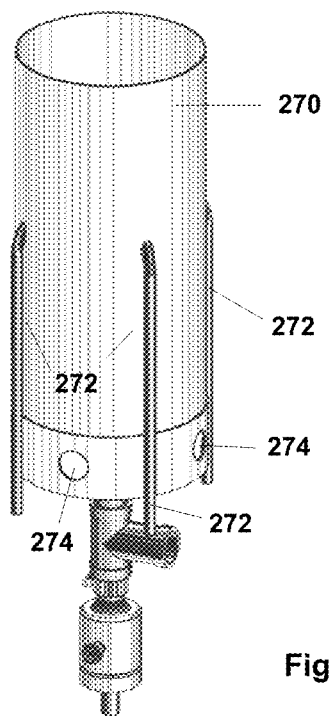
FIG. 27 shows a 6-inch steel stove pipe burner with four copper active secondary air tubes.

FIG. 27 shows a very robust system of supplying active secondary air to the second stage upper combustion zone of a 6-inch steel stove pipe burner 270. In one embodiment (not shown), three half inch copper tubes are run on the outside of the burner steel enclosure at a separation of 120 degrees around the vertical axis. Each tube is closed off with an end cap on a 45-degree street elbow, having a 1/16th inch hole for the nozzle orifice. The three nozzle end caps penetrate the side of the combustion chamber sidewall in a similar manner to the following embodiment.

The embodiment shown in FIG. 27 utilizes four copper active secondary air tubes 272, each 3/8-inch in diameter, running up the outside of the stove pipe combustion enclosure. These tubes are bent at about 75 degrees to the vertical, with nozzle end caps penetrating the enclosure. Both include passive secondary air holes 274 near the base. We found air jets located at or near the circumference of the burner aimed inward at about 15 degrees off the burner flow axis performed well.

For both configurations, a wide range of control was available to adjust a tenfold range of BTU/hour energy conversion rates (20,000 to 200,000 BTU per hour) with stable deflagrating flame wave front combustion and protruding flame heights from near zero to two feet above exit possible. This burner system is a highly efficient and controllable combustion system for our powdered fuel. It is easy, from a cold start, to raise the internal operating temperatures in the second combustion zone above 1900° F. in under a minute.

There is obviously a complete response surface that describes this combustion process and secondary air introduction based on fluid mechanics and combustion kinetics. Therefore, our disclosure is not limited to these specific angles, secondary air flow rates, pressures, number of jets, vertical location, and jet nozzle hole diameters combined with burner diameter and air-fuel flow rates.

Maintaining Explosible Conditions and Avoiding Agglomeration

Various means and methods may be used to maintain explosible conditions and avoid issues of agglomeration for the explosible powder in a burner of the present invention. An explosible dispersion is developed and kept stable by a number of techniques with special emphasis on three: maintaining the turbulent energy level inside burner; feeding the dispersion of individual explosible particles into the combustion chamber at a sufficient velocity with adequate primary and secondary air to insure a non-lazy suspension of all fuel particles for combustion; and avoidance of collision with structures or other particles which encourage agglomeration formation and growth.

The explosible dispersion begins at the exit of the auger within the positive displacement powder dispersion delivery means (PDPD), although problems with particle size maintenance issues may begin far upstream of this location and can possibly continue downstream as well.

After manufacturing, the powdered fuel is subject to the forces of handling, storage and metering prior to final air-fuel mixing, ignition and combustion. These processes introduce mechanical shear, which combines with humidity and the fibrous nature of biomass, to produce agglomerate, larger particles comprised of many small ones.

As a result of the comparatively "large size" of agglomerates, they present problems as they do not conform to the requirements of single phase combustion in that they do not flash burn instantly, they are slow to heat, do not burn completely, but may burn partially and form a char coating, plus may fall out of suspension, due to their mass and aerodynamic properties. If recycled soon and gracefully inside a burner, they may be entrained and burned. If recycled improperly as large, low velocity particles into the high velocity powder dispersion stream, they may incur multiple collisions, often building in size like a rolling snowball.

In the series (FIG. 28 through FIG. 39) that follows, we disclose embodiments of a recycle consuming burner shown especially in FIG. 37. Various means for collection of unburnable particles and ash are also covered. It is anticipated that this integrated approach to managing recycle, agglomeration issues, some particle size reduction and combustion residue with powdered solid fuels is unique for powder fuel combustion.

Figure 28:
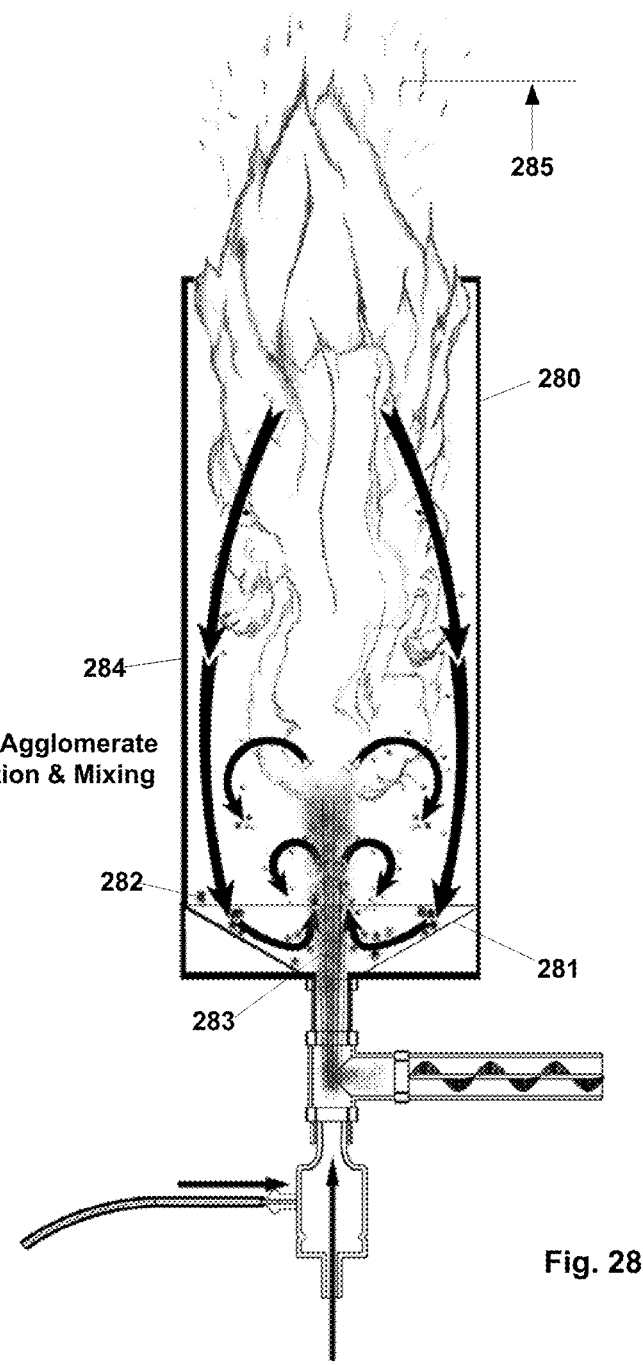
FIG. 28 shows agglomerate recirculation and mixing using a 30° cone insert in a 6-inch stove pipe of the present invention.

FIG. 28 shows internal flow and recirculation patterns in a 6-inch steel stove pipe burner 280 fitted with a 30-degree sloped cone insert 281 at the base to perform unburned particle and agglomerate recirculation and mixing. The internal flow and turbulent recirculation patterns are shown by the arrows in this totally enclosed burner without the benefits of passive secondary air. The hole in the bottom of the cone is wide enough to allow the vertical primary air-fuel dispersion to flow upward, unimpeded.

Any type of particles, from powder to oversized powder particles to agglomerate 282 that is caught up in the recirculation turbulence and falls out of suspension is gently directed back toward the vertical flow stream 283 for re-entrainment.

Figures 29A, 29B:
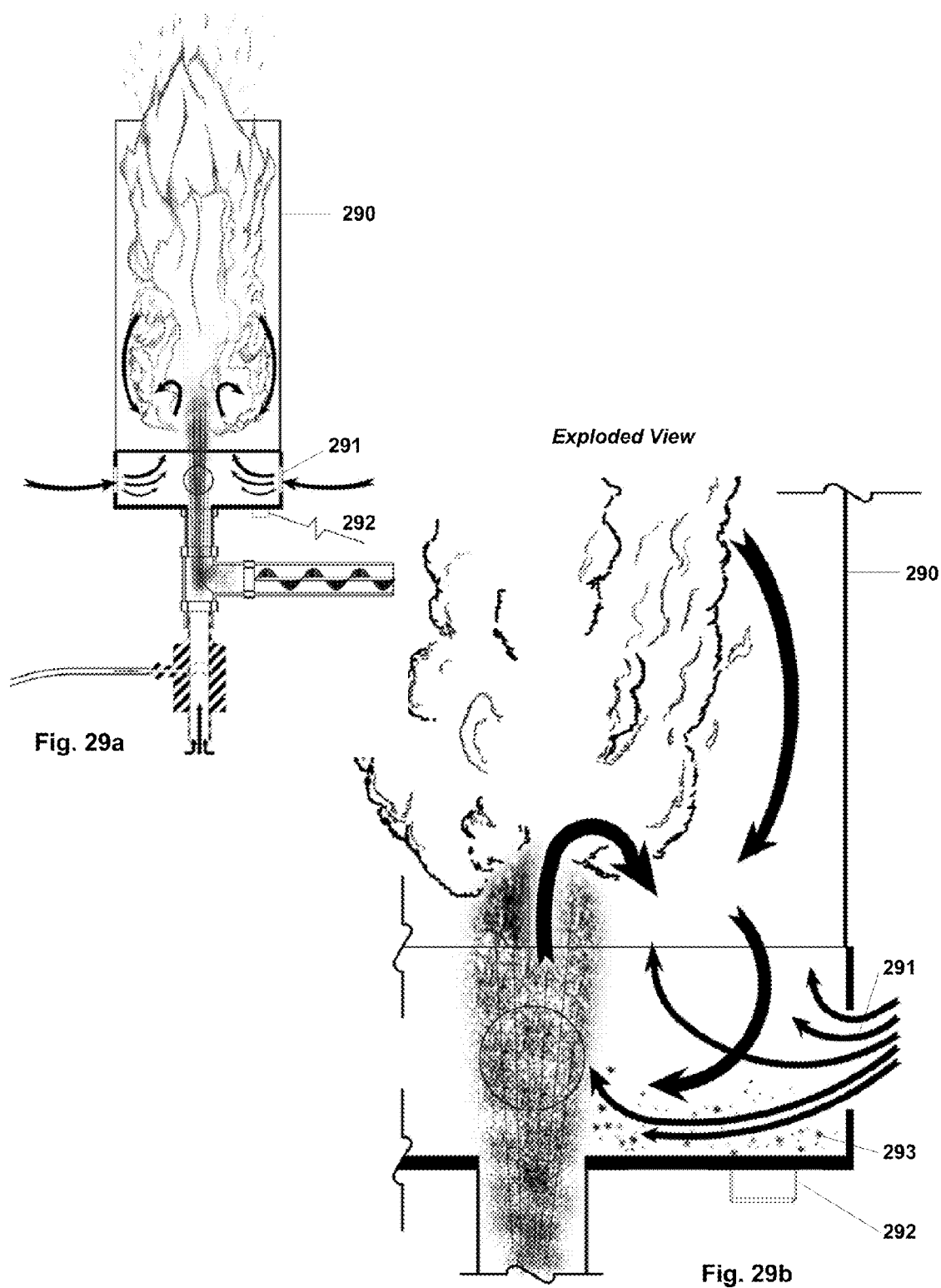
FIG. 29A shows agglomerate recirculation and mixing using four secondary air inlet holes and vibration in a 6-inch stove pipe of the present invention.
FIG. 29B is a magnified view of the lower right section of the burner of FIG. 29A.
Figure 31A:
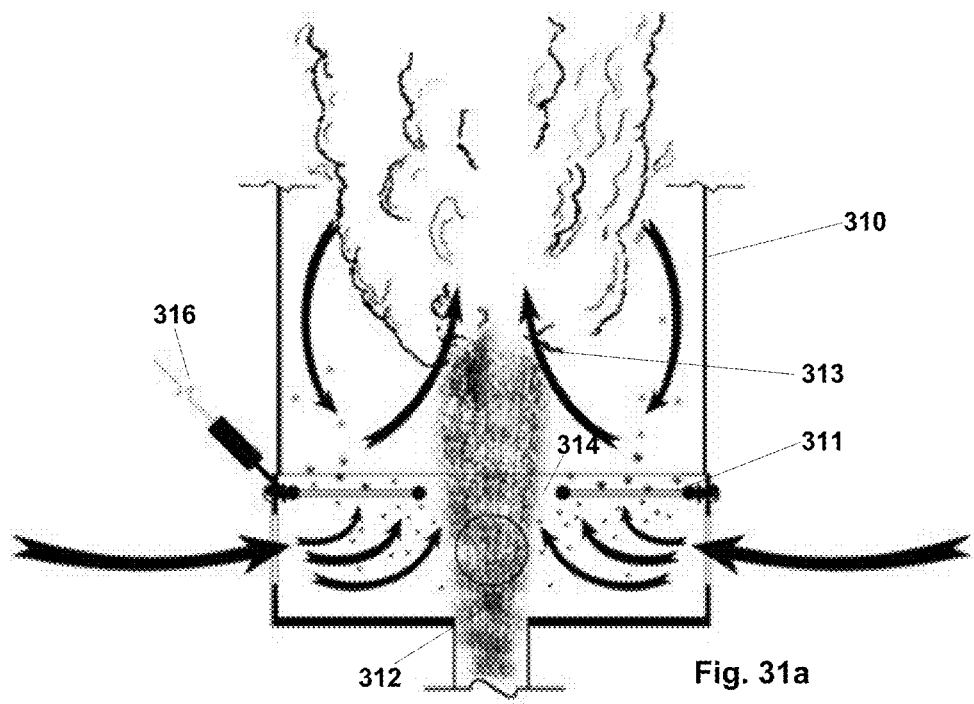
FIG. 31A shows a burner with an ultrasonic agglomerate lump dispersing screen system.
Figure 32:
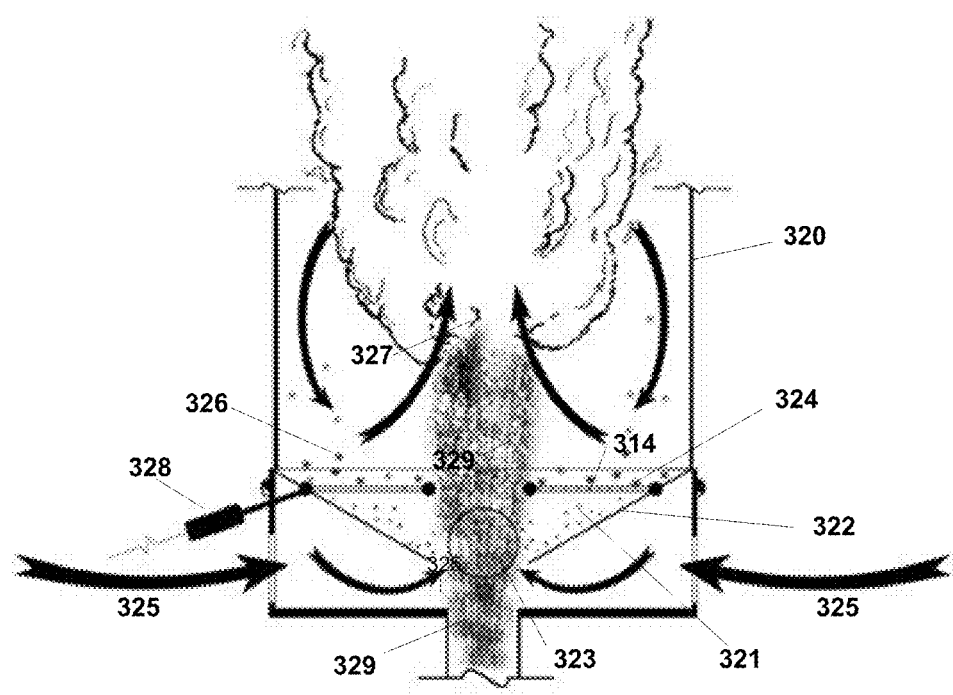
FIG. 32 shows a burner of the present invention with a wide 30° cone, baffled passive secondary air, and ultrasonic lump destruction.
Figure 33:
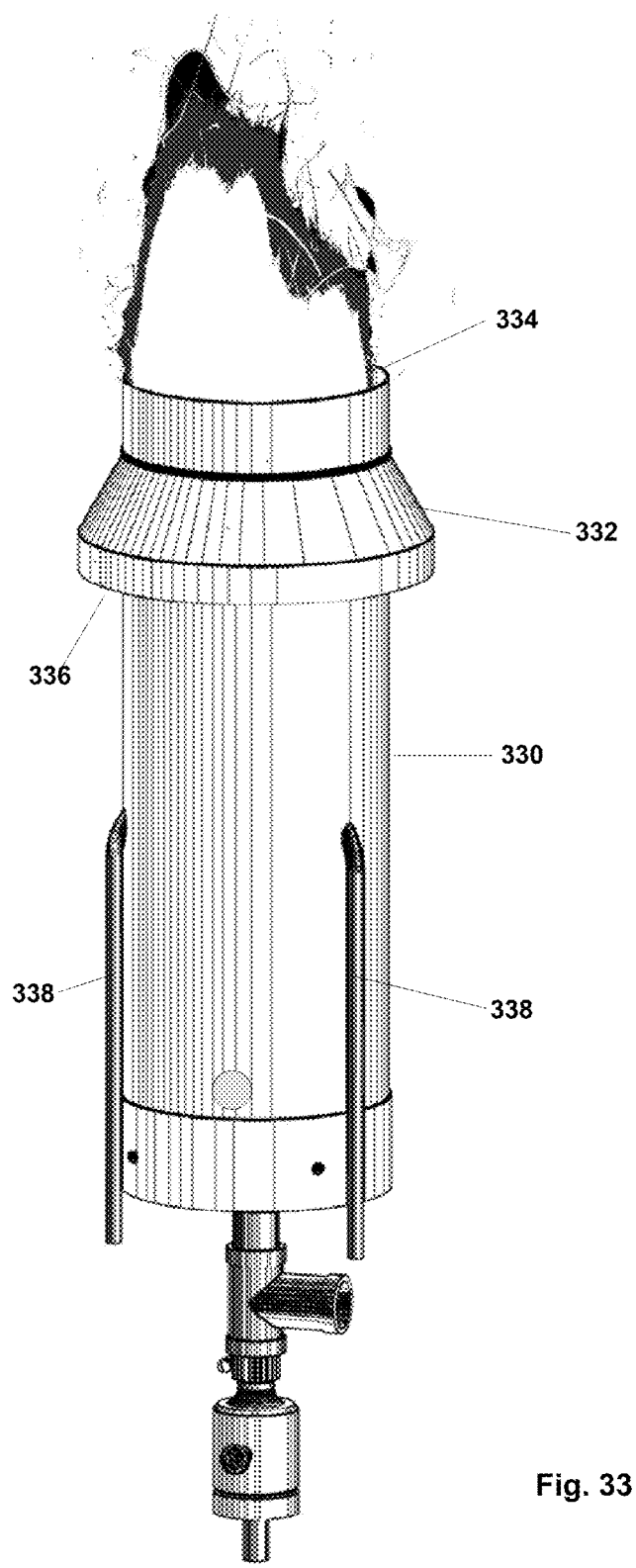
FIG. 33 shows a burner with a top hat flow reducer mounted at the top of the stove pipe.

FIG. 29A shows an alternate agglomerate recirculation and mixing embodiment strategy employing four passive secondary air inlet holes 291 combined with vibration 292 in a similar 6-inch stove pipe burner 290. The goal is to compare the effectiveness with the 30-degree cone approach used in FIG. 28. The internal flow and turbulent recirculation patterns are shown by the arrows in this burner with an improvement in vertical flow and stronger recirculation turbulent mixing.

A vibration apparatus 292 is attached to the bottom of the burner, causing any particles or agglomerate fallout to dance on the bottom of the burner. This vertical vibration energy, when combined with the cross burner "sweeping" function performed by passive secondary air, encourages particle and agglomerate fallout to move toward and be entrained by the high velocity vertical premix dispersion flow.

FIG. 29B is a magnified view of the lower right section of the burner of FIG. 29A, showing how the "sweeper" air recirculates unburned "dancing particles" comprised of agglomerate, individual or oversized particles 293. The use of a vibration apparatus 292 encourages this vertical dancing or bouncing, so the wide range of flow from the passive secondary air holes can move any fallout back toward the high premix flow for return to the stationary deflagrating wave for combustion.

The embodiment of FIG. 30A combines the strengths of methods detailed in FIG. 28 and FIG. 29B and improves on them by raising a wide hole version of the 30-degree cone design upwards enough to allow passive secondary air 301 entering from below through four 1-inch holes 302 to assist with lifting and entraining fallout particles 303 gathered by the cone back toward the stationary deflagrating flame wave front.

Burner design 300 combines both recirculation and passive secondary air together to further improve functionality. With more oxygen available in the first stage combustion zone, the resulting flame height 306 at the burner top exit is therefore decreased.

After exiting a metering device, an embodiment of our system design drops the fuel including some aforementioned agglomerate into a sufficiently turbulent air stream. This turbulence de-agglomerates the substantial majority, dispersing it in a manner sufficient to result in near complete combustion (99.8%+) in a fraction of a second.

Sufficient turbulence to de-agglomerate most powders within specification (i.e. not overly moist) is produced in the mixing "T" fitting 305 called the mixing zone, located between the auger output 306 and air amplifying eXair eductor combination 307 used with our horizontal auger PDPD feed system for both horizontal and vertical burners. With horizontal auger PDPD feeds into near-horizontal burner configurations, we utilize an additional air jet, produced by sending pressurized air through a 1/16-inch hole into the falling auger output stream (see FIG. 40A).

FIG. 30B is a magnified view of the bottom section of the burner of FIG. 30A, with arrows showing how the recirculation flow patterns above the elevated 30-degree wide mouth cone 304 encourage particles 303 back towards the vertical and rising premix dispersion. These functions combine with flow from the passive secondary air holes 302 which rises coaxially around the dispersion, concentrated by the wide hole in the cone. By focusing and restricting the area for this secondary flow, its ability to lift particles and small agglomerate for recirculation is significantly improved.

It should be noted that the use of four 1-inch holes as an inlet supply for passive secondary air is only one of numerous methods to accomplish the same function. The same applies to air flow supply methods and means employed if conversion from passive to low flow active secondary air is technically warranted.

FIG. 31A shows a burner of the present invention with an ultrasonic agglomerate lump dispersing screen system 311 in the lower section of the burner enclosure. The vertical flowing air-fuel dispersion stream 312 flows through the center of the screen 311 towards the stationary flame wave front 313.

As background, depending on the combined characteristics of the fuel, forces of mechanical shear encountered in handling, humidity plus position of the clumps dropping into the turbulent mixing zone, some agglomerate may resist complete destruction by the previously disclosed intensely turbulent air stream and configuration of the mixing zone alone. Rather they can become smaller, smoother and more rounded agglomerate.

The vast majority of the agglomerate problem may be solved by judicious use of an agglomerate destructor screen, shelf or table-like structure, powered by an ultrasonic transducer driven by advanced signal processing techniques, including a multi-frequency spread spectrum type of signal. The screen does not necessarily have to be quite as fine as the final mesh size of the original individual particles, just with small enough openings to impart adequate energy to the agglomerates to disintegrate them into their original individual particle constituents, which subsequently flow through the screen unimpeded.

If any agglomerates are formed downstream of this deagglomeration stage through collisions, such as particle-to-particle or with flow conduit walls and fittings, they must be dealt with separately in the burner through various methods described in our unique and inventive methods for agglomerate destruction, collection and recirculation found in this disclosure. These techniques are outlined in descriptions of several burner design configurations which follow, and in combination, constitute further inventive disclosure.

A top view example of a general design for an ultrasonic agglomerate lump destructing screen appears like the head of a tennis racket. The hole 314 in the middle is of adequate diameter for the still essentially laminar vertical high speed primary air-fuel dispersion to flow through without particle collisions. The screen is shown mounted by four vibration isolation points 315 inside the 6-inch diameter burner enclosure 310, and connected to an ultrasonic transducer 316.

FIG. 32 shows the combination of an elevated 30-degree wide holed cone 322 with an ultrasonic lump destruction screen 324 driven by a transducer 328 to comprise an agglomerate recirculation and dispersion system, augmented by baffled passive secondary air in a 6-inch vertical burner 320. Particles 321 from agglomerate 326 fall through the ultrasonic destructor screen, and through the mechanisms of burner enclosure low frequency vibration and internal air recirculation, find their way to the edge of the cone's central hole 323 where they are swept up and transported as fresh reactant back towards the reaction zone 327 by a combination of eduction from the high speed air-fuel stream and the uprushing lift from secondary air flow 325 around the flow stream 329.

FIG. 33 shows one type of "top hat" flow restricting reducer 332 mounted atop the 6-inch burner of FIG. 27. This 8-inch to 6-inch reducer set atop a 6-inch burner 330 allows a passive or active tertiary air flow 336 to aid with final combustion completion, while still offering some flow restriction on the burner exit throat 334.

It was observed that the presence of this reducer, also called a "densifire" and "intensifire", reduced the exit 334 flame height, affected the flame color, increased the temperature and internal circulation, and increased the sound intensity. This burner was roaring white hot flame at 334, especially with the aid of active secondary air 338 and passive secondary air through holes at the base. A reduced outlet area likely improves the turbulent recirculation functions, as it produces a higher blockage ratio, a non-dimensional ratio of burner cross sectional area to discharge throat area. Reducer 332 outlet restriction may be particularly useful to maintain stability, by preventing collapse of recirculation during operation with low BTU/hour primary air-fuel flows in larger diameter burners.

An alternative embodiment to further restrict outlet flow uses a tight fitting 6-inch to 4-inch reducer 334, thereby eliminating the simple one inch circular tertiary air inlet 336, which can be accomplished by different means if desired.

Figure 34A:
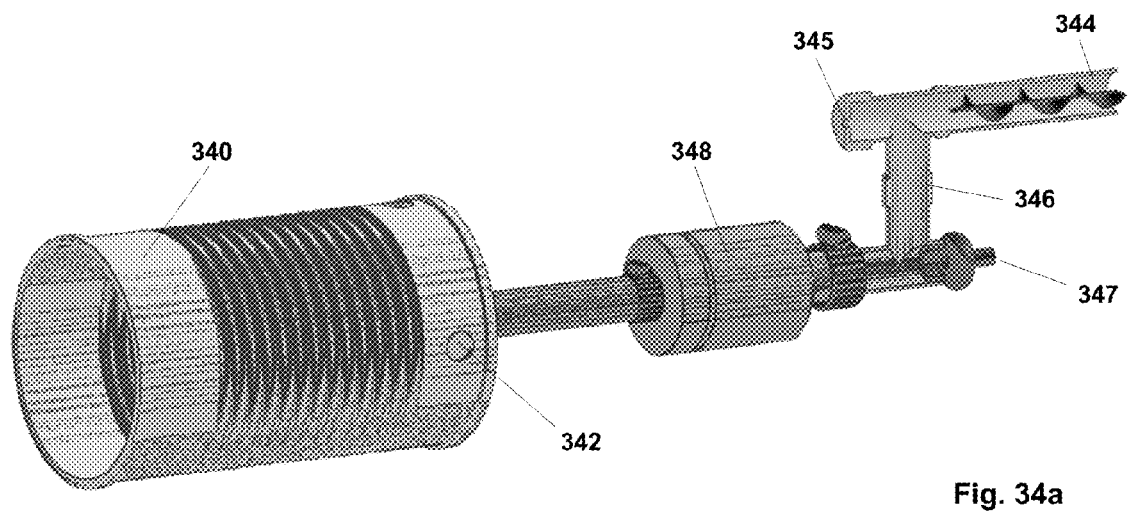
FIG. 34A show a horizontal four-inch can burner of the present invention.
Figure 34B:
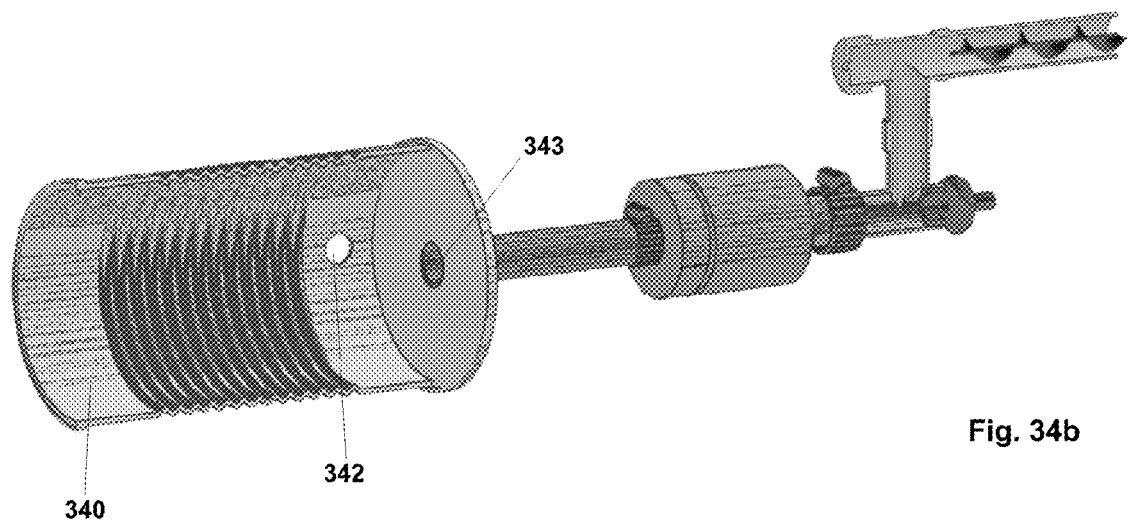
FIG. 34B is a cut-away view of the burner of FIG. 34A.

FIG. 34A depicts a early horizontal combustion and powder dispersion feed system using a four inch can burner 340 with passive secondary air. The powder is fed by an auger 344 into a tee fitting where it drops down through conduit 346 and into an inverted tee fitting. There it encounters high pressure air from inlet 347 which breaks up much of the agglomerate from screw feeding, and is turbulently mixed with sufficient primary air to supply the eXair ½-inch air amplifier 348. The dispersion is further improved by this operation, with more agglomerate breakup, then sent in a fuel rich flow dispersion toward the nozzle 343 where it enters the simple combustion enclosure and is ignited. FIG. 34B is a sectional view of the four-inch burner can 340 showing one of four passive secondary air holes 342 and primary air-fuel connection 343 from the powder dispersion feed system.

FIG. 35 diagrams the internal geometric and combustion structure of a 4-inch horizontal burner assembly 350 with novel passive secondary air management accomplished by dual coaxial enclosures 350, 352. Many of these concepts are present in today's high capacity 1 MM BTU/hr horizontal burner. The primary air-fuel mixture is fed into the nozzle located in the 3.5-inch diameter inner enclosure 352 as detailed in FIGS. 34A and 34B. Ignition occurs a few inches downstream from the nozzle and combustion proceeds into the outer 18-inch long six inch diameter steel tube 350.

Passive secondary air 359 finds its source in large air inlets 356 and 358, and is guided around the first stage reaction zone protected by enclosure 352 through a circular channel 354 between the inner and outer enclosure. Along that path are several air directing structures. 355 is an angled cowling to direct the secondary air toward the second stage combustion zone. 355a is similar to 355 and has the same function, but has a less abrupt angle. There are optionally several angled vane structures 355b, located around the inside of enclosure 350 used to produce "swirl" in the second stage secondary air. They are angled in the circular channel like stationary fan blades, imparting rotation to the air flow. Airflow 357 is our classic passive secondary air feeding the first stage. The remaining combustion takes place at the exit of the long tube horizontal burner, sourced by outside air, and the flame 351 curls upward as final gas expansion takes place.

This embodiment is easily extensible to the use of active secondary air through inlets 356 and 358, and controlled by choice of the gap 354 between the two enclosures.

Figure 36:
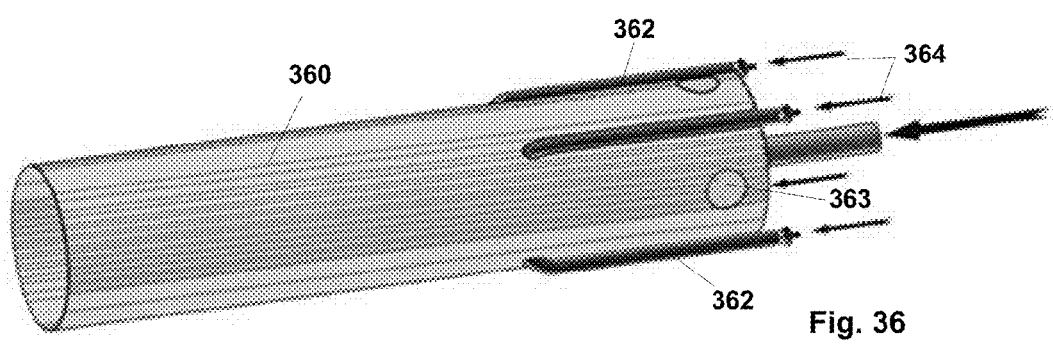
FIG. 36 shows a 4-inch horizontal burner of the present invention with four active secondary air tubes.

FIG. 36 shows a 4-inch diameter horizontal burner 360, fabricated in steel with four active secondary air tubes 362 intended for prototype testing as a direct retrofit into an oil-fired furnace. It utilizes passive secondary air through four holes 363 to achieve a tall, horizontal version of the vertical burner in FIG. 27. This burner has been highly tested and is ready for prototype trials in a formerly oil-fired furnace, delivering 200,000 BTU/hour.

Figure 37A:
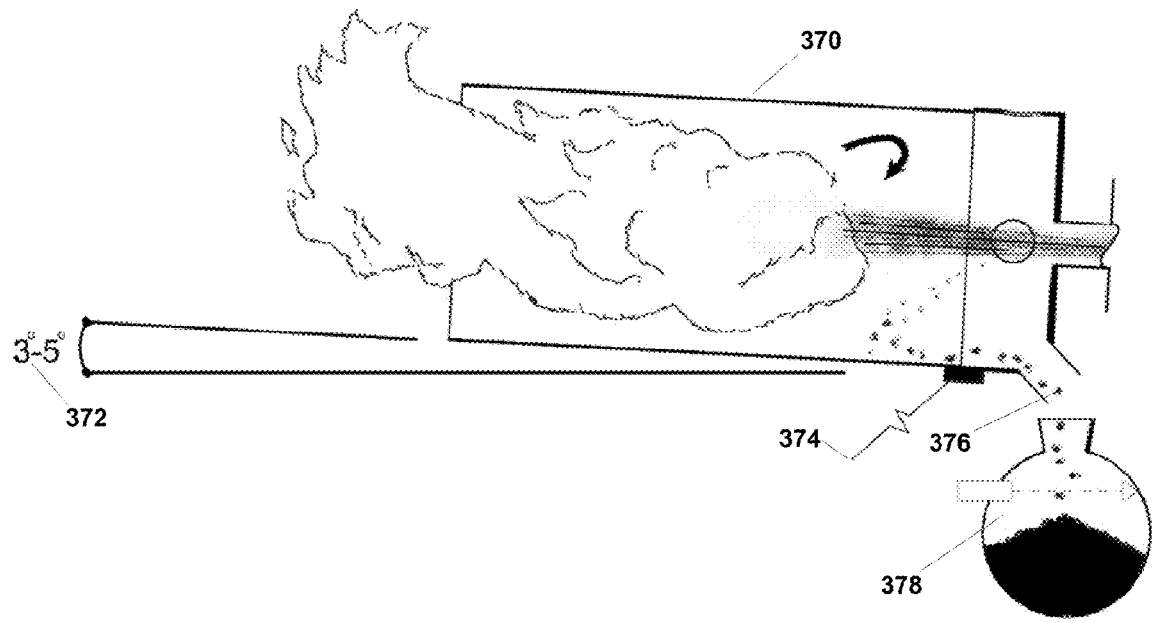
FIG. 37A shows graphically a recycle collecting horizontal burner of the present invention, tilted slightly above horizontal for agglomerate and oversize particle collection.

FIG. 37A graphically depicts a basic recycle collecting horizontal burner 370, tilted up 372 preferably by about 3 to 5 degrees above horizontal for agglomerate and oversized particle collection. A vibrator or ultrasonic transducer 374 causes high-frequency vibration of the burner, which allow agglomerates and oversized particles 376 to move back in the burner toward an opening and into a collection vessel 378. The unburned fuel collected in the collection vessel 378 may be reprocessed to an explosible form or discarded.

Figure 37B:
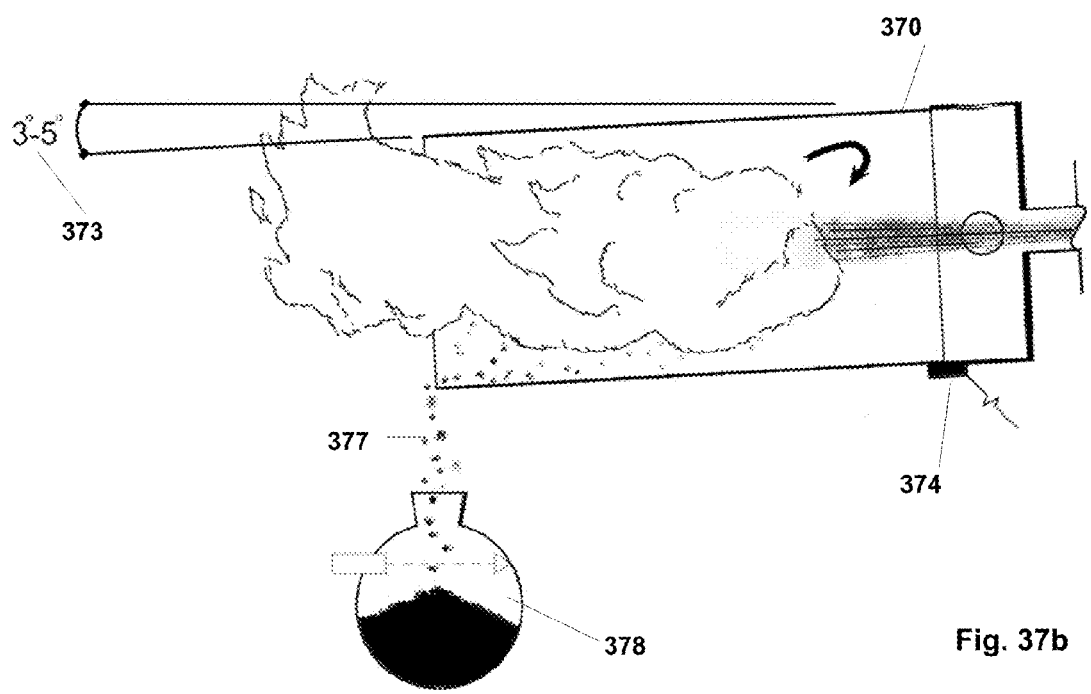
FIG. 37B shows graphically a recycle collecting horizontal burner of the present invention, tilted slightly below horizontal for agglomerate and oversize particle collection.

FIG. 37B graphically depicts a basic recycle collecting horizontal burner 370, tilted downward 373 preferably by about 3 to 5 degrees below horizontal for front end agglomerate and oversized particle collection. A vibrator or ultrasonic transducer 374 causes high-frequency vibration of the burner, which allow agglomerates and oversized particles to move forward in the burner toward an opening 377 and into a collection vessel 378. The opening 377 is preferably at the end of the burner but may be located back from the end slightly. The opening 377 may also be formed as a spout to better direct the agglomerates and oversized particle to the collection vessel 378. The collection vessel 378 is preferably large enough to require only occasional emptying. Unburned fuel collected in the collection vessel 378 may be reprocessed to an explosible form or discarded.

Figure 38:
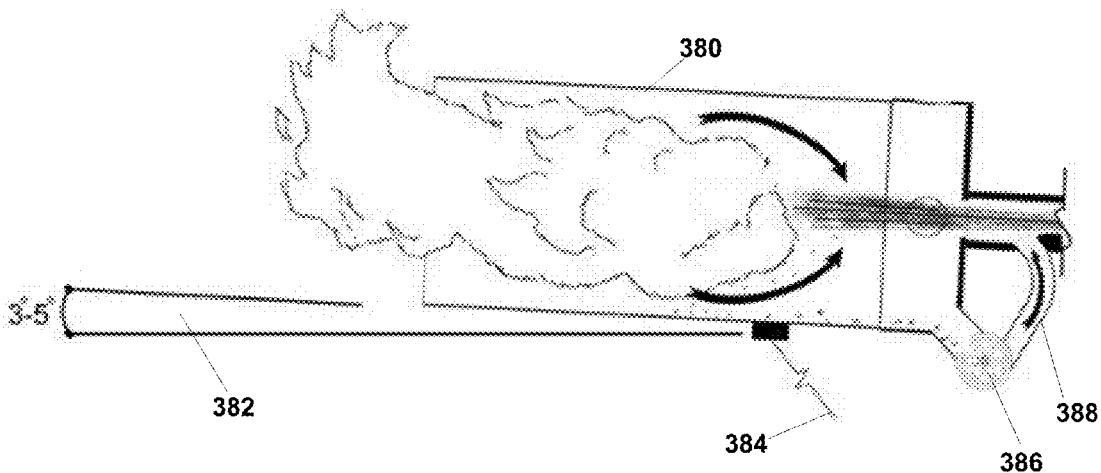
FIG. 38 shows a more automated recycle consuming gravity collecting closed loop solid fuel horizontal burner system of the present invention.

FIG. 38 shows a more automated recycle consuming gravity collecting closed loop solid fuel horizontal burner system with agglomerate and oversized particle reprocessing and reintroduction into the air-fuel dispersion. In this embodiment, the burner 380 is tilted upward 382, preferably by about 3 to 5 degrees. A vibrating or ultrasonic transducer 384 causes high-frequency vibration of the burner, which nudge agglomerates and oversized particles to move back in the burner toward a recycle system. The particles fall toward a recycling device 386, which sends the particles along a recycle path 388 feeding into the main powdered fuel dispersion stream, or into the mixing system. The recycle system preferably provides agitation or grinding to break the agglomerates into small particles.

Figure 39A:
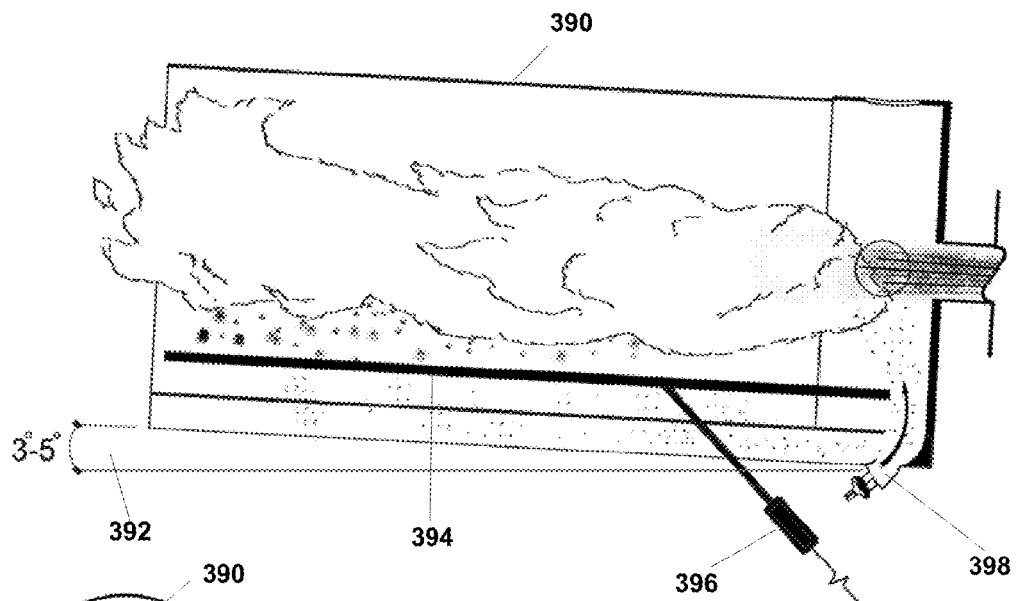
FIG. 39A shows a recycle agglomerate destructing horizontal burner of the present invention with an ultrasonic driven screen for deagglomeration.

FIG. 39A shows a recycle agglomerate destructing horizontal burner 390 using an ultrasonic driven screen 394 for deagglomeration. The burner is preferably tilted up 392 by about 3 to 5 degrees. An ultrasonic transducer 396 causes high-frequency vibration of the screen 394 to break up agglomerates falling onto it and vibration of the burner 390, which allows de-agglomerated particles to move back in the burner toward an active secondary air flow source 398, which recycles the particles back toward the main powdered fuel dispersion stream.

Figure 39B:
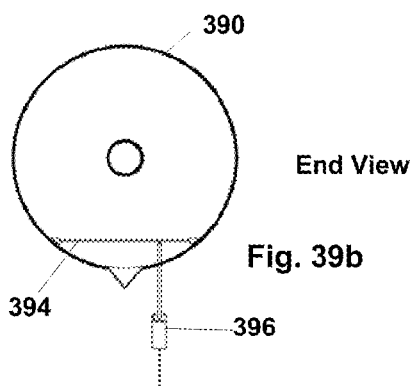
FIG. 39B shows an end view of the burner of FIG. 39A.

FIG. 39B shows an end view of the recycle agglomerate destructing horizontal burner 390 showing the presence of the ultrasonic screen 394 across the lower portion of the burner and a trough for particle collection and movement.

Figure 40A:
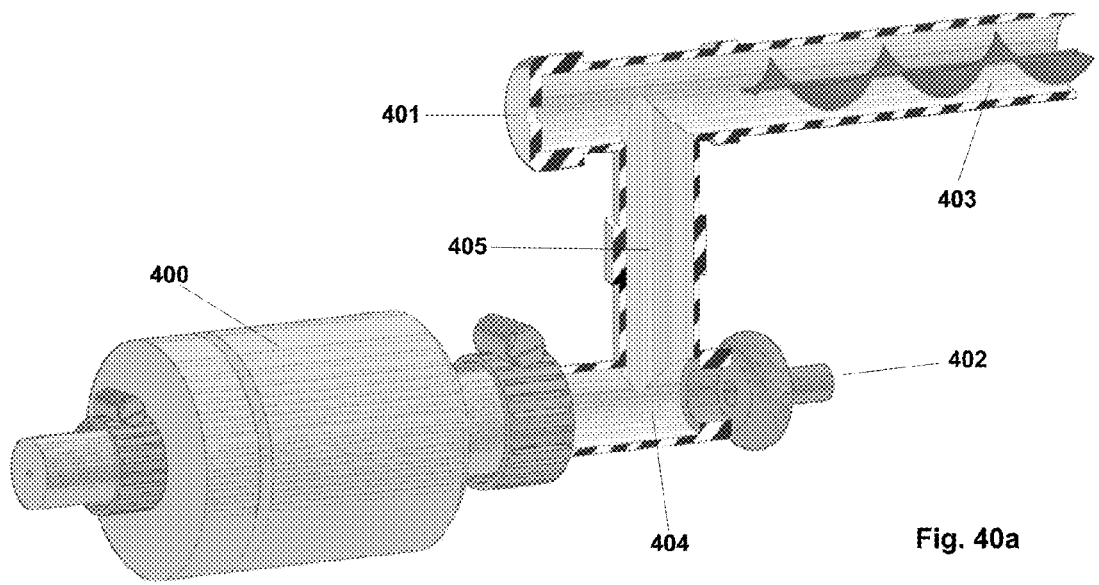
FIG. 40A shows piping drawing details of the mixing zone and infeed for horizontal burners of the present invention.
Figure 40B:
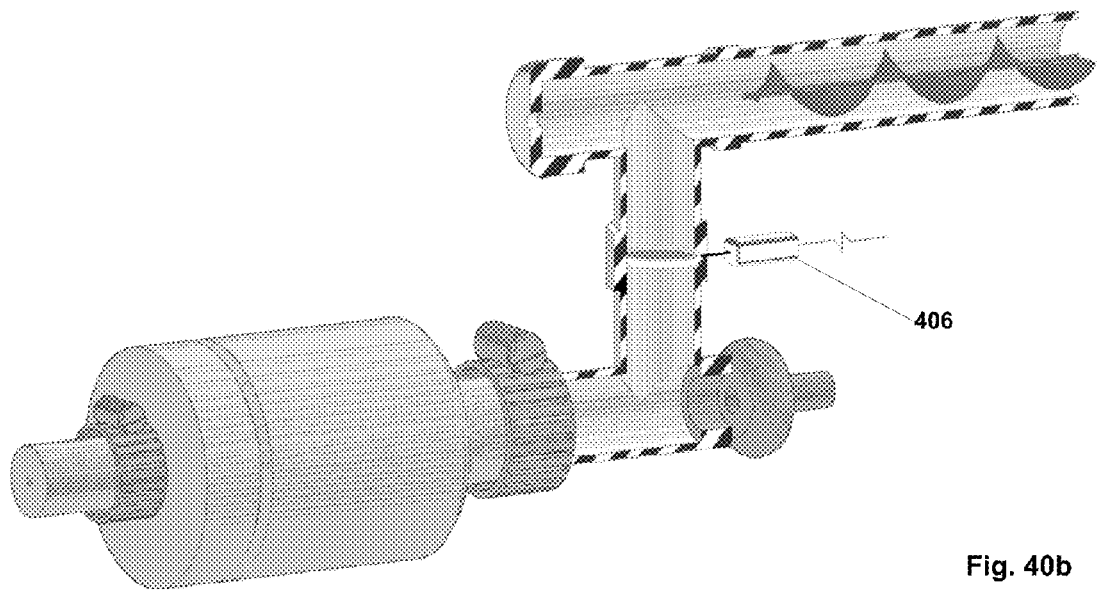
FIG. 40B shows an ultrasonic deagglomeration screen in the mixing zone to the piping interconnection for horizontal burners of the present invention.

FIG. 40A shows a piping drawing detail of a preferred mixing zone and infeed for horizontal burners. A horizontal auger 403 feeds powdered fuel which mixes with oxidizing gas entering at hole 401. The dispersion then travels down a vertical conduit 405 to a horizontal conduit 404, where additional oxidizing gas is added at point 402 before the dispersion travels through an eXair amplifier 400. The burner of FIG. 40B adds an ultrasonic deagglomeration screen with an ultrasonic transducer 406 in the mixing zone 405 to the piping interconnection drawing of FIG. 40A for horizontal burners.

Figure 41:
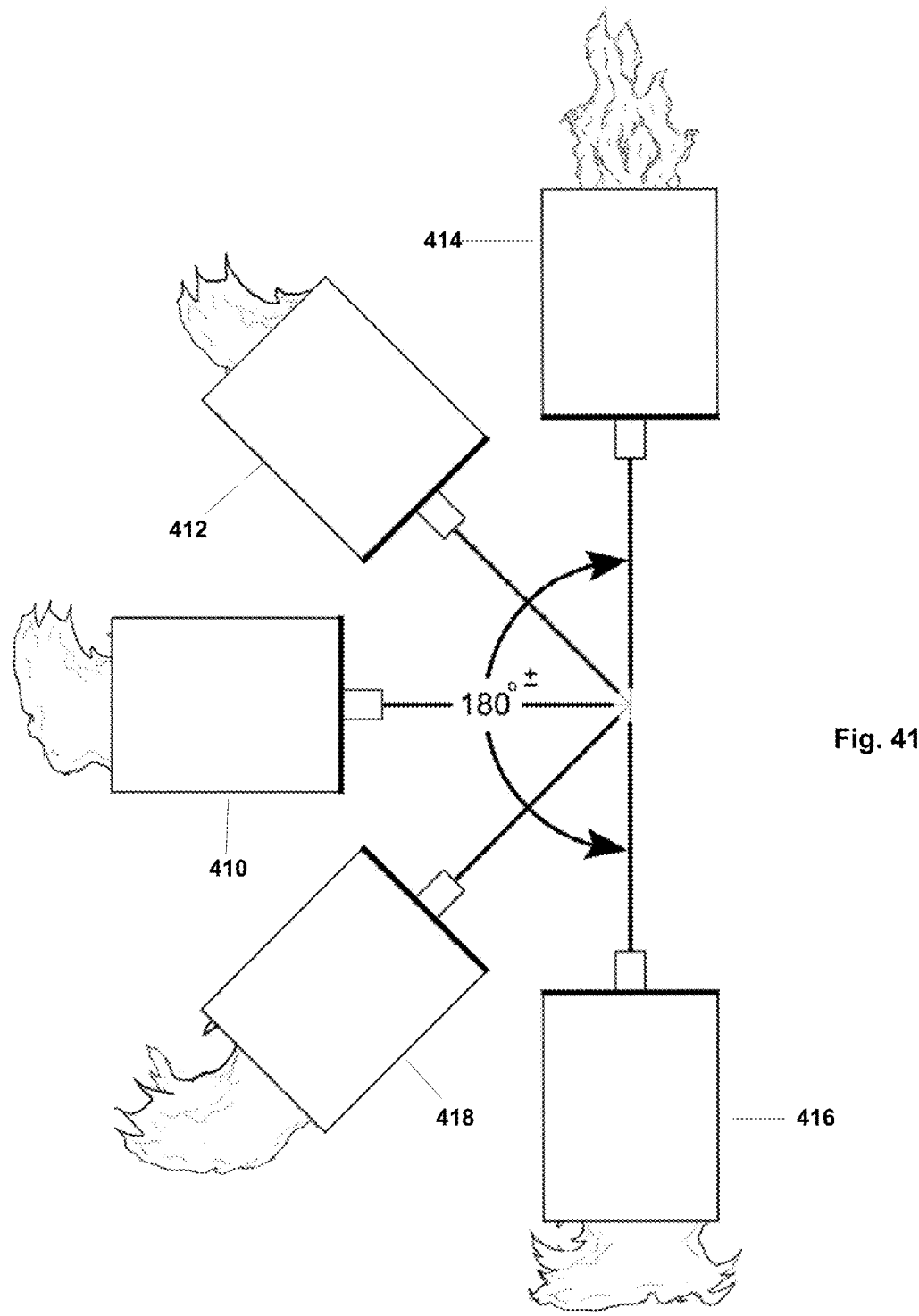
FIG. 41 shows graphically upward vertical, horizontal and downward vertical orientations for a solid fuel explosible powder burner of the present invention.

FIG. 41 graphically shows a wide range, upward vertical to horizontal to downward vertical orientations possible for the disclosed solid fuel explosible powder burners. About a 0-degree orientation burner 410, about an 45-degree orientation burner 412, about a 90-degree orientation burner 414, about a minus 90-degree orientation burner 416, and about a minus 45-degree orientation burner 418 of the present invention are shown in FIG. 41.

Propane burners work at all angles. Ours will too although each orientation shown brings special requirements. It is important to understand the performance differences and advantages of each orientation, plus the challenges and opportunities.

Use of a vertical or near vertical burner provides the opportunity for a given burner design to 1) run at lower flow rates and 2) perform with a larger controllable dynamic range (turndown ratio) than may be accomplished with a near horizontal or downward burner. The major performance difference is due primarily to the challenge of maintaining suspension of the fuel-air mix with very significant particle and gas density differences encountered (perhaps >500:1) when feeding and suspending powdered fuels.

Use of a vertical configuration with various types of vibration also allows for operation with larger particles that typically fall out of suspension more rapidly in horizontal type burners, which do not encounter the same benefits of symmetrical vibration and recirculation patterns of non-explosible particles afforded by the vertical designs as disclosed elsewhere. Near vertical burners can work with a larger fraction of non-explosible particles than horizontal ones, thereby affording the opportunity to utilize lower cost powdered fuels. A specification for what we call "sloppy fuel" may include a manageably small portion of marginally explosible, slightly oversize or oblong particles by choice. Certain applications can easily accommodate the collection and housekeeping issues, such as farms and some industrial uses where the lower cost of fuel pays out.

Downward burners have to fight gravity to keep the combustion reactants suspended and under control. Explosible mixture feed velocity is lowered to maintain the stationary deflagration wave at about the same location. More work is performed by combustion gas expansion and its tendency to rise. Active secondary air near the burner base becomes important for first stage turbulent mixing at lower dispersion stream infeed velocities. Downward burners require a finer with the least oversize fuel particles, unless used in a "sloppy fuel" application.

Opportunities exist for near horizontal burners too, provided that any ballistic issues for agglomerate, over sized or high aspect ratio proper diameter particles can be managed using the techniques disclosed herein. Combined with good fuel management and choices, near horizontal burners still offer a large operating window and options to minimize some of the problems encountered with imperfect fuels.

FIG. 42A depicts our current 1 MM BTU/hr burner slated for test on a grain drier. Many of current design concepts evolved from FIG. 35 burner design principles. This coaxial unit uses an inner first stage combustion enclosure 420 with passive secondary air holes 421. Active secondary air 422 is fed through one or more supply hoses 422a to a circular plenum 423 formed by larger outer enclosure 424 and an outer collar 423. Heading for the second stage combustion completion zone, the active secondary air is fed through an angled directing slot in circular insert 425a and emerges at speeds up to 10× times the powder flame speed to mix the hot particles and supply necessary oxidizer for combustion completion. Optional swirl vanes circumferentially mounted in the coaxial air channel as in FIG. 35 may be used for additional second stage combustion zone support.

FIG. 42B is uses the FIG. 42A design and simply adds active secondary air to the first stage burner enclosure sides near the nozzle end to promote better control of the recirculation and flame support functions. One or more supply hoses 428 feed the oxidizing and support air 421 into a collar or plenum 428a for distribution.

Figure 43:
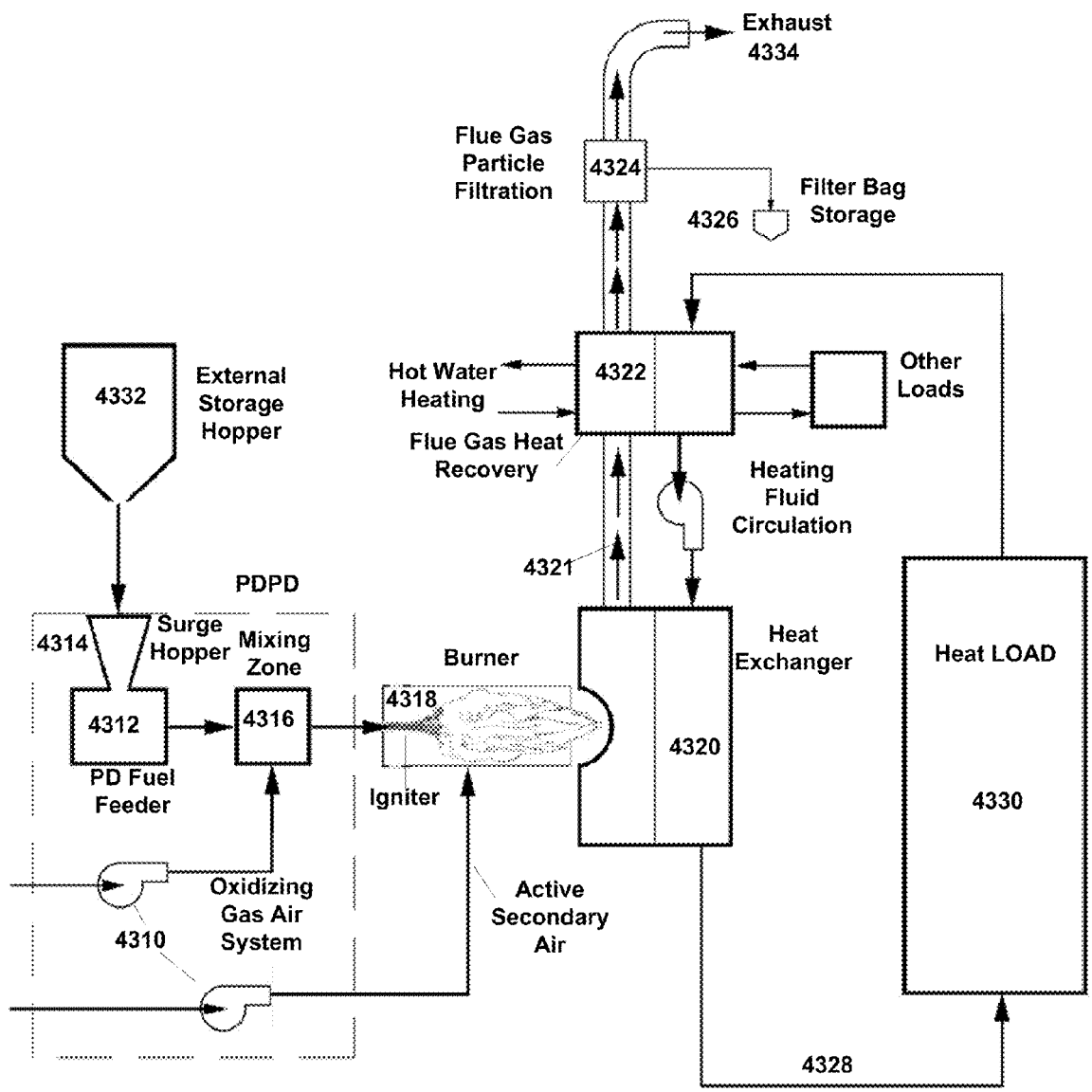
FIG. 43 shows a block diagram of a complete furnace system utilizing an explosible powder burner system and supply for heating.

FIG. 43 is a system level block diagram of a furnace for heating with explosible powder fuel. A PDPD system, comprised of an oxidizing gas feed 4310, a powder fuel feed 4312 with hopper 4314 and a mix zone 4316, feeds the dispersion to the burner 4318, which exhausts into the furnace heat exchanger 4320. Flue gas 4321 continues through a heat recovery exchanger 4322, then a particle filtration system 4324 where air entrained ash is removed and stored 4326 for disposal. The flue gas exhausts to atmosphere 4335. A heating fluid 4328 circulates through the furnace heat exchanger 4230, then to the main heat load 4330, returning low temperature fluid back through a heat recovery exchanger 4322. The burner system, external powder storage 4332 and flue gas particle filtration systems 4324 comprise a unique to adaptation to a furnace for explosible powder fuel direct energy conversion to produce heat.

The most important point to understand about the prior art, when differentiating a burner design and combustion regimen of the present invention from others appearing similar at first glance, is exactly how prior combustion system process operations and burner design concepts conclusively demonstrate again and again the fact that each of those prior art approaches relies upon the art of two-phase combustion regimes regardless of the solid fuel types and particle size distributions.

Fuel parameters must be mentioned since they impact on techniques to maintain a completely explosible combustion regime and ties to burner design choices and operation.

Particle size is important, and the "quality" of that distribution determines the ability of the burner combustion process to run most efficiently and cleanly in the explosible zone, our claimed region of operation. The primary focus is on minimizing oversize particles, ones with a diameter/length over the explosibility threshold for that material (~200 microns for wood), when it comes to the particle size distribution's upper/outer limit composition as a percentage of the entire distribution.

Both the fuel raw material type and powder production process used are major factors for the final manufactured powder fuel's adherence to specification. It is desirable to have a fuel, that when combusted, produces no "sparklers" or "rocket particles", which may result in byproducts requiring disposal. These particles are in fact oversized and will comprise some very small quantity of the overall substantially explosible powdered fuel, in spite of best manufacturing efforts. Decisions on the final grade specification will be based on the burner system performance versus manufacturing system economic models.

The larger the particles, the more quickly they settle out and the more attention dispersion support requires. The transition to viability of single-phase combustion behavior occurs at the explosible boundary with 200+ micron hardwood particles at STP conditions. With particles very close to the transition diameter, we still have to pay a lot of attention to ensure the flow behaves properly. By comparison, if we were utilizing 10 micron particles, maintenance of good dispersion flow conditions would be relatively easy, but the cost of particle size reduction by grinding would be a great deal higher. 80-mesh (177 micron) pine burns better in the vertical burner than in the horizontal, since it contains larger particles. 200-mesh (74 micron) hardwood burns great in both.

A mixed flow of 200 and 100 micron diameter particles will be explosible, if the air-fuel equivalence ratio is in the correct range. With particles on the large side close to the explosible transition line, getting a proper dispersion of air and powder is more difficult. As a rule of thumb, as particle size is slowly reduced, explosible behavior shows up long before it becomes easy to keep the population of particles in suspension.

Usually, a distribution of particles is discussed based on percentages of its population that are above or below some threshold value, or distribution mean, median or mode. However, when it comes to establishing and maintaining an explosible dispersion, it's often more useful to discuss the distribution in terms of weight percentages.

We define a dimensionless number $\chi_w$ which equals the explosible weight $W_e$ of the fuel distribution (those particles less than the 200+ microns explosible in diameter), divided by the total weight $W_t$ of all particles in the population. The goal is to only work with distributions where We approaches or equals 1. The smaller the number, the more difficult the distribution, hence dispersion, is to work with.

$$\chi_w = W_e/W_t, \text{ where } \chi_w \to 1$$

In our burners, oversize particles literally become "ballast" and often a nuisance when attempting to work exclusively with substantially explosible mixtures. We are going out of our way to create and suspend a solid fuel air suspension or dispersion, whereby it will burn as a single-phase mixture, then ignite it.

Burner System Embodiments of Powdered Fuel-Powered Devices

The burner systems and methods disclosed herein may be applied for heating or energy purposes to a variety of device applications including, but not limited to, furnaces, engines, boilers, grain dryers, clothes dryers, hot water heaters, combined furnace/water heaters, hot air balloons, space heaters, wood burning stoves, gas fireplaces, gas turbines and electrical generators, forced hot air heating systems, forced hot water heating systems, forced steam heating systems, and radiant heating systems. Additional devices include ovens, absorption chillers, ammonia cycle refrigeration, patio heaters, heating torches, controllable fire pits, continuous water heaters, booster and inline water heaters, yellow flame gas log sets, inserts, freestanding stoves and built in zero clearance fireplaces, radiating stoves and furnaces, outdoor wood boilers, industrial furnaces and boilers, corn stoves, pellet stoves, coal stoves, entertainment controllable torches, pyrotechnic type displays, and steam engines by replacing or supplementing existing combustion devices with powder burning devices.

Kit for Retrofit Application for Deflagration of Powdered Fuels

The various horizontal and near-horizontal burners described in this disclosure are intended to be utilized first as a retrofit for existing oil fired furnaces, where a nominal four inch receiving and mounting collar system is common. A preferred embodiment for this application is tested and running at this time and is best described by FIG. 36. Any issues with agglomerate may be dealt with using one or more of the techniques described in FIG. 37A through FIG. 40B for horizontal burners, as well as solutions developed with vertical burners in mind depicted in FIGS. 28 through 32.

Application of an apparatus for combustion of a fluent fuel may be made to many self-contained devices, but are often part of, or used in connection with, heat-consuming apparatus, such as heating furnaces and boilers. In many of these fields of fluent fuel combustion, our burner apparatus may be considered a subsystem detail of a larger end product entity. A burner of the present invention may be adapted for use in any types of furnaces, boilers, and other heating systems such as but not limited to those today typically fueled by oil, natural gas, and LP gas. A burner of the present invention may also be adapted for use in an existing system of any of the applications mentioned above.

Our wide range of burner technology, means, methods, and apparatuses are also intended to be adapted to existing heat exchange furnace and other systems, or designed for installation in new heat exchange furnaces and other systems, as described above.

The contents of all references, issued patents, and published patent applications cited throughout this application are hereby incorporated by reference.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of combustion of an explosible powdered solid fuel, the method comprising:
  a) mixing a flow of a carrier gas and a plurality of solid particles of the explosible powdered solid fuel having a size distribution substantially in an explosible size range for the solid particles to form a moving stream of a dispersion of the solid particles of the explosible powdered solid fuel in the carrier gas;
  b) directing the moving stream into a first enclosure of a burner through an inlet nozzle to form an explosible dispersion in the first enclosure moving at a flame speed of the explosible dispersion, the burner comprising:
    i) a first enclosure sidewall having a closed inlet end and an open exhaust end opposite the closed inlet end, the first enclosure sidewall forming the first enclosure having a substantially cylindrical shape, the first enclosure including a first combustion stage;
    ii) the inlet nozzle coupled to the output of the mixing zone and having an exit into the first enclosure at the closed inlet end of the first enclosure, wherein the inlet nozzle opens unobstructedly and freely into the first enclosure to deliver the moving stream of the dispersion of the solid particles in the carrier gas to the first enclosure;
    iii) an igniter located in the first enclosure downstream from the inlet nozzle to initially ignite the dispersion;
    iv) a first flow-altering discontinuity, formed by a first diameter step increase from an inner diameter of the inlet nozzle to an inner diameter of the first enclosure sidewall, with a first discontinuity ratio of the inner diameter of the first enclosure sidewall to the inner diameter of the inlet nozzle in a range of 4.67 to 12;
    v) at least one first radially-symmetrical flame-stabilizing opening permitting flow of a first controlled secondary gas through the first radially-symmetrical flame-stabilizing opening into the first enclosure, the first radially-symmetrical flame-stabilizing opening being located at the closed inlet end of the first enclosure, wherein the first radially-symmetrical flame-stabilizing opening is formed to direct the first controlled secondary gas along and then outward from a flow direction axis of the dispersion and recirculating along the first enclosure sidewall;
    vi) a second enclosure sidewall having an inlet end and an open exhaust end opposite the inlet end, the second enclosure sidewall extending downstream beyond the open exhaust end of the first enclosure sidewall to the open exhaust end of the second enclosure sidewall, the second enclosure sidewall forming a second enclosure having a substantially cylindrical shape, the second enclosure including a second combustion stage;
    vii) a second flow-altering discontinuity, formed by a second diameter step increase from the inner diameter of the first enclosure sidewall to an inner diameter of the second enclosure sidewall, with a second discontinuity ratio of the inner diameter of the second enclosure sidewall to the inner diameter of the first enclosure sidewall being in a range of 1.14 to 2.29 at the open exhaust end of the first enclosure sidewall; and
    viii) at least one second radially-symmetrical flame-stabilizing opening permitting flow of a second controlled secondary gas through the second radially-symmetrical flame-stabilizing opening, the second radially-symmetrical flame-stabilizing opening being located downstream of the open exhaust end of the first enclosure sidewall, wherein the second radially-symmetrical flame-stabilizing opening is formed to initially direct a radially-symmetrical stream of the second controlled secondary gas inward in the second enclosure in a direction non-parallel to a central axis of the second enclosure, wherein the second controlled secondary gas is not externally pre-heated, is pressurized, and is actively provided at a velocity up to 10 times the flame speed;

c) igniting the explosible dispersion instantaneously with the igniter;

d) supplying the first controlled secondary gas to the first enclosure;

e) actively supplying the second controlled secondary gas to the second enclosure; and f) controlling the flow of the carrier gas, flow of the first controlled secondary gas, flow of the second controlled secondary gas, and a feed rate of the solid particles to maintain an equivalence ratio in the explosible range downstream of the inlet nozzle, thereby maintaining an instantaneously self-sustaining stable stationary flame front of combustion of the explosible dispersion within the first enclosure.

2. The method of claim 1, wherein the first controlled secondary gas is supplied to the burner through at least one secondary inlet to the first enclosure between the closed inlet end and the open exhaust end for turbulence-inducing flow in a direction non-parallel to the first enclosure sidewall.

3. The method of claim 1, further comprising monitoring the burner using at least one sensor selected from the group consisting of an intake temperature sensor, an exhaust temperature sensor, an intake gas sensor, exhaust gas sensor, a mass airflow sensor, an air/fuel ratio sensor, a fuel flow sensor, an oxygen sensor, a carbon monoxide sensor, a powder supply sensor, an acoustic sensor, a powder sensor, a vacuum sensor, a pressure sensor, a position sensor, a powder feed speed sensor, a static charge sensor, a humidity sensor, a moisture sensor, a particle size sensor, an optical sensor for sensing a presence of the flame, and any combination of these sensors and controlling at least one parameter of the burner based on a reading from the sensor.

4. The method of claim 1, further comprising regulating a heat output of the burner by controlling a rate of flow of the carrier gas, a rate of flow of the first controlled secondary gas, a rate of flow of the second controlled secondary gas, or the feed rate of the solid particles.

5. The method of claim 1, wherein the at least one burner comprises a plurality of burners and the method further comprising regulating a total heat output by the plurality of burners by controlling the flow of the carrier gas, a rate of flow of the first controlled secondary gas, a flow of the second controlled secondary gas, and the feed rate of the solid particles to at least one of the plurality of burners.

6. The method of claim 1, further comprising converting energy produced by the combustion through the operation of a device selected from the group consisting of ovens, absorption chillers, ammonia cycle refrigeration, patio heaters, heating torches, controllable fire pits, continuous water heaters, booster and inline water heaters, yellow flame gas log sets, inserts, freestanding stoves, built in zero clearance fireplaces, radiating stoves and furnaces, outdoor wood boilers, industrial furnaces and boilers, corn stoves, pellet stoves, coal stoves, entertainment controllable torches, pyrotechnic type displays, and steam engines by replacing or supplementing existing combustion devices with the burner.

7. The method of claim 1, wherein the first controlled secondary gas is passively provided.

8. The method of claim 1, wherein the first controlled secondary gas is actively provided.

9. The method of claim 1, wherein:

the first flow-altering discontinuity and the first radially-symmetrical flame-stabilizing opening provide, in combination, turbulent mixing of the carrier gas, the first controlled secondary gas, and the solid particles, to promote initial particle heating, to shorten a length of a pre-heat zone, to promote flow of the first controlled secondary gas, and to provide combustion flame stabilization;

the first enclosure is designed such that when the moving stream of the solid particles in the carrier gas enters the first enclosure from the inlet nozzle, a backflow causes the moving stream to diverge, thereby forming an explosible dispersion having a symmetrical mushroom-like shape and slowing to a flame speed of the explosible dispersion by virtue of the first flow-altering discontinuity and the first radially-symmetrical flame-stabilizing opening, wherein through turbulent recirculation mixes with the first controlled secondary gas to form the explosible dispersion at an equivalence ratio in an explosible range, and wherein the ignition source initially ignites the explosible dispersion;

a stream flow of the moving stream is regulatable to maintain an instantaneously stable stationary deflagrating flame wave front by combustion of the explosible dispersion, thermally sustained with non-radiative, gas-to-particle, conductive heat transfer, while emulating fluid mechanics of single phase gas combustion;

the second flow-altering discontinuity and the second controlled secondary gas entering through the second radially-symmetrical flame-stabilizing opening provide, in combination, an induced backflow recirculation to further combust any remaining solid particles and to promote a turbulent flow inside the second combustion stage to mix an efflux from the first enclosure with the second controlled secondary gas, to increase a rate of heating of the second controlled secondary gas by the efflux, to decrease a length of a final burnout zone, to sustain flame stabilization, and to insure combustion completion;

the carrier gas, the first controlled secondary gas, and the second controlled secondary gas comprise, in combination, sufficient oxidizing gas to completely combust the solid particles; and heating of the solid particles in the first stage relies on gas-to-particle conduction and heating of the second controlled secondary gas in the second stage relies on particle-to-gas conduction, not on any thermal refractory structure for heat retention or radiative heating or any external thermal energy, and flame stabilization does not rely on any active mechanical swirl inducing apparatus common to cyclonic and vortex suspension systems for increasing path length and residence time.

10. The method of claim 1, wherein the burner further comprises at least one passive stationary flow-altering structure located in the first enclosure to induce swirl or turbulence to the moving stream.

11. The method of claim 1, wherein the first and second enclosures are vertically oriented such that the open exhaust end of the second enclosure is at the top.

12. The method of claim 1, wherein the first and second enclosures are non-vertically oriented.

13. The method of claim 1, wherein the burner further comprises a conical arrangement at the closed inlet end of the first enclosure for catching and recycling unburned solid particles into the moving stream.

14. The method of claim 1, wherein at least 95% of the solid particles have a diameter in the explosible range, which is less than about 200 microns for wood.

15. The method of claim 1, wherein the burner further comprises a de-agglomerization system comprising a screen located in the first enclosure and a vibrating transducer connected to the screen to break up agglomerates of the solid particles.

16. The method of claim 1, wherein the first controlled secondary gas comprises a first portion mechanically controlled by the at least one first radially-symmetrical flame-stabilizing opening and a second portion actively supplied adjacent to the closed inlet end of the first enclosure sidewall arranged to create turbulent flow in the first enclosure.

17. The method of claim 1, wherein the burner further comprises a flow restriction at the exhaust end of the second enclosure sidewall.

18. The method of claim 17, wherein the flow restriction is in the form of a reducer for introducing a tertiary gas.

19. The method of claim 1, wherein:
a gas feed system supplies the flow of the carrier gas;
a powder fuel feed system supplies the explosible powdered solid fuel;
mixing the flow of the carrier gas and the plurality of solid particles occurs in a mixing zone having inputs coupled to the gas feed system and the powder fuel feed system and an output comprising a moving stream of a dispersion of the solid particles in the carrier gas; and
a control system coupled to the gas feed system and the powder fuel feed system regulates the flow of the carrier gas such that the moving stream slows to a flame speed of the moving stream at an equivalence ratio in the explosible range downstream of the inlet nozzle to maintain a stable stationary flame front within the first enclosure.

20. The method of claim 19, wherein the gas feed system supplies the second controlled secondary gas and the control system further regulates the flow of the second controlled secondary gas from the gas feed system to achieve a predetermined level of combustion completeness of the explosible powder at the open exhaust end.

21. The method of claim 19, wherein at least one additional air inlet to the mixing zone provides an accelerating gas to accelerate the moving stream and break up agglomerates of the solid particles prior to entry into the first enclosure.

22. The method of claim 19, wherein the gas feed system comprises a pressurized gas source, a blower, or a gas amplifier device.

23. The method of claim 19, wherein the powder fuel feed system comprises at least one fuel usage meter.

24. The method of claim 19, wherein the control system comprises at least one sensor.

25. The method of claim 24, wherein the sensor is selected from the group consisting of an intake temperature sensor, an exhaust temperature sensor, an intake gas sensor, exhaust gas sensor, a mass airflow sensor, an air/fuel ratio sensor, a fuel flow sensor, an oxygen sensor, a carbon monoxide sensor, a powder supply sensor, an acoustic sensor, a powder sensor, a vacuum sensor, a pressure sensor, a position sensor, a powder feed speed sensor, a static charge sensor, a humidity sensor, a moisture sensor, a particle size sensor, an optical sensor for sensing a presence of the flame, and any combination of these sensors.

26. The method of claim 19, wherein the gas feed system comprises a gas usage meter.

27. The method of claim 19, wherein the powder fuel feed system comprises an auger.

28. The method of claim 19, wherein, for a preset BTU per hour output, the control system also regulates the first controlled secondary gas to maintain the moving stream at the equivalence ratio in the explosible range downstream of the inlet nozzle and to maintain the stable stationary flame front within the first enclosure, wherein the first controlled secondary gas is actively provided by the gas feed system.

29. The method of claim 19, further comprising filtering flue gases from the burner.

30. The method of claim 19, further comprising capturing and collecting unburned powder fuel or ash particulates exiting the open exhaust end of the second enclosure in a collection vessel located downstream of the open exhaust end of the second enclosure.

* * * * *